US012492217B2

(12) United States Patent
Xu et al.

(10) Patent No.: US 12,492,217 B2
(45) Date of Patent: Dec. 9, 2025

(54) REAGENTS AND THEIR USE FOR MODULAR ENANTIODIVERGENT SYNTHESIS OF C—P BONDS

(71) Applicants: Bristol-Myers Squibb Company, Princeton, NJ (US); The Scripps Research Institute, La Jolla, CA (US)

(72) Inventors: Dongmin Xu, San Diego, CA (US); Nazaret Rivas-Bascón, Granada (ES); Kyle W. Knouse, New Oxford, PA (US); Natalia M. Padial, San Diego, CA (US); Bin Zheng, Princeton, NJ (US); Julien C. Vantourout, San Diego, CA (US); Michael Anthony Schmidt, Princeton, NJ (US); Martin D. Eastgate, Princeton, NJ (US); Phil S. Baran, San Diego, CA (US)

(73) Assignees: Bristol-Myers Squibb Company, Princeton, NJ (US); The Scripps Research Institute, La Jolla, CA (US)

( * ) Notice: Subject to any disclaimer, the term of this patent is extended or adjusted under 35 U.S.C. 154(b) by 471 days.

(21) Appl. No.: 17/758,898

(22) PCT Filed: Jan. 14, 2021

(86) PCT No.: PCT/US2021/013391
§ 371 (c)(1),
(2) Date: Jul. 15, 2022

(87) PCT Pub. No.: WO2021/146391
PCT Pub. Date: Jul. 22, 2021

(65) Prior Publication Data
US 2023/0212204 A1 Jul. 6, 2023

Related U.S. Application Data

(60) Provisional application No. 62/962,066, filed on Jan. 16, 2020.

(51) Int. Cl.
| | |
|---|---|
| *C07F 9/6578* | (2006.01) |
| *C07F 9/30* | (2006.01) |
| *C07F 9/32* | (2006.01) |
| *C07F 9/58* | (2006.01) |
| *C07F 9/653* | (2006.01) |
| *C07F 9/655* | (2006.01) |
| *C07F 17/02* | (2006.01) |
| *C07H 1/00* | (2006.01) |

(52) U.S. Cl.
CPC ........ *C07F 9/65785* (2013.01); *C07F 9/3229* (2013.01); *C07F 9/58* (2013.01); *C07F 9/653* (2013.01); *C07F 9/65515* (2013.01); *C07F 17/02* (2013.01)

(58) Field of Classification Search
CPC .......................... C07F 9/65785; C07F 9/65515
See application file for complete search history.

(56) References Cited

U.S. PATENT DOCUMENTS

| | | | |
|---|---|---|---|
| 3,687,808 A | 8/1972 | Merigan et al. | |
| 5,670,633 A | 9/1997 | Cook et al. | |
| 6,166,197 A | 12/2000 | Cook et al. | |
| 2016/0237427 A1 | 8/2016 | Olson et al. | |
| 2019/0030057 A1* | 1/2019 | Fink ................... | A61K 31/7084 |
| 2019/0248828 A1 | 8/2019 | Fink et al. | |
| 2019/0322694 A1* | 10/2019 | Schmidt ................ | C07H 19/10 |

FOREIGN PATENT DOCUMENTS

| | | | |
|---|---|---|---|
| DE | 3520386 A1 | | 12/1986 |
| GE | 3520386 A1 | * | 12/1986 |
| WO | WO-2007031091 A2 | | 3/2007 |
| WO | WO-2007134181 A2 | | 11/2007 |
| WO | WO-2008150729 A2 | | 12/2008 |
| WO | WO-2008154401 A2 | | 12/2008 |
| WO | WO-2009006478 A2 | | 1/2009 |
| WO | WO-2009067647 A1 | | 5/2009 |
| WO | WO-2009100320 A2 | | 8/2009 |
| WO | WO-2009124295 A2 | | 10/2009 |
| WO | WO-2010036698 A1 | | 4/2010 |
| WO | WO-2011017521 A2 | | 2/2011 |
| WO | WO-2011085102 A1 | | 7/2011 |
| WO | WO-2011115818 A1 | | 9/2011 |
| WO | WO-2013022966 A1 | | 2/2013 |
| WO | WO-2016079181 A1 | | 5/2016 |
| WO | WO-2016189040 A1 | | 12/2016 |
| WO | WO-2019046498 A1 | | 3/2019 |
| WO | WO-2019160884 A1 | | 8/2019 |
| WO | WO-2019200273 A1 | | 10/2019 |

OTHER PUBLICATIONS

Knouse, K. W., et al., Unlocking P (V): Reagents for chiral phosphorothioate synthesis. Science, 361(6408), 1234-1238. (Year: 2018).*
K. R. Winters, et al., 85 The Journal of Organic Chemistry 14545-14558 (2020)("Winters") (Year: 2020).*
Drabowicz, J., et al., "Product Class 14: Dialkylphosphinic Acids and Derivatives," Science of Synthesis 42.14, Thieme Publishing Group, Germany (2009).
Drabowicz, J., et al., "Product Class 15: Alkylphosphonic Acids and Derivatives," Science of Synthesis 42.15, Thieme Publishing Group, Germany (2009).
Mikolajczyk, M., "Optically active trivalent phosphorus acid esters: synthesis, chirality at phosphorus and some transformations," Pure and Applied Chemistry 52:959-972, Walter de Gruyter, Germany (1980).

(Continued)

*Primary Examiner* — Alexander R Pagano
*Assistant Examiner* — Frank S. Hou
(74) *Attorney, Agent, or Firm* — STERNE, KESSLER, GOLDSTEIN & FOX P.L.L.C.

(57) ABSTRACT

The disclosure describes chiral P(V)-based reagents and their uses for the modular, scalable, and stereospecific synthesis of chiral phosphines, phosphine oxides and particular oligonucleotides.

19 Claims, No Drawings

(56) References Cited

OTHER PUBLICATIONS

Stuebe, C., et al., "The Preparation and Reactions of Diphenylphosphinous Chloride," Journal of the American Chemical Society 77(13):3526-3529, ACS Publications, United States (Jul. 1955).
Engels, J., and Jager, A., "A new synthesis of nucleoside methylphosphonates," Angew Chem Suppl 21(S12):2010-2015, Verlag Chemie GmbH, Germany (1982).
Agrawal, S., et al., "Oligodeoxynucleoside Methylphosphonates:Synthesis and Enzymic Degradation," Tetrahedron Lett. 28(31):3539-3542, Elsevier, Netherlands (1987).
Bohr, H.G., et al., "Electronic Structures of LNA Phosphorothioate Oligonucleotides," Mol. Ther. Nucleic Acids 8:428-441, Cell Press, United States (2017).
Christensen, U.B., et al., "Intercalating nucleic acids containing insertions of 1-O-(1-pyrenylmethyl)glycerol: stabilisation of dsDNA and discrimination of DNA over RNA," Nucleic Acids Research 30(22):4918-4925, Oxford Academic Press, United Kingdom (2002).
*Concise Encyclopedia of Polymer Science and Engineering*, pp. 858-864, J.I. Kroschwitz, Ed., John Wiley & Sons, United States (1990).
Cook, P.D., "Medicinal chemistry of antisense oligonucleotides—future opportunities," Anti-Cancer Drug Design 6(6):585-607, Ingenta Connect, United Kingdom (1991).
Delgado, C., et al., "The uses and properties of PEG-linked proteins," Critical Reviews in Therapeutic Drug Carrier Systems 9(3-4):249-304, CRC Press, United States (1992).
Englisch, U., et al., "Chemically Modified Oligonucleotides as Probes and Inhibitors," *Angewandte Chemie*, International Edition, vol. 30, pp. 613-722 (1991).
Feldman, A.W., and Romesberg, F.E., "Expansion of the Genetic Alphabet: A Chemist's Approach to Synthetic Biology," Acc. Chem. Res. 51:394-403, American Chemical Society, United States (2018).
Hamma, T., et al., "Interactions of hairpin oligo-2'-O-methylribonucleotides containing methylphosphonate linkages with HIV TAR RNA," Antisense and Nucleic Acid Drug Development 13(1):19-30, Mary Ann Liebert, Inc., United States (2003).
Han, Z.S., et al., "Efficient asymmetric synthesis of P-chiral phosphine oxides via properly designed and activated benzoxazaphosphinine-2-oxide agents," J. Am. Chem. Soc. 135:2474-2477, American Chemical Society, United States (2013).
Helinski, J., et al., "N,N-diisopropyl-O-P-nitrophenyl-P-methylphosphonoamidite : novel difunctional P(III) reagent in oligonucleoside methylphosphonate synthesis containing 4-nitrophenoxy group," Tetrahedron Lett. 32(37):4981-4984, Elsevier, Netherlands (1991).
International Search Report and Written Opinion, mailed on May 26, 2021 for International Application No. PCT/US2021/013391, International Searching Authority, United States, 8 pages.
Iwamoto, N., et al., "Control of phosphorothioate stereochemistry substantially increases the efficacy of antisense oligonucleotides," Nat. Biotechnol. 35(9):845-851, Nature Publishing Group, United Kingdom (2017).
Knouse, K.W., et al., "Unlocking P(V): Reagents for chiral phosphorothioate synthesis," Science 361(6408):1234-1238, American Association for the Advancement of Science, United States (2018).
Knowles, W.S., "Asymmetric Hydrogenations (Nobel Lecture 2001)," Adv. Synth. Catal. 345(1-2):3-13, Wiley, United States (2003).
Koch, M., et al., "Role of a ribosomal RNA phosphate oxygen during the EF-G-triggered GTP hydrolysis," Proc. Natl. Acad. Sci. USA 112(20):E2561-E2568, National Academy of Sciences, United States (2015).

Lebedev, A.V., et al., "A new DMAP-catalyzed phosphonamidite coupling reaction for synthesis of oligonucleotide methylphosphonate derivatives," Tetrahedron Lett. 31(6):851-854, Elsevier, Netherlands (1990).
Miller, P.S., et al., "Nonionic nucleic acid analogues. Synthesis and characterization of dideoxyribonucleoside methylphosphonates," Biochemistry 18(23):5134-5143, American Chemical Society, United States (1979).
Molina, A.G., et al., "Acetylated and Methylated β-Cyclodextrins as Viable Soluble Supports for the Synthesis of Short 2'-Oligodeoxyribonucleotides in Solution," Molecules 17:12102-12120, MDPI, Switzerland (2012).
Ouchi, T., et al., "Synthesis and antitumor activity of poly(ethylene glycol)s linked to 5-fluorouracil via a urethane or urea bond," Drug Design and Discovery 9:93-105, Bentham Science Publishers B.V, United Arab Emirates (1992).
Pallan, P.S., et al., "Selenium modification of nucleic acids: preparation of oligonucleotides with incorporated 2'-SeMe-uridine for crystallographic phasing of nucleic acid structures," Nat. Protoc. 2(3):647-651, Nature Publishing Group, United Kingdom (2007).
Pallan, P.S., et al., "Selenium modification of nucleic acids: preparation of phosphoroselenoate derivatives for crystallographic phasing of nucleic acid structures," Nat. Protoc. 2(3):640-646, Nature Publishing Group, United Kingdom (2007).
Pritchard, C.E., et al., "Methylphosphonate mapping of phosphate contacts critical for RNA recognition by the human immunodeficiency virus tat and rev proteins," Nucleic Acids Res. 22(13):2592-2600, Oxford Academic Press, United Kingdom (1994).
Rajendran, K.V., et al., "Simple unprecedented conversion of phosphine oxides and sulfides to phosphine boranes using sodium borohydride," Chem. Commun. 48:817-819, Royal Society of Chemistry, United Kingdom (2012).
Ravasio, N., et al., "Selective hydrogenations promoted by copper catalysts. 1. Chemoselectivity, regioselectivity, and stereoselectivity in the hydrogenation of 3-substituted steroids," J. Org. Chem. 56(13):4329-4333, American Chemical Society, United States (1991).
Reynolds, M.A., et al., "Synthesis and thermodynamics of oligonucleotides containing chirally pure R(P) methylphosphonate linkages," Nucleic Acids Res. 24(22):4584-4591, Oxford Academic Press, United Kingdom (1996).
Hutcherson, S.L., *Antisense Research and Application*, Chapter 15, S.T. Crooke and B. Lebleu, Eds., CRC Press, United States (1993).
Schinazi, R.F., et al., "Boron containing oligonucleotides," Nucleosides and Nucleotides 17:635-647, Taylor & Francis, United Kingdom (1998).
Lesnikowski, Z.J., et al., "Carboranyl oligonucleotides. 3. Biochemical properties of oligonucleotides containing 5-(o-carboranyl-1-yl)-2'-deoxyuridine," Biochemistry 35(18):5741-5746, American Chemical Society, United States (1996).
Uehara, S., et al., "Solid-phase synthesis of P-boronated oligonucleotides by the H-boranophosphonate method," J. Org. Chem. 79(8):3465-3472, American Chemical Society, United States (2014).
Vineyard, B.D., et al., "Asymmetric hydrogenation. Rhodium chiral bisphosphine catalyst," J. Am. Chem. Soc. 99(18):5946-5952, American Chemical Society, United States (1977).
Zhang, Y., et al., "A semi-synthetic organism that stores and retrieves increased genetic information," Nature 551:644-647, Nature Publishing Company, United Kingdom (2017).
Huang, H.S., et al., "A Practical Method for Regioselective 5'-O-tert-Butyldimethylsilyl Deprotection of Persilylated Nucleosides by Methanolic Phosphomolybdic Acid," Synlett 29:2437-2443, Thieme Medical Publishers, United States (2018).

\* cited by examiner

REAGENTS AND THEIR USE FOR MODULAR ENANTIODIVERGENT SYNTHESIS OF C—P BONDS

CROSS-REFERENCE TO RELATED APPLICATIONS

The present application is a 35 U.S.C. § 371 filing of International Application No. PCT/US2012/013391, filed Jan. 14, 2021, which claims priority to U.S. Provisional Application No. 62/962,066, filed on Jan. 16, 2020.

STATEMENT REGARDING FEDERALLY-SPONSORED RESEARCH AND DEVELOPMENT

This invention was made with government support under GM106210 awarded by the National Institutes of General Medical Sciences. The government has certain rights in the invention.

BACKGROUND

The control of P-centered stereochemistry is an often encountered challenge that presents itself in a variety of areas. See Corbridge, D. E. C. *Phosphorus: Chemistry, Biochemistry and Technology*, 6th ed.; Taylor & Francis, 2013. One recent example stems from the emergence of anti-sense oligonucleotide (ASO) therapeutics wherein precise control of P-stereogenic centers in a phosphorothioate linkage can impact efficacy and physical properties. See Bohr, H. G.; et al., "Electronic Structures of LNA Phosphorothioate Oligonucleotides." *Mol. Ther. Nucleic Acids* 2017, 8, 428-441; also see Iwamoto, N.; "Control of Phosphorothioate Stereochemistry Substantially Increases the Efficacy of Antisense Oligonucleotides." *Nat. Biotechnol.* 2017, 35 (9), 845-851. U.S. Patent Application Publication 2019/0322694 described a method to precisely control the stereochemical outcome of such systems using a P(V)-based reagent built upon an inexpensive limonene scaffold (phosphorus-sulfur incorporation or ψ for short). The advantage of such an approach is that, unlike classical phosphoramidite P(III)-based reagents, ψ-enabled ASO synthesis is redox-economic and involves air and moisture tolerant building blocks.

Another P-based chiral linkage that is receiving increasing attention are found in methyl-phosphonate oligonucleotides, or MPOs. See Pritchard, C. E.; et. al., "Methylphosphonate mapping of phosphate contacts critical for RNA recognition by the human immunodeficiency virus tat and rev proteins," Nucleic Acids Res. 1994, 22 (13), 2592-2600; also see Koch, M.; et. al., Role of a ribosomal RNA phosphate oxygen during the EF-G-triggered GTP hydrolysis, *Proc. Natl. Acad. Sci.* 2015, 112 (20), E2561; Hamma, T.; et. al., "Interactions of Hairpin Oligo-2'-O-Methylribonucleotides Containing Methylphosphonate Linkages with HIV TAR RNA," *Antisense and Nucleic Acid Drug Dev.* 2003, 13 (1), 19-30. Such structures are expected to have superior stability as they are highly resistant to phosphodiesterase degradation. See Agrawal, S.; et al., "Oligodeoxynucleoside Methylphosphonates: Synthesis and Enzymic Degradation," *Tetrahedron Lett.* 1987, 28 (31), 3539-3542; Reynolds, M. A.; et al., "Synthesis and Thermodynamics of Oligonucleotides Containing Chirally Pure R P Methylphosphonate Linkages," *Nucleic Acids Res.* 1996, 24 (22), 4584-4591. The absence of nonbrindging oxygen atom makes the backbone charge-neutral and unable to H-bond. This can lead to either stabilizing or destabilizing effects when forming DNA-RNA duplexes. As with phosphorothioate-based ASOs, MPOs introduce chirality at phosphorus and as such, $S_P$ and $R_P$ isomers have different binding affinities and biological activities. Indeed, one of the first ASO analogs employed an MPO linkage. Currently, the preparation of MPO-based building blocks are wedded to a P(III)-based strategy that requires tedious separation of diastereomers. See Miller, P. S.; et al., Nonionic nucleic acid analogs. Synthesis and characterization of dideoxyribonucleoside methylphosphonates. *Biochemistry* 1979, 18 (23), 5134-5143; Engels, J.; et al., Eine neue Synthese von Nukleosid-methylphosphonaten. *Angew. Chem. Int. Ed. Eng.* 1982, 21 (S12), 2010-2015; Lebedev, A. V.; et al., "A new DMAP-catalyzed phosphonamidate coupling reaction for synthesis of oligonucleotide methylphosphonate derivatives," *Tetrahedron Lett.* 1990, 31 (6), 851-854; Helinski, J.; et al., "N,N-diisopropyl-O—P-nitrophenyl-P-methylphosphoroamidite: Novel Difunctional PIII Reagent in Oligonucleoside Methylphosphonate Synthesis Containing 4-Nitrophenoxy Group," *Tetrahedron Lett.* 1991, 32 (37), 4981-4984. These limitations have surely hampered the wide exploration of such linkages for modern therapeutic applications.

In addition, stereogenic P-based systems which are chiral at phosphorus represent some of the most important ligands known. See Vineyard, B. D.; et al., Asymmetric Hydrogenation: Rhodium Chiral Bisphosphine Catalyst, *J. Am. Chem. Soc.* 1977, 99 (18), 5946-5952; also see Knowles, W. S., "Asymmetric Hydrogenations (Nobel Lecture 2001)," *Adv. Synth. Catal.* 2003, 345 (1-2), 3-13. For example, DIPAMP was among the first chiral phosphines to be employed in asymmetric hydrogenation, serving as the central piece in the legendary L-DOPA process. Since then, scores of useful ligand scaffolds have emerged such as DuanPhos and BIBOP to install new stereogenic carbon centers with near perfect control. Despite their great utility, a simple modular synthesis of P-chiral phosphines remains an unmet challenge.

Therefore, there is a need for an efficient, straight-forward approach to control P-based stereochemistry with application including oligonucleotide chemistry and asymmetric synthesis.

BRIEF SUMMARY OF THE DISCLOSURE

In one aspect, the present disclosure relates to a compound of Formula (I):

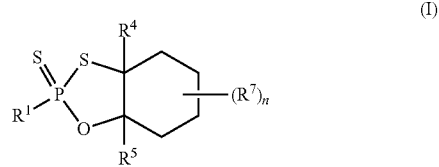

or a salt thereof; wherein $R^1$, $R^4$, $R^5$, $R^7$, and n are defined below.

In one aspect, the present disclosure relates to a compound of Formula (Ia):

[Structure of Formula (Ia) precursor with stereochemistry labels (S), (R), (S), and substituents S=P, R¹, O, Me, Me, H]

a salt thereof, an enantiomer thereof, or a combination thereof.

In one aspect, the present disclosure relates to a method of making a thiophosphinic acid, the method comprising:

reacting a carbanion reagent with a compound of Formula (Ia):

(Ia)

[Structure of Formula (Ia) with stereochemistry labels (S), (R), (S) and substituents S=P, R¹, O, Me, Me, H]

a salt thereof, an enantiomer thereof, or a combination thereof;

wherein $R^1$ is defined below;

to form a thiophosphinic acid.

In one aspect, the thiophosphinic acid formed in the method above is represented by Formula (II):

(II)

$$R^1-\underset{R^2}{\overset{\overset{O}{\|}}{P}}-SH;$$

wherein $R^1$ and $R^2$ are defined below.

In one aspect, the method further comprises reacting the thiophosphinic acid with an alkylating reagent to form a thiophosphinic acid ester.

In one aspect, the thiophosphinic acid ester formed in the method above is represented by Formula (III)

(III)

$$R^1-\underset{R^2}{\overset{\overset{O}{\|}}{P}}-S-R';$$

wherein $R^1$, $R^2$, and R' are defined below.

In one aspect, the method further comprises reacting the thiophosphinic acid ester with an alkoxide agent to form an organophosphinate.

In one aspect, the organophosphinate formed in the method above is represented by Formula (IV)

(IV)

$$R^1-\underset{R^2}{\overset{\overset{O}{\|}}{P}}-O-R';$$

wherein $R^1$, $R^2$, and R' are defined below.

In one aspect, the method further comprises reacting the organophosphinate with a carbanion reagent to form a phosphine oxide.

In one aspect, the phosphine oxide formed in the method above is represented by Formula (V):

(V)

$$R^1-\underset{R^2}{\overset{\overset{O}{\|}}{P}}-R^3;$$

wherein $R^1$, $R^2$, and $R^3$ are defined below.

In one aspect, the method further comprises reacting the phosphine oxide with a reducing agent to form a phosphine.

In one aspect, the phosphine formed in the method above is represented by Formula (VI):

(VI)

$$R^1-\underset{R^2}{\overset{P}{|}}-R^3;$$

wherein $R^1$, $R^2$, and $R^3$ are defined below.

In one aspect, the present disclosure relates to a method of making a nucleoside-loaded organophosphorus compound, comprising reacting a compound of Formula (Ia) or an enantiomer thereof with a nucleoside.

In one aspect, the nucleoside-loaded organophosphorus compound formed in the method above is represented by Formula (VII) or (VIIa)

(VII)

[Structure showing P with =O, R¹ (wedge), SR', and Nu¹]

(VIIa)

[Structure showing P with =S, R¹ (wedge), OR', and Nu¹]

or a diastereomer thereof;

wherein $R^1$, R', or $Nu^1$ are defined below.

In one aspect, the method further comprises reacting the nucleoside-loaded organophosphorus compound with a second nucleoside to form a dinucleotide.

In one aspect, the dinucleotide formed in the method above is represented by Formula (VIII) or (VIIIa)

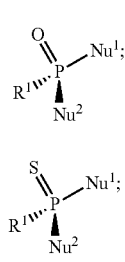

(VIII)

(VIIIa)

wherein $R^1$, $Nu^1$, or $Nu^2$ are defined below.

In one aspect, the method further comprises a) reacting the dinucleotide with a compound of Formula (Ia) to form a loaded dinucleotide;

b) reacting the loaded dinucleotide formed in step (a) with a third nucleoside, to form a trinucleotide;

c) repeating steps (a) and (b) one or more times to form an oligonucleotide having a desired number of nucleotides.

In one aspect, the method further comprises a) reacting the dinucleotide with a compound of Formula C:

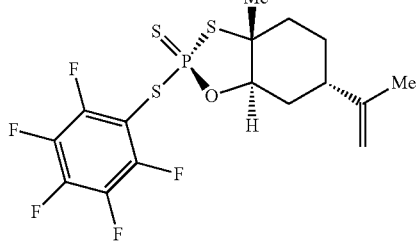

(C)

or an enantiomer thereof to form a loaded chimeric dinucleotide; and b) reacting the loaded chimeric dinucleoside formed in step (a) with a third nucleoside, to form a chimeric trinucleotide bearing a phosphonate linkage and a phosphorothioate linkage.

In one aspect, the present disclosure relates to a compound of the Formula (IIIa):

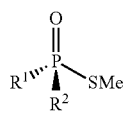

(IIIa)

or an enantiomer thereof;
wherein $R^1$ and $R^2$ are defined below.

In one aspect, the present disclosure relates to a compound of the Formula (IVa):

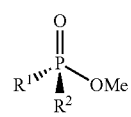

(IVa)

or an enantiomer thereof;
wherein $R^1$ and $R^2$ are defined below.

In one aspect, the present disclosure relates to a compound of the Formula (VII):

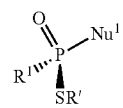

(VII)

or an enantiomer thereof;
wherein $R^1$, R', and $Nu^1$ are defined below.

In one aspect, the present disclosure relates to a method of making a compound of Formula (Ia):

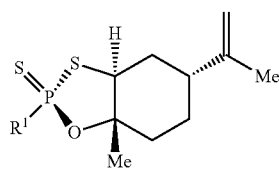

(Ia)

or an enantiomer thereof;
wherein $R^1$ is defined below,
comprising reacting a carbanion reagent with a compound of Formula A:

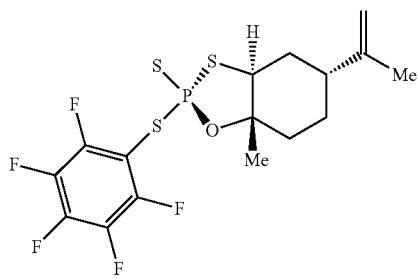

(A)

or an enantiomer thereof,
to form a compound of Formula (Ia).

DETAILED DESCRIPTION

Reagents of the Disclosure

Reagents and Compounds of the Disclosure are P(V) based compounds for modular enantiodivergent synthesis of C—P bonds.

a. Phosphonodithioate Reagents

In one aspect, the Phosphonodithioate Reagents are compounds represented by Formula (I):

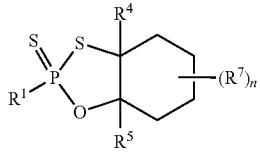
(I)

or a salt thereof; wherein:
$R^1$ is $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl, wherein $R^1$ is optionally substituted with one or more, the same or different, $R^a$ groups;
$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl;
$R^4$ is hydrogen, $C_{1-6}$ alkyl, $C_{2-6}$ alkenyl, or $C_{2-6}$ alkynyl;
$R^5$ is $C_{1-6}$ alkyl, $C_{2-6}$ alkenyl, or $C_{2-6}$ alkynyl;
$R^7$ is is a substituent that substitutes for a hydrogen and is one of $C_{1-6}$ alkyl, $C_{2-6}$ alkenyl, $C_{2-6}$ alkynyl, $C_{3-10}$ cycloalkyl, or $C_{6-10}$ aryl; and
n is 0, 1, 2, 3, 4, 5, 6, 7, or 8.

In one aspect, the Phosphonodithioate Reagents are compounds of Formula (Ia):

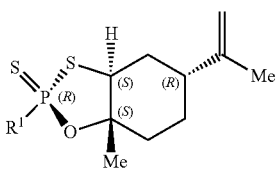

a salt thereof, an enantiomer thereof, or a combination thereof.
wherein $R^1$ is defined above.

In one aspect, $R^1$ is selected from the group consisting of:

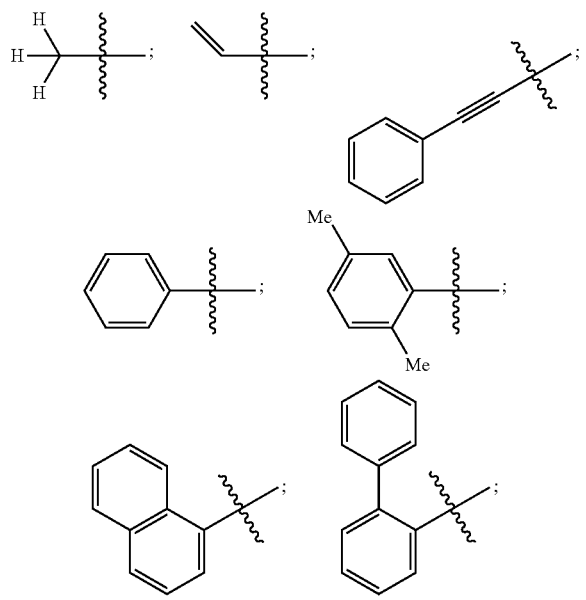

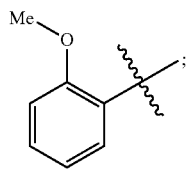

wherein is the bond between $R^1$ and phosphorus of the formula (I).

In one aspect, $R^1$ is —$CH_3$. In another aspect, $R^1$ is phenyl.

In one aspect, the phosphonodithioate reagents are any one or more of compounds listed in Table 1.

TABLE 1

| Compound No. | Structure |
|---|---|
| 8a | |
| 8b | |
| 12a | |
| 12b | |
| 13a | |

TABLE 1-continued

| Compound No. | Structure |
|---|---|
| 13b | 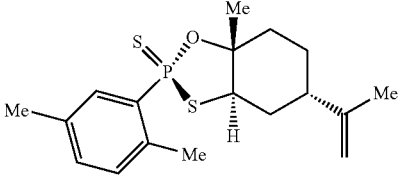 [SMILES: C=C(C)[C@H]1CC[C@@]2(C)O[P@@](=S)(c3cc(C)ccc3C)S[C@@H]2C1] |
| 14a | 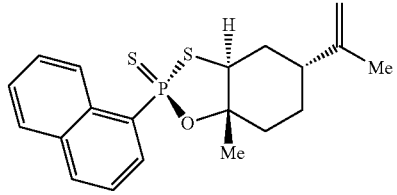 [SMILES: C=C(C)[C@@H]1CC[C@]2(C)O[P@](=S)(c3cccc4ccccc34)S[C@H]2C1] |
| 14b | 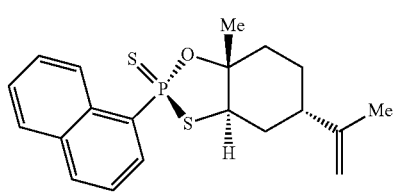 [SMILES: C=C(C)[C@H]1CC[C@@]2(C)O[P@@](=S)(c3cccc4ccccc34)S[C@@H]2C1] |
| 15a | 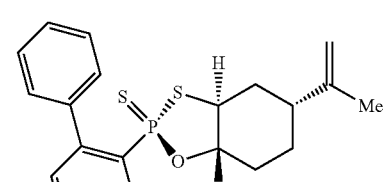 |
| 15b | 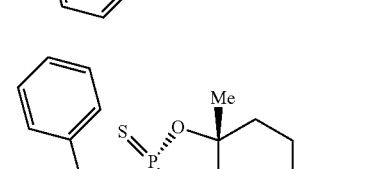 |
| 16a | 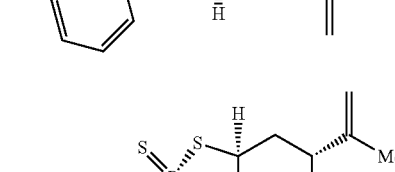 |
| 16b | 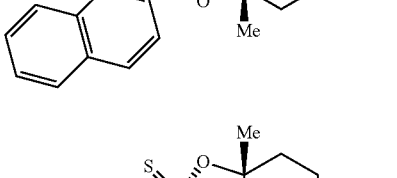 |
| 17a | 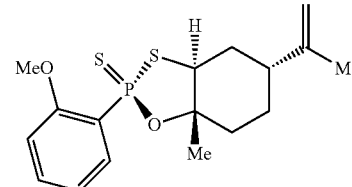 |
| 17b | 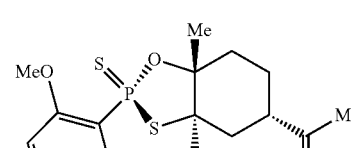 |
| 18a | 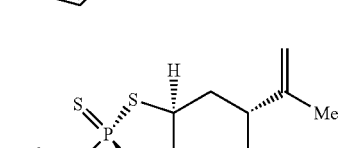 |
| 18b | 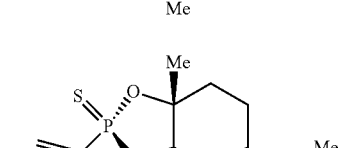 |
| 19a | 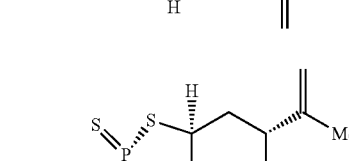 |
| 19b | 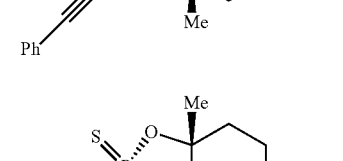 |

In one aspect, the phosphonodithioate reagents of the disclosure have an optical purity or enantiomeric excess (as determined by methods standard in the art) of at least 50% (i.e., at least 75% of one enantiomer and at most 25% of the other enantiomer), at least 60%, at least 70%, at least 80%, at least 90%, at least 91%, at least 92%, at least 93%, at least 94%, at least 95%, at least 96%, at least 97%, at least 98%, or at least 99%.

b. Thiophosphinic Acid Ester Reagent

In another aspect, the present disclosure provides thiophosphinic acid ester reagents represented by Formula (IIIa):

(IIIa)

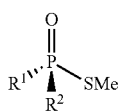

or an enantiomer thereof;
wherein
each of $R^1$ and $R^2$ is $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl; wherein each of $R^1$ and $R^2$ is optionally substituted with one or more, the same or different, $R^a$ groups;
$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl.

In one aspect, the thiophosphinic acid ester reagents are any one or more of compounds listed in Table 2

TABLE 2

| Compound No. | Structure |
|---|---|
| 11a | |
| 11b | |
| 20a | |
| 20b | |
| 21a | |
| 21b | |

TABLE 2-continued

| Compound No. | Structure |
|---|---|
| 22a | |
| 22b | |
| 23a | |
| 23b | |
| 24a | |
| 24b | |
| 25a | |
| 25b | |

In one aspect, the thiophosphinic acid ester reagents of the disclosure have an optical purity or enantiomeric excess (as determined by methods standard in the art) of at least 50% (i.e., at least 75% of one enantiomer and at most 25% of the other enantiomer), at least 60%, at least 70%, at least 80%, at least 90%, at least 91%, at least 92%, at least 93%, at least 94%, at least 95%, at least 96%, at least 97%, at least 98%, or at least 99%.

c. Organophosphinate Reagents

In another aspect, the present disclosure provides the organophosphinate reagents represented by Formula (IVa):

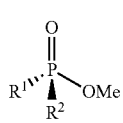

(IVa)

wherein each of $R^1$ and $R^2$ is $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl;

wherein each of $R^1$ and $R^2$ is optionally substituted with one or more, the same or different, $R^a$ groups;

$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl; or an enantiomer thereof.

In one aspect, the organophosphinate reagents are any one or more of compounds listed in Table 3.

TABLE 3

| Compound No. | Structure |
|---|---|
| 28a | 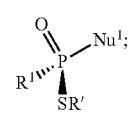 |
| 28b | |
| 29a | |
| 29b | |
| 30a | |
| 30b | |

In one aspect, the organophosphinate reagents of the disclosure have an optical purity or enantiomeric excess (as determined by methods standard in the art) of at least 50% (i.e., at least 75% of one enantiomer and at most 25% of the other enantiomer), at least 60%, at least 70%, at least 80%, at least 90%, at least 91%, at least 92%, at least 93%, at least 94%, at least 95%, at least 96%, at least 97%, at least 98%, or at least 99%.

d. Nucleoside-Loaded Organophosphorus Reagents

In one aspect, the present disclosure provides the nucleoside-loaded organophosphorus reagents represented by Formula (VII) or (VIIa):

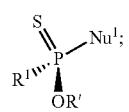

(VII)

(VIIa)

or a diastereomer thereof, wherein $R^1$ is $C_{1-6}$ alkyl, $C_{2-6}$ alkenyl, or $C_{2-6}$ alkynyl;

R' is $C_{1-6}$ alkyl, $C_{2-6}$ alkenyl, or $C_{2-6}$ alkynyl;

$Nu^1$ is a nucleoside, and wherein $Nu^1$ optionally comprises, independently of each other, one or more, the same or different, modification or one or more, the same or different, protecting group.

In one aspect, each of $R^1$ and R' is $—CH_3$.

In one aspect, $Nu^1$ is a nucleoside selected from the group consisting of

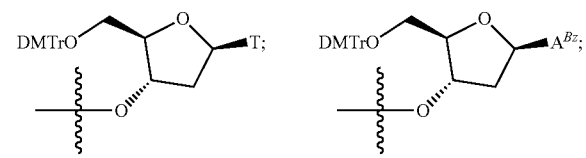

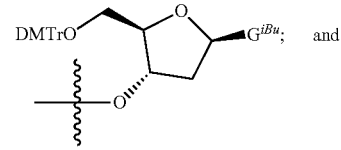

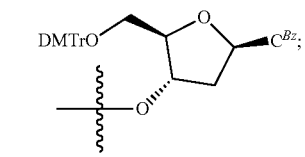

wherein
T is

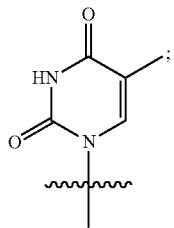 [SMILES: *n1cc(C)c(=O)[nH]c1=O]

$A^{Bz}$ is

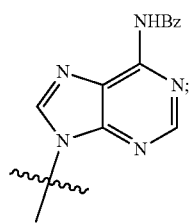

$G^{iBu}$ is

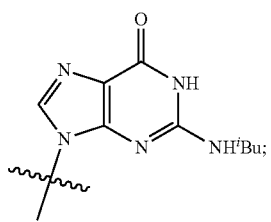

and
$C^{Bz}$ is

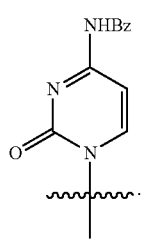

In one aspect, the nucleoside-loaded organophosphorus reagents are any one or more of compounds listed in Table 4

TABLE 4

| Compound No. | Structure |
| --- | --- |
| ($R_p$)-40 | |
| ($S_p$)-40 | |
| ($R_p$)-41 | |
| ($S_p$)-41 | |
| ($R_p$)-42 | |
| ($S_p$)-42 | |
| ($R_p$)-43 | |
| ($S_p$)-43 | |

In one aspect, the nucleoside-loaded organophosphorus reagents of the disclosure have an diastereomer ratio ("d.r." as determined by methods standard in the art) of at least 5:1, at least 10:1, at least 15:1, at least 20:1, at least 25:1, at least 30:1, at least 35:1, at least 40:1, at least 45:1, at least 50:1, at least 55:1, at least 60:1, at least 65:1, at least 70:1, at least 75:1, at least 80:1, at least 85:1, at least 90:1, at least 95:1, or at least 99:1.

In one aspect, the nucleoside is a ribonucleoside. In another aspect, the nucleoside is deoxyribonucleoside.

Nucleosides can be naturally occurring nucleosides, or non-naturally occurring nucleoside analogs. "Nucleoside analogs" as used herein are variants of natural nucleosides, such as DNA or RNA nucleosides, by virtue of modifications in the sugar and/or base moieties. Analogs could in principle be merely "silent" or "equivalent" to the natural nucleosides in the context of an oligonucleotide, i.e. have no functional effect on the way the oligonucleotide works. Such "equivalent" analogs can nevertheless be useful if, for example, they are easier or cheaper to manufacture, or are more stable to storage or manufacturing conditions, or represent a tag or label. In some aspects, however, the analogs will have a functional effect on the way in which the oligonucleotide functions; for example by producing increased binding affinity to the target and/or increased resistance to intracellular nucleases and/or increased ease of transport into the cell.

Useful nucleosides employed herein can also include modified sugars. 2'-sugar modifications include fluoro, O-alkyl, O-alkylamino, O-alkylalkoxy, protected O-alkylamino, O-alkylaminoalkyl, O-alkyl imidazole, and polyethers of the formula (O-alkyl)$_m$, where m is 1 to about 10. Preferred among these polyethers are linear and cyclic polyethylene glycols (PEGs), and PEG-containing groups, such as crown ethers and those which are disclosed by Ouchi et al., *Drug Design and Discovery* 1992, 9, 93; Ravasio et al., *J. Org. Chem.* 1991, 56, 4329; and Delgardo et. al., *Critical Reviews in Therapeutic Drug Carrier Systems* 1992, 9, 249, each of which is hereby incorporated by reference in its entirety. Further nucleosides embodying sugar modifications are disclosed in Cook, Anti-Cancer Drug Design, 1991, 6, 585-607 and US Publication No. 2016/237427, hereby incorporated by reference in their entirety. Fluoro, O-alkyl, O-alkylamino, O-alkyl imidazole, O-alkylaminoalkyl, and alkyl amino substitutions are described in U.S. Pat. No. 6,166,197, entitled "Oligomeric Compounds having Pyrimidine Nucleotide(s) with 2' and 5' Substitutions," hereby incorporated by reference in its entirety.

Additional useful nucleosides having 2'-sugar modifications include 2'-SR and 2'-NR$_2$ groups, where each R is, independently, hydrogen, a protecting group or substituted or unsubstituted alkyl, alkenyl, or alkynyl. 2'-SR nucleosides are disclosed in U.S. Pat. No. 5,670,633, issued Sep. 23, 1997, hereby incorporated by reference in its entirety.

Useful nucleosides also include nucleosides derivatized with selenium (Se). Examples of Se-derivatized nucleosides include nucleosides where O-atom at the positions 2', and/or 5' of the sugar have been replaced with Se. Other examples include oxygen replacement with Se in the furanose ring, nucleobases and non-bridging phosphates. Such nucleic acids are described in, for example, Pallan et al., *Nat. Protoc.*, 2(3):647-51 (2007), and *Nat. Protoc.*, 2(3); 640-646 (2007), hereby incorporated by reference in their entirety.

Other examples of suitable nucleosides include boron containing nucleosides, such as those described in Schinazi et al., *Nucleosides and Nucleotides*, 17(635-647 (1998); *Biochem.*, 35(18):5741-5746 (1996); *J. Org. Chem.*, 79(8): 3465-3472 (2014), hereby incorporated by reference in their entirety.

Additional useful nucleoside analogs include, but are not limited to, Locked Nucleic Acid (LNA); 2'-O-alkyl-RNA; 2'-amino-DNA; 2'-fluoro-DNA; arabino nucleic acid (ANA); 2'-fluoro-ANA, hexitol nucleic acid (HNA), intercalating nucleic acid (INA), constrained ethyl nucleoside (cEt), 2'-O-methyl nucleic acid (2'-OMe), 2'-O-methoxyethyl nucleic acid (2'-MOE), or any combination thereof.

"Hexitol nucleic acids" or "HNA" are composed of phosphorylated 2,3-dideoxy-D-arabino-hexitol units with a nucleobase situated in the 2-[S]-position.

"cEt" or "constrained ethyl" means a bicyclic nucleoside having a sugar moiety comprising a bridge connecting the 4'-carbon and the 2'-carbon, wherein the bridge has the formula: 4'-CH(CH$_3$)-0-2'.

"2'-O-methoxyethyl" (also 2'-MOE and 2'-O(CH$_2$)$_2$—OCH$_3$ and MOE) refers to an O-methoxy-ethyl modification at the 2' position of a furanosyl ring. A 2'-O-methoxyethyl modified sugar is a modified sugar.

"2'-F" refers to modification of the 2' position of the furanosyl sugar ring to comprise a fluoro group.

As used herein, "2'-OMe" or "2'-OCH$_3$" or "2'-O-methyl" each refers to modification at the 2' position of the furanosyl sugar ring to comprise a —OCH$_3$ group.

Examples of suitable nucleotide analogs are provided by WO2007/031091, which is incorporated by reference in its entirety, or are referenced therein.

Incorporation of affinity-enhancing nucleotide analogs in an oligomer, such as LNA or 2'-substituted sugars, can allow the size of the specifically binding oligomer to be reduced, and can also reduce the upper limit to the size of the oligomer before non-specific or aberrant binding takes place.

In some embodiments, the nucleoside is a nucleoside analog that includes a bicyclic sugar. Non-limiting examples of the bicyclic sugar includes cEt, 2',4'-constrained 2'-O-methoxyethyl (cMOE), LNA, α-LNA, β-LNA, 2'-O,4'-C-ethylene-bridged nucleic acids (ENA), amino-LNA, oxy-LNA, or thio-LNA.

The term "LNA" refers to a bicyclic nucleoside analog, known as "Locked Nucleic Acid". It can refer to an LNA monomer, or, when used in the context of an "LNA oligonucleotide," LNA refers to an oligonucleotide containing one or more such bicyclic nucleotide analogs. LNA nucleosides are characterized by the presence of a linker group (such as a bridge) between C2' and C4' of the ribose sugar ring. This bridge includes, but is not limited to, a biradical (bivalent group) selected from —CH$_2$—O—, —CH$_2$—S—, —CH$_2$—NH—, —CH$_2$—N(CH$_3$)—, —CH$_2$—CH$_2$—O—, —CH$_2$—CH(CH$_3$)—, —CH$_2$—CH$_2$—S—, —CH$_2$—CH$_2$—NH—, —CH$_2$—CH$_2$—CH$_2$—, —CH$_2$—CH$_2$—CH$_2$—O—, —CH$_2$—CH$_2$—CH(CH$_3$)—, —CH=CH—CH$_2$—, —CH$_2$—O—CH$_2$—O—, —CH$_2$—NH—O—, —CH$_2$—N(CH$_3$)—O—, —CH$_2$—O—CH$_2$—, —CH(CH$_3$)—O—, and —CH(CH$_2$—O—CH$_3$)—O—, and/or, —CH$_2$—CH$_2$—, and —CH=CH— For all chiral centers, asymmetric groups can be found in either R or S orientation.

In some embodiments, the biradical can be —C(R$^a$R$^b$)—O—C(R$^c$R$^d$)—O—, wherein R$^a$, R$^b$, R$^c$, and R$^d$ are independently selected from the group consisting of hydrogen, halogen, C$_{1-6}$ alkyl, substituted C$_{1-6}$ alkyl, C$_{2-6}$ alkenyl, substituted C$_{2-6}$ alkenyl, C$_{2-6}$ alkynyl or substituted C$_{2-6}$ alkynyl, C$_{1-6}$ alkoxyl, substituted C$_{1-6}$ alkoxyl, acyl, substituted acyl, C$_{1-6}$ aminoalkyl or substituted C$_{1-6}$ aminoalkyl, such as hydrogen.

Suitable bicyclic nucleosides are disclosed in WO 2007/134181, WO2008/154401, WO2008/150729, WO2009/067647 (alpha-L-bicyclic nucleic acids analogs) and WO2009006478A, all of which are hereby incorporated by reference in its entirety.

Further bicyclic nucleoside analogs and their use in antisense oligonucleotides are disclosed in WO2011/115818, WO2011/085102, WO2011/017521, WO2009/

100320, WO2010/036698, WO2009/124295 and WO2009/006478, each of which are incorporated by reference herein in their entireties.

The term "thio-LNA" comprises a locked nucleoside in which Y in general Formula III below is selected from S or —CH₂—S—. Thio-LNA can be in both beta-D and alpha-L-configuration.

The term "amino-LNA" comprises a locked nucleoside in which Y in general Formula III below is selected from —N(H)—, N(R)—, CH₂—N(H)—, and —CH₂—N(R)— where R is selected from hydrogen and $C_{1-4}$-alkyl. Amino-LNA can be in both beta-D and alpha-L-configuration.

The term "oxy-LNA" comprises a locked nucleoside in which Y in general Formula III below represents —O—. Oxy-LNA can be in both beta-D and alpha-L-configuration.

The term "ENA" comprises a locked nucleoside in which Y in general Formula III below is —CH₂—O— (where the oxygen atom of —CH₂—O— is attached to the 2'-position relative to the base B). $R^e$ is hydrogen or methyl.

In some exemplary embodiments LNA is selected from beta-D-oxy-LNA, alpha-L-oxy-LNA, beta-D-amino-LNA and beta-D-thio-LNA.

In some embodiments the nucleoside analogs can be, for example: 2'-O-alkyl-RNA units, 2'-amino-DNA units, 2'-fluoro-DNA units, LNA units, arabino nucleic acid (ANA) units, 2'-fluoro-ANA units, HNA units, INA (intercalating nucleic acid—Christensen, 2002. Nucl. Acids. Res. 2002 30: 4918-4925, hereby incorporated by reference) units and 2'-MOE units.

The term "nucleobase" refers to the base moiety of a nucleotide and covers both naturally occurring as well as non-naturally occurring variants. Thus, "nucleobase" covers not only the known purine and pyrimidine heterocycles but also heterocyclic analogs and tautomers thereof.

Typical nucleobases include, but are not limited to adenine, guanine, cytosine, thymidine, uracil, xanthine, hypoxanthine, 5-methylcytosine, isocytosine, pseudoisocytosine, 5-bromouracil, 5-propynyluracil, 6-aminopurine, 2-aminopurine, inosine, diaminopurine, and 2-chloro-6-aminopurine.

In some embodiments, the nucleoside comprises a naturally-occurring nucleobase, such as adenine, guanine, cytosine, uridine, thymine, 5-methyl cytosine, etc. In other embodiments, the nucleoside comprises other natural nucleobases, as well as modified nucleobases, such as xanthine, hypoxanthine, 2-aminoadenine, 6-methyl and other alkyl derivatives of adenine and guanine, 2-propyl and other alkyl derivatives of adenine and guanine, 5-halo uracil and cytosine, 6-azo uracil, cytosine and thymine, 5-uracil (pseudo uracil), 4-thiouracil, 8-halo, oxa, amino, thiol, thioalkyl, hydroxyl and other 8-substituted adenines and guanines, 5-trifluoromethyl and other 5-substituted uracils and cytosines, 7-methylguanine. Further naturally- and non-naturally-occurring nucleobases include those disclosed in U.S. Pat. No. 3,687,808 (Merigan et al.); in Sanghvi, in *Antisense Research and Application*, Chapter 15, S. T. Crooke and B. Lebleu, Eds., CRC Press, 1993; in Englisch et al., *Angewandte Chemie*, International Edition, 1991, 30, 613-722 (particularly, pages 622 and 623); in the Concise Encyclopedia of Polymer Science and Engineering, J. I. Kroschwitz, Ed., John Wiley & Sons, 1990, pages 858-859; in Zhang, et al., Nature, 2017, 551, 644-647 (hydrophobic bases); in Feldman and Romesberg, *Acc. Chem. Res.* 2018, 51, 394-403; and in Cook, Anti-Cancer Drug Design, 1991, 6, 585-607, each of which is hereby incorporated by reference in its entirety.

Other examples of modifications of nucleosides and nucleobases described herein include, but are not limited to the following: 2-methylthio-N6-(cis-hydroxyisopentenyl) adenosine; 2-methylthio-N6-methyladenosine; 2-methylthio-N6-threonyl carbamoyladenosine; N6-glycinylcarbamoyladenosine; N6-isopentenyladenosine; N6-methyladenosine; N6-threonylcarbamoyladenosine; 1,2'-O-dimethyladenosine; 1-methyladenosine; 2'-O-methyladenosine; 2'-O-ribosyladenosine (phosphate); 2-methyladenosine; 2-methylthio-N6 isopentenyladenosine; 2-methylthio-N6-hydroxynorvalyl carbamoyladenosine; 2'-O-methyladenosine; 2'-O-ribosyladenosine (phosphate); Isopentenyladenosine; N6-(cis-hydroxyisopentenyl)adenosine; N6,2'-O-dimethyladenosine; N6,2'-O-dimethyladenosine; N6,N6,2'-O-trimethyladenosine; N6,N6-dimethyladenosine; N6-acetyladenosine; N6-hydroxynorvalylcarbamoyladenosine; N6-methyl-N6-threonylcarbamoyladenosine; 2-methylthio-N6-isopentenyladenosine; 7-deaza-adenosine; N1-methyl-adenosine; N6, N6 (dimethyl)adenine; N6-cis-hydroxy-isopentenyl-adenosine; α-thio-adenosine; 2 (amino)adenine; 2 (aminopropyl)adenine; 2 (methylthio) N6 (isopentenyl)adenine; 2-(alkyl)adenine; 2-(aminoalkyl)adenine; 2-(aminopropyl) adenine; 2-(halo)adenine; 2-(propyl)adenine; 2'-amino-2'-deoxy-adenosine triphosphate; 2'-azido-2'-deoxy-adenosine triphosphate; 2'-deoxy-2'-a-aminoadenosine triphosphate; 2'-deoxy-2'-a-azidoadenosine triphosphate; 6-(alkyl)adenine; 6-(methyl)adenine; 7 (deaza)adenine; 8 (alkynyl) adenine; 8-(alkenyl)adenine; 8-(alkyl)adenine; 8-(alkynyl) adenine; 8-(amino)adenine; 8-(halo)adenine; 8-(hydroxyl) adenine; 8-(thioalkyl)adenine; 8-(thiol)adenine; 8-azido-adenosine; aza adenine; deaza adenine; N6 (methyl)adenine; N6-(isopentyl)adenine; 7-deaza-8-aza-adenosine; 7-methyladenine; 1-deazaadenosine triphosphate; 2'fluoro-N6-Bz-deoxyadenosine triphosphate; 2'-methoxy-2-amino-adenosine triphosphate; 2'O-methyl-N6-Bz-deoxyadenosine triphosphate; 2'-a-Ethynyladenosine triphosphate; 2-amino-adenine; 2-aminoadenosine triphosphate; 2-amino-adenosine triphosphate; 2'-a-trifluoromethyladenosine triphosphate; 2-azidoadenosine triphosphate; 2'-b-ethynyladenosine triphosphate; 2-bromoadenosine triphosphate; 2'-b-trifluoromethyladenosine triphosphate; 2-chloroadenosine triphosphate; 2'-deoxy-2',2'-difluoroadenosine triphosphate; 2'-deoxy-2'-a-mercaptoadenosine triphosphate; 2'-deoxy-2'-a-thiomethoxyadenosine triphosphate; 2'-deoxy-2'-b-aminoadenosine triphosphate; 2'-deoxy-2'-b-azidoadenosine triphosphate; 2'-deoxy-2'-b-bromoadenosine triphosphate; 2'-deoxy-2'-b-chloroadenosine triphosphate; 2'-deoxy-2'-b-fluoroadenosine triphosphate; 2'-deoxy-2'-b-iodoadenosine triphosphate; 2'-deoxy-2'-b-mercaptoadenosine triphosphate; 2'-deoxy-2'-b-thiomethoxyadenosine triphosphate; 2-fluoroadenosine triphosphate; 2-iodoadenosine triphosphate; 2-mercaptoadenosine triphosphate; 2-methoxy-adenine; 2-methylthio-adenine; 2-trifluoromethyladenosine triphosphate; 3-deaza-3-bromoadenosine triphosphate; 3-deaza-3-chloroadenosine triphosphate; 3-deaza-3-fluoroadenosine triphosphate; 3-deaza-3-iodoadenosine triphosphate; 3-deazaadenosine triphosphate; 4'-azidoadenosine triphosphate; 4'-carbocyclic adenosine triphosphate; 4'-ethynyladenosine triphosphate; 5'-homo-adenosine triphosphate; 8-aza-adenosine triphosphate; 8-bromoadenosine triphosphate; 8-Trifluoromethyladenosine triphosphate; 9-deazaadenosine triphosphate; 2-aminopurine; 7-deaza-2,6-diaminopurine; 7-deaza-8-aza-2,6-diaminopurine; 7-deaza-8-aza-2-aminopurine; 2,6-diaminopurine; 7-deaza-8-aza-adenine, 7-deaza-2-aminopurine; 2-thiocytidine; 3-methylcytidine; 5-formylcytidine;

5-hydroxymethylcytidine; 5-methylcytidine; N4-acetylcytidine; 2'-O-methylcytidine; 5,2'-O-dimethylcytidine; 5-formyl-2'-O-methylcytidine; Lysidine; N4,2'-O-dimethylcytidine; N4-acetyl-2'-O-methylcytidine; N4-methylcytidine; N4,N4-Dimethyl-2'-OMe-Cytidine TP; 4-methylcytidine; 5-aza-cytidine; pseudo-iso-cytidine; pyrrolo-cytidine; α-thiocytidine; 2-(thio)cytosine; 2'-amino-2'-deoxy-cytidine triphosphate; 2'-azido-2'-deoxycytidine triphosphate; 2'-deoxy-2'-a-aminocytidine triphosphate; 2'-deoxy-2'-a-azidocytidine triphosphate; 3 (deaza) 5 (aza)cytosine; 3 (methyl) cytosine; 3-(alkyl)cytosine; 3-(deaza) 5 (aza)cytosine; 3-(methyl)cytidine; 4,2'-O-dimethylcytidine; 5 (halo)cytosine; 5 (methyl)cytosine; 5 (propynyl)cytosine; 5 (trifluoromethyl)cytosine; 5-(alkyl)cytosine; 5-(alkynyl)cytosine; 5-(halo)cytosine; 5-(propynyl)cytosine; 5-(trifluoromethyl) cytosine; 5-bromo-cytidine; 5-iodo-cytidine; 5-propynyl cytosine; 6-(azo)cytosine; 6-aza-cytidine; aza cytosine; deaza cytosine; N4 (acetyl)cytosine; 1-methyl-1-deaza-pseudoisocytidine; 1-methyl-pseudoisocytidine; 2-methoxy-5-methyl-cytidine; 2-methoxy-cytidine; 2-thio-5-methyl-cytidine; 4-methoxy-1-methyl-pseudoisocytidine; 4-methoxy-pseudoisocytidine; 4-thio-1-methyl-1-deaza-pseudoisocytidine; 4-thio-1-methyl-pseudoisocytidine; 4-thio-pseudoisocytidine; 5-aza-zebularine; 5-methyl-zebularine; pyrrolo-pseudoisocytidine; zebularine; (E)-5-(2-bromo-vinyl)cytidine triphosphate; 2,2'-anhydro-cytidine triphosphate hydrochloride; 2'fluor-N4-Bz-cytidine triphosphate; 2'fluoro-N4-acetyl-cytidine triphosphate; 2'-O-methyl-N4-acetyl-cytidine triphosphate; 2'O-methyl-N4-Bz-cytidine triphosphate; 2'-a-ethynylcytidine triphosphate; 2'-a-trifluoromethylcytidine triphosphate; 2'-b-ethynylcytidine triphosphate; 2'-b-trifluoromethylcytidine triphosphate; 2'-deoxy-2',2'-difluorocytidine triphosphate; 2'-deoxy-2'-a-mercaptocytidine triphosphate; 2'-deoxy-2'-a-thiomethoxycytidine triphosphate; 2'-deoxy-2'-b-aminocytidine triphosphate; 2'-deoxy-2'-b-azidocytidine triphosphate; 2'-deoxy-2'-b-bromocytidine triphosphate; 2'-deoxy-2'-b-chlorocytidine triphosphate; 2'-deoxy-2'-b-fluorocytidine triphosphate; 2'-deoxy-2'-b-iodocytidine triphosphate; 2'-deoxy-2'-b-mercaptocytidine triphosphate; 2'-deoxy-2'-b-thiomethoxycytidine triphosphate; 2'-O-methyl-5-(1-propynyl) cytidine triphosphate; 3'-ethynylcytidine triphosphate; 4'-azidocytidine triphosphate; 4'-carbocyclic cytidine triphosphate; 4'-ethynylcytidine triphosphate; 5-(1-propynyl) ara-cytidine triphosphate; 5-(2-chloro-phenyl)-2-thiocytidine triphosphate; 5-(4-amino-phenyl)-2-thiocytidine triphosphate; 5-aminoallyl-cytidine triphosphate; 5-cyano-cytidine triphosphate; 5-ethynylara-cytidine triphosphate; 5-ethynylcytidine triphosphate; 5'-homo-cytidine triphosphate; 5-methoxycytidine triphosphate; 5-trifluoromethyl-cytidine triphosphate; N4-amino-cytidine triphosphate; N4-benzoyl-cytidine triphosphate; pseudoisocytidine; 7-methylguanosine; N2,2'-O-dimethylguanosine; N2-methylguanosine; wyosine; 1,2'-O-dimethylguanosine; 1-methyl-guanosine; 2'-O-methylguanosine; 2'-O-ribosylguanosine (phosphate); 2'-O-methylguanosine; 2'-O-ribosylguanosine (phosphate); 7-aminomethyl-7-deazaguanosine; 7-cyano-7-deazaguanosine; archaeosine; methylwyosine; N2,7-dimethylguanosine; N2,N2,2'-O-trimethylguanosine; N2,N2,7-trimethylguanosine; N2,N2-dimethylguanosine; N2,7,2'-O-trimethylguanosine; 6-thio-guanosine; 7-deaza-guanosine; 8-oxo-guanosine; N1-methyl-guanosine; α-thio-guanosine; 2 (propyl)guanine; 2-(alkyl)guanine; 2'-Amino-2'-deoxy-guanosine triphosphate; 2'-Azido-2'-deoxyguanosine triphosphate; 2'-deoxy-2'-a-aminoguanosine triphosphate; 2'-deoxy-2'-a-azidoguanosine triphosphate; 6-(alkyl)guanine; 6-methyl-guanosine; 7-(alkyl)guanine; 7-(deaza)guanine; 7-(methyl)guanine; 8-(alkenyl)guanine; 8-(alkyl)guanine; 8-(alkynyl)guanine; 8-(amino)guanine; 8-(halo) guanine; 8-(hydroxyl)guanine; 8-(thioalkyl)guanine; 8-(thiol)guanine; aza guanine; deaza guanine; N-(methyl) guanine; 1-methyl-6-thio-guanosine; 6-methoxy-guanosine; 6-thio-7-deaza-8-aza-guanosine; 6-thio-7-deaza-guanosine; 6-thio-7-methyl-guanosine; 7-deaza-8-aza-guanosine; 7-methyl-8-oxo-guanosine; N2,N2-dimethyl-6-thio-guanosine; N2-methyl-6-thio-guanosine; 1-me-guanosine triphosphate; 2'fluoro-N2-isobutyl-guanosine triphosphate; 2'O-methyl-N2-isobutyl-guanosine triphosphate; 2'-a-ethynylguanosine triphosphate; 2'-a-trifluoromethylguanosine triphosphate; 2'-b-ethynylguanosine triphosphate; 2'-b-trifluoromethylguanosine triphosphate; 2'-deoxy-2',2'-difluoroguanosine triphosphate; 2'-deoxy-2'-a-mercaptoguanosine triphosphate; 2'-deoxy-2'-a-thiomethoxyguanosine triphosphate; 2'-deoxy-2'-b-aminoguanosine triphosphate; 2'-deoxy-2'-b-azidoguanosine triphosphate; 2'-deoxy-2'-b-bromoguanosine triphosphate; 2'-deoxy-2'-b-chloroguanosine triphosphate; 2'-deoxy-2'-b-fluoroguanosine triphosphate; 2'-deoxy-2'-b-iodoguanosine triphosphate; 2'-deoxy-2'-b-mercaptoguanosine triphosphate; 2'-deoxy-2'-b-thiomethoxyguanosine triphosphate; 4'-azidoguanosine triphosphate; 4'-carbocyclic guanosine triphosphate; 4'-ethynylguanosine triphosphate; 5'-homo-guanosine triphosphate; 8-bromo-guanosine triphosphate; 9-deazaguanosine triphosphate; N2-isobutyl-guanosine triphosphate; 1-methylinosine; inosine; 1,2'-O-dimethylinosine; 7-methylinosine; 2'-O-methylinosine; epoxyqueuosine; galactosyl-queuosine; mannosylqueuosine; queuosine; allyamino-thymidine; aza thymidine; deaza thymidine; deoxythymidine; 2-thiouridine; 3-methyluridine; 5-carboxymethyluridine; 5-hydroxyuridine; 5-methyluridine; 5-taurinomethyl-2-thiouridine; 5-taurinomethyluridine; dihydrouridine; pseudouridine; 1-methyl-3-(3-amino-5-carboxypropyl)pseudouridine; 1-methylpseduouridine; 1-ethyl-pseudouridine; 2'-O-methyluridine; 2'-O-methylpseudouridine; 2'-O-methyluridine; 2-thio-2'-O-methyluridine; 3-(3-amino-3-carboxypropyl)uridine; 3,2'-O-dimethyluridine; 3-methyl-pseudo-uridine triphosphate; 4-thiouridine; 5-(carboxyhydroxymethyl)uridine; 5-(carboxyhydroxymethyl)uridine methyl ester; 5,2'-O-dimethyluridine; 5,6-dihydro-uridine; 5-aminomethyl-2-thiouridine; 5-carbamoylmethyl-2'-O-methyluridine; 5-carbamoylmethyluridine; 5-carboxyhydroxymethyluridine; 5-carboxyhydroxymethyluridine methyl ester; 5-carboxymethylaminomethyl-2'-O-methyluridine; 5-carboxymethylaminomethyl-2-thiouridine; 5-carboxymethylaminomethyluridine; 5-carbamoylmethyluridine triphosphate; 5-methoxycarbonylmethyl-2'-O-methyluridine; 5-methoxycarbonylmethyl-2-thiouridine; 5-methoxycarbonylmethyluridine; 5-methoxyuridine; 5-methyl-2-thiouridine; 5-methylaminomethyl-2-selenouridine; 5-methylaminomethyl-2-thiouridine; 5-methylaminomethyluridine; 5-methyldihydrouridine; 5-oxyacetic acid-uridine triphosphate; 5-oxyacetic acid-methyl ester-uridine triphosphate; N1-methyl-pseudo-uracil; N1-ethyl-pseudo-uracil; uridine 5-oxyacetic acid; uridine 5-oxyacetic acid methyl ester; 3-(3-Amino-3-carboxypropyl)-uridine triphosphate; 5-(isopentenylaminomethyl)-2-thiouridine triphosphate; 5-(isopentenylaminomethyl)-2'-O-methyluridine triphosphate; 5-(iso-pentenylaminomethyl)uridine triphosphate; 5-propynyl uracil; α-thio-uridine; 1 (aminoalkylamino-carbonylethylenyl)-2(thio)-pseudouracil; 1 (aminoalkylaminocarbonylethylenyl)-2,4-(dithio)pseudouracil;

(aminoalkylaminocarbonylethylenyl)-4 (thio)pseudouracil; 1 (aminoalkylaminocarbonylethylenyl)-pseudouracil; 1 (aminocarbonylethylenyl)-2(thio)-pseudouracil; 1 (aminocarbonylethylenyl)-2,4-(dithio)pseudouracil; 1 (aminocarbonylethylenyl)-4 (thio)pseudouracil; 1 (aminocarbonylethylenyl)-pseudouracil; 1 substituted 2(thio)-pseudouracil; 1 substituted 2,4-(dithio)pseudouracil; 1 substituted 4 (thio)pseudouracil; 1 substituted pseudouracil; 1-(aminoalkylamino-carbonylethylenyl)-2-(thio)-pseudouracil; 1-Methyl-3-(3-amino-3-carboxypropyl) pseudouridine triphosphate; 1-methyl-3-(3-amino-3-carboxypropyl) pseudo-uridine triphosphate; 1-methyl-pseudo-uridine triphosphate; 1-ethyl-pseudo-uridine triphosphate; 2 (thio) pseudouracil; 2' deoxy uridine; 2' fluorouridine; 2-(thio) uracil; 2,4-(dithio)pseudouracil; 2' methyl, 2'amino, 2'azido, 2'fluoro-guanosine; 2'-amino-2'-deoxy-uridine triphosphate; 2'-azido-2'-deoxy-uridine triphosphate; 2'-azido-deoxyuridine triphosphate; 2' deoxy uridine; 2' fluorouridine; 2'-deoxy-2'-a-aminouridine triphosphate; 2'-deoxy-2'-a-azidouridine triphosphate; 2-methylpseudouridine; 3 (3 amino-3 carboxypropyl)uracil; 4-(thio)pseudouracil; 4-thiouracil; 5 (1,3-diazole-1-alkyl)uracil; 5 (2-aminopropyl)uracil; 5 (aminoalkyl)uracil; 5 (dimethylaminoalkyl)uracil; 5 (guanidiniumalkyl)uracil; 5 (methoxycarbonylmethyl)-2-(thio)uracil; 5 (methoxycarbonyl-methyl)uracil; 5 (methyl) 2 (thio)uracil; 5 (methyl) 2,4 (dithio)uracil; 5 (methyl) 4 (thio)uracil; 5 (methylaminomethyl)-2 (thio)uracil; 5 (methylaminomethyl)-2,4 (dithio)uracil; 5 (methylaminomethyl)-4 (thio) uracil; 5 (propynyl)uracil; 5 (trifluoromethyl)uracil; 5-(2-aminopropyl)uracil; 5-(alkyl)-2-(thio)pseudouracil; 5-(alkyl)-2,4 (dithio)pseudouracil; 5-(alkyl)-4 (thio) pseudouracil; 5-(alkyl)pseudouracil; 5-(alkyl)uracil; 5-(alkynyl)uracil; 5-(allylamino)uracil; 5-(cyanoalkyl)uracil; 5-(dialkylaminoalkyl)uracil; 5-(dimethylaminoalkyl) uracil; 5-(guanidiniumalkyl)uracil; 5-(halo)uracil; 5-(1,3-diazole-1-alkyl)uracil; 5-(methoxy)uracil; 5-(methoxycarbonylmethyl)-2-(thio)uracil; 5-(methoxycarbonyl-methyl)uracil; 5-(methyl) 2(thio)uracil; 5-(methyl) 2,4 (dithio)uracil; 5-(methyl) 4 (thio)uracil; 5-(methyl)-2-(thio)pseudouracil; 5-(methyl)-2,4 (dithio)pseudouracil; 5-(methyl)-4 (thio)pseudouracil; 5-(methyl)pseudouracil; 5-(methylaminomethyl)-2 (thio)uracil; 5-(methylaminomethyl)-2,4(dithio)uracil; 5-(methylaminomethyl)-4-(thio) uracil; 5-(propynyl)uracil; 5-(trifluoromethyl)uracil; 5-aminoallyl-uridine; 5-bromo-uridine; 5-iodo-uridine; 5-uracil; 6-(azo)uracil; 6-aza-uridine; allyamino-uracil; aza uracil; deaza uracil; N3 (methyl)uracil; pseudo-uridine triphosphate-1-2-ethanoic acid; pseudouracil; 4-thio-pseudo-uridine triphosphate; 1-carboxymethyl-pseudouridine; 1-methyl-1-deaza-pseudouridine; 1-propynyl-uridine; 1-taurinomethyl-1-methyl-uridine; 1-taurinomethyl-4-thio-uridine; 1-taurinomethyl-pseudouridine; 2-methoxy-4-thio-pseudouridine; 2-thio-1-methyl-1-deaza-pseudouridine; 2-thio-1-methyl-pseudouridine; 2-thio-5-aza-uridine; 2-thio-dihydropseudouridine; 2-thio-dihydrouridine; 2-thio-pseudouridine; 4-methoxy-2-thio-pseudouridine; 4-methoxy-pseudouridine; 4-thio-1-methyl-pseudouridine; 4-thio-pseudouridine; 5-aza-uridine; dihydropseudouridine; (±)1-(2-hydroxypropyl)pseudouridine triphosphate; (2R)-1-(2-hydroxypropyl)pseudouridine triphosphate; (2S)-1-(2-hydroxypropyl)pseudouridine triphosphate; (E)-5-(2-bromo-vinyl)ara-uridine triphosphate; (E)-5-(2-bromo-vinyl)uridine triphosphate; (Z)-5-(2-Bromo-vinyl)ara-uridine triphosphate; (Z)-5-(2-bromo-vinyl)uridine triphosphate; 1-(2,2,2-trifluoroethyl)-pseudo-uridine triphosphate; 1-(2,2,3,3,3-pentafluoropropyl)pseudouridine triphosphate; 1-(2,2-diethoxyethyl)pseudouridine triphosphate; 1-(2,4,6-trimethylbenzyl)pseudouridine triphosphate; 1-(2,4,6-trimethyl-benzyl)pseudo-uridine triphosphate; 1-(2,4,6-trimethyl-phenyl)pseudo-uridine triphosphate; 1-(2-smino-2-carboxyethyl)pseudo-uridine triphosphate; 1-(2-amino-ethyl)pseudo-uridine triphosphate; 1-(2-hydroxyethyl)pseudouridine triphosphate; 1-(2-methoxyethyl) pseudouridine triphosphate; 1-(3,4-bis-trifluoromethoxy-benzyl)pseudouridine triphosphate; 1-(3,4-dimethoxybenzyl)pseudouridine triphosphate; 1-(3-amino-3-carboxypropyl)pseudo-uridine triphosphate; 1-(3-amino-propyl)pseudo-uridine triphosphate; 1-(3-cyclopropyl-prop-2-ynyl)pseudouridinetriphosphate; 1-(4-amino-4-carboxybutyl)pseudo-uridine triphosphate; 1-(4-amino-benzyl)pseudo-uridine triphosphate; 1-(4-amino-butyl) pseudo-uridine triphosphate; 1-(4-amino-phenyl)pseudo-uridine triphosphate; 1-(4-azidobenzyl)pseudouridine triphosphate; 1-(4-bromobenzyl)pseudouridine triphosphate; 1-(4-chlorobenzyl)pseudouridine triphosphate; 1-(4-fluorobenzyl)pseudouridine triphosphate; 1-(4-iodobenzyl) pseudouridine triphosphate; 1-(4-methanesulfonylbenzyl) pseudouridine triphosphate; 1-(4-methoxybenzyl) pseudouridine triphosphate; 1-(4-methoxy-benzyl)pseudo-uridine triphosphate; 1-(4-methoxy-phenyl)pseudo-uridine triphosphate; 1-(4-methyl-benzyl)pseudo-uridine triphosphate; 1-(4-nitro-benzyl)pseudo-uridine triphosphate; 1(4-nitro-phenyl)pseudo-uridine triphosphate; 1-(4-thio-methoxybenzyl)pseudouridine triphosphate; 1-(4-trifluoromethoxybenzyl)pseudouridine triphosphate; 1-(4-trifluoromethylbenzyl)pseudouridine triphosphate; 1-(5-amino-pentyl)pseudo-uridine triphosphate; 1-(6-amino-hexyl)pseudo-uridine triphosphate; 1,6-dimethyl-pseudo-uridine triphosphate; 1-[3-(2-{2-[2-(2-aminoethoxy)-ethoxy]-ethoxy}-ethoxy)-propionyl]pseudouridine triphosphate; 1-{3-[2-(2-aminoethoxy)-ethoxy]-propionyl}pseudouridine triphosphate; 1-acetylpseudouridine triphosphate; 1-alkyl-6-(1-propynyl)-pseudo-uridine triphosphate; 1-alkyl-6-(2-propynyl)-pseudo-uridine triphosphate; 1-alkyl-6-allyl-pseudo-uridine triphosphate; 1-alkyl-6-ethynyl-pseudo-uridine triphosphate; 1-alkyl-6-homoallyl-pseudo-uridine triphosphate; 1-alkyl-6-vinyl-pseudo-uridine triphosphate; 1-allylpseudouridine triphosphate; 1-aminomethyl-pseudo-uridine triphosphate; 1-benzoylpseudouridine triphosphate; 1-benzyloxymethylpseudouridine triphosphate; 1-benzyl-pseudo-uridine triphosphate; 1-biotinyl-PEG2-pseudouridine triphosphate; 1-biotinylpseudouridine triphosphate; 1-butyl-pseudo-uridine triphosphate; 1-cyanomethylpseudouridine triphosphate; 1-cyclobutylmethyl-pseudo-uridine triphosphate; 1-cyclobutyl-pseudo-uridine triphosphate; 1-cycloheptylmethyl-pseudo-uridine triphosphate; 1-cycloheptyl-pseudo-uridine triphosphate; 1-cyclohexylmethyl-pseudo-uridine triphosphate; 1-cyclohexyl-pseudo-uridine triphosphate; 1-cyclooctylmethyl-pseudo-uridine triphosphate; 1-cyclooctyl-pseudo-uridine triphosphate; 1-cyclopentylmethyl-pseudo-uridine triphosphate; 1-cyclopentyl-pseudo-uridine triphosphate; 1-cyclopropylmethyl-pseudo-uridine triphosphate; 1-cyclopropyl-pseudo-uridine triphosphate; 1-hexyl-pseudo-uridine triphosphate; 1-homoallylpseudouridine triphosphate; 1-hydroxymethylpseudouridine triphosphate; 1-iso-propyl-pseudo-uridine triphosphate; 1-me-2-thio-pseudo-uridine triphosphate; 1-me-4-thio-pseudo-uridine triphosphate; 1-me-alpha-thio-pseudo-uridine triphosphate; 1-methanesulfonylmethylpseudouridine triphosphate; 1-methoxymethylpseudouridine triphosphate; 1-methyl-6-(2,2,2-trifluoroethyl)pseudo-uridine triphosphate; 1-methyl-6-(4-morpholino)-pseudo-uridine triphosphate; 1-methyl-6-(4-thiomorpholino)-pseudo-uridine triphosphate; 1-methyl- 6-(substituted phenyl)pseudo-uridine triphosphate; 1-methyl-6-amino-pseudo-uridine triphosphate; 1-methyl-6-azido-pseudo-uridine triphosphate; 1-methyl-6-bromo-pseudo-uridine triphosphate; 1-methyl-6-butyl-pseudo-uridine triphosphate; 1-methyl-6-chloro-pseudo-uridine triphosphate; 1-methyl-6-cyano-pseudo-uridine triphosphate; 1-methyl-6-dimethylamino-pseudo-uridine triphosphate; 1-methyl-6-ethoxy-pseudo-uridine triphosphate; 1-methyl-6-ethylcarboxylate-pseudo-uridine triphosphate; 1-methyl-6-ethyl-pseudo-uridine triphosphate; 1-methyl-6-fluoro-pseudo-uridine triphosphate; 1-methyl-6-formyl-pseudo-uridine triphosphate; 1-methyl-6-hydroxyamino-pseudo-uridine triphosphate; 1-methyl-6-hydroxy-pseudo-uridine triphosphate; 1-methyl-6-iodo-pseudo-uridine triphosphate; 1-methyl-6-iso-propyl-pseudo-uridine triphosphate; 1-methyl-6-methoxy-pseudo-uridine triphosphate; 1-methyl-6-methylamino-pseudo-uridine triphosphate; 1-methyl-6-phenyl-pseudo-uridine triphosphate; 1-methyl-6-propyl-pseudo-uridine triphosphate; 1-methyl-6-tert-butyl-pseudo-uridine triphosphate; 1-methyl-6-trifluoromethoxy-pseudo-uridine triphosphate; 1-methyl-6-trifluoromethyl-pseudo-uridine triphosphate; 1-morpholinomethylpseudouridine triphosphate; 1-pentyl-pseudo-uridine triphosphate; 1-phenyl-pseudo-uridine triphosphate; 1-pivaloylpseudouridine triphosphate; 1-propargylpseudouridine triphosphate; 1-propyl-pseudo-uridine triphosphate; 1-propynyl-pseudouridine; 1-p-tolyl-pseudo-uridine triphosphate; 1-tert-Butyl-pseudo-uridine triphosphate; 1-thiomethoxymethylpseudouridine triphosphate; 1-thiomorpholinomethylpseudouridine triphosphate; 1-trifluoroacetylpseudouridine triphosphate; 1-trifluoromethyl-pseudo-uridine triphosphate; 1-vinylpseudouridine triphosphate; 2,2'-anhydro-uridine triphosphate; 2'-bromo-deoxyuridine triphosphate; 2'-F-5-methyl-2'-deoxy-uridine triphosphate; 2'-methoxy-5-methyl-uridine triphosphate; 2'-methoxy-pseudo-uridine triphosphate; 2'-a-ethynyluridine triphosphate; 2'-a-trifluoromethyluridine triphosphate; 2'-b-ethynyluridine triphosphate; 2'-b-trifluoromethyluridine triphosphate; 2'-deoxy-2',2'-difluorouridinetriphosphate; 2'-deoxy-2'-a-mercaptouridine triphosphate; 2'-deoxy-2'-a-thiomethoxyuridine triphosphate; 2'-deoxy-2'-b-aminouridine triphosphate; 2'-deoxy-2'-b-azidouridine triphosphate; 2'-deoxy-2'-b-bromouridine triphosphate; 2'-deoxy-2'-b-chlorouridine triphosphate; 2'-deoxy-2'-b-fluorouridine triphosphate; 2'-deoxy-2'-b-iodouridine triphosphate; 2'-deoxy-2'-b-mercaptouridine triphosphate; 2'-deoxy-2'-b-thiomethoxyuridine triphosphate; 2-methoxy-4-thio-uridine; 2-methoxyuridine; 2'-O-methyl-5-(1-propynyl)uridine triphosphate; 3-alkyl-pseudo-uridine triphosphate; 4'-azidouridine triphosphate; 4'-carbocyclic uridinetriphosphate; 4'-ethynyluridine triphosphate; 5-(1-propynyl)ara-uridine triphosphate; 5-(2-ruranyl)uridine triphosphate; 5-cyanouridine triphosphate; 5-dimethylaminouridine triphosphate; 5'-homo-uridine triphosphate; 5-iodo-2'-fluoro-deoxyuridine triphosphate; 5-phenylethynyluridine triphosphate; 5-trideuteromethyl-6-deuterouridine triphosphate; 5-trifluoromethyl-uridine triphosphate; 5-vinylarauridine triphosphate; 6-(2,2,2-trifluoroethyl)-pseudo-uridine triphosphate; 6-(4-morpholino)-pseudo-uridine triphosphate; 6-(4-thiomorpholino)-pseudo-uridine triphosphate; 6-(substituted-phenyl)-pseudo-uridine triphosphate; 6-amino-pseudo-uridine triphosphate; 6-azido-pseudo-uridine triphosphate; 6-bromo-pseudo-uridine triphosphate; 6-butyl-pseudo-uridine triphosphate; 6-chloro-pseudo-uridine triphosphate; 6-cyano-pseudo-uridine triphosphate; 6-dimethylamino-pseudo-uridine triphosphate; 6-ethoxy-pseudo-uridine triphosphate; 6-ethylcarboxylate-pseudo-uridine triphosphate; 6-ethyl-pseudo-uridine triphosphate; 6-fluoro-pseudo-uridine triphosphate; 6-formyl-pseudo-uridine triphosphate; 6-hydroxyamino-pseudo-uridine triphosphate; 6-hydroxy-pseudo-uridine triphosphate; 6-iodo-pseudo-uridine triphosphate; 6-iso-propyl-pseudo-uridine triphosphate; 6-methoxy-pseudo-uridine triphosphate; 6-methylamino-pseudo-uridine triphosphate; 6-methyl-pseudo-uridine triphosphate; 6-phenyl-pseudo-uridine triphosphate; 6-propyl-pseudo-uridine triphosphate; 6-tert-butyl-pseudo-uridine triphosphate; 6-trifluoromethoxy-pseudo-uridine triphosphate; 6-trifluoromethyl-pseudo-uridine triphosphate; alpha-thio-pseudo-uridine triphosphate; pseudouridine 1-(4-methylbenzenesulfonic acid) triphosphate; pseudouridine 1-(4-methylbenzoic acid) triphosphate; pseudouridine triphosphate 1-[3-(2-ethoxy)]propionic acid; pseudouridine triphosphate 1-[3-{2-(2-[2-(2-ethoxy)-ethoxy]-ethoxy)-ethoxy}]propionic acid; pseudouridine triphosphate 1-[3-{2-(2-[2-{2(2-ethoxy)-ethoxy}-ethoxy]-ethoxy)-ethoxy}]propionic acid; pseudouridine triphosphate 1-[3-{2-(2-[2-ethoxy]-ethoxy)-ethoxy}]propionic acid; pseudouridine triphosphate 1-[3-{2-(2-ethoxy)-ethoxy}]propionic acid; pseudouridine triphosphate 1-methylphosphonic acid; pseudouridine triphosphate 1-methylphosphonic acid diethyl ester; pseudo-uridine triphosphate-N1-3-propionic acid; pseudo-uridine triphosphate-N1-4-butanoic acid; pseudo-uridine triphosphate-N1-5-pentanoic acid; pseudo-uridine triphosphate-N1-6-hexanoic acid; pseudo-uridine triphosphate-N1-7-heptanoic acid; pseudo-uridine triphosphate-N1-methyl-p-benzoic acid; pseudo-uridine triphosphate-N1-p-benzoic acid; wybutosine; hydroxywybutosine; isowyosine; peroxywybutosine; undermodified hydroxywybutosine; 4-demethylwyosine; 2,6-(diamino)purine; 1-(aza)-2-(thio)-3-(aza)-phenoxazin-1-yl: 1,3-(diaza)-2-(oxo)-phenthiazin-1-yl; 1,3-(diaza)-2-(oxo)-phenoxazin-1-yl; 1,3,5-(triaza)-2,6-(dioxa)-naphthalene; 2 (amino)purine; 2,4,5-(trimethyl)phenyl; 2' methyl, 2'amino, 2'azido, 2'fluoro-cytidine; 2' methyl, 2'amino, 2'azido, 2'fluoro-adenine; 2'methyl, 2'amino, 2'azido, 2'fluoro-uridine; 2'-amino-2'-deoxyribose; 2-amino-6-chloro-purine; 2-aza-inosinyl; 2'-azido-2'-deoxyribose; 2'fluoro-2'-deoxyribose; 2'-fluoro-modified bases; 2'-O-methyl-ribose; 2-oxo-7-aminopyridopyrimidin-3-yl; 2-oxo-pyridopyrimidine-3-yl; 2-pyridinone; 3 nitropyrrole; 3-(methyl)-7-(propynyl)isocarbostyrilyl; 3-(methyl)isocarbostyrilyl; 4-(fluoro)-6-(methyl)benzimidazole; 4-(methyl) benzimidazole; 4-(methyl)indolyl; 4,6-(dimethyl)indolyl; 5 nitroindole; 5 substituted pyrimidines; 5-(methyl)isocarbostyrilyl; 5-nitroindole; 6-(aza)pyrimidine; 6-(azo)thymine; 6-(methyl)-7-(aza)indolyl; 6-chloro-purine; 6-phenyl-pyrrolo-pyrimidin-2-on-3-yl; 7-(aminoalkylhydroxy)-1-(aza)-2-(thio)-3-(aza)-phenthiazin-1-yl; 7-(aminoalkylhydroxy)-1-(aza)-2-(thio)-3-(aza)-phenoxazin-1-yl; 7-(aminoalkylhydroxy)-1,3-(diaza)-2-(oxo)-phenoxazin-1-yl; 7-(aminoalkylhydroxy)-1,3-(diaza)-2-(oxo)-phenthiazin-1-yl; 7-(aminoalkylhydroxy)-1,3-(diaza)-2-(oxo)-phenoxazin-1-yl; 7-(aza)indolyl; 7-(guanidiniumalkylhydroxy)-1-(aza)-2-(thio)-3-(aza)-phenoxazinyl-yl; 7-(guanidiniumalkylhydroxy)-1-(aza)-2-(thio)-3-(aza)-phenthiazin-1-yl; 7-(guanidiniumalkylhydroxy)-1-(aza)-2-(thio)-3-(aza)-phenoxazin-1-yl; 7-(guanidiniumalkylhydroxy)-1,3-(diaza)-2-(oxo)-phenoxazin-1-yl; 7-(guanidiniumalkyl-hydroxy)-1,3-(diaza)-2-(oxo)-phenthiazin-1-yl; 7-(guanidiniumalkylhydroxy)-1,3-(diaza)-2-(oxo)-phenoxazin-1-yl; 7-(propynyl) isocarbostyrilyl; 7-(propynyl)isocarbostyrilyl, 7-deaza-inosinyl; 7-substituted 1-(aza)-2-(thio)-3-(aza)-phenoxazin-1-yl; 7-substituted 1,3-(diaza)-2-(oxo)-phenoxazin-1-yl;

9-(methyl)-imidizopyridinyl; aminoindolyl; anthracenyl; bis-ortho-(aminoalkylhydroxy)-6-phenyl-pyrrolo-pyrimidin-2-on-3-yl; bis-ortho-substituted-6-phenyl-pyrrolo-pyrimidin-2-on-3-yl; difluorotolyl; hypoxanthine; imidizopyridinyl; inosinyl; isocarbostyrilyl; isoguanisine; N2-substituted purines; N6-methyl-2-amino-purine; N6-substituted purines; N-alkylated derivative; napthalenyl; nitrobenzimidazolyl; nitroimidazolyl; nitroindazolyl; nitropyrazolyl; nubularine; O6-substituted purines; O-alkylated derivative; ortho-(aminoalkylhydroxy)-6-phenyl-pyrrolo-pyrimidin-2-on-3-yl; ortho-substituted-6-phenyl-pyrrolo-pyrimidin-2-on-3-yl; oxoformycin triphosphate; para-(aminoalkylhydroxy)-6-phenyl-pyrrolo-pyrimidin-2-on-3-yl; para-substituted-6-phenyl-pyrrolo-pyrimidin-2-on-3-yl; pentacenyl; phenanthracenyl; phenyl; pyrenyl; pyridopyrimidin-3-yl; 2-oxo-7-amino-pyridopyrimidin-3-yl; pyrrolo-pyrimidin-2-on-3-yl; pyrrolopyrimidinyl; pyrrolopyrizinyl; stilbenzyl; substituted 1,2,4-triazoles; tetracenyl; tubercidine; xanthine; xanthosine-5'-triphosphate; 2-thio-zebularine; 5-aza-2-thio-zebularine; 7-deaza-2-amino-purine; pyridin-4-one ribonucleoside; 2-amino-riboside-triphosphate; formycin A triphosphate; formycin B triphosphate; pyrrolosine triphosphate; 2'-hydroxyl-ara-adenosine triphosphate; 2'-hydroxyl-ara-cytidine triphosphate; 2'-hydroxyl-ara-uridine triphosphate; 2'-hydroxyl-ara-guanosine triphosphate; 5-(2-carbomethoxyvinyl)uridine triphosphate; and N6-(19-amino-pentaoxanonadecyl)adenosine triphosphate.

In some embodiments, a nucleobase or a modified nucleobase of the nucleoside comprises a protecting group. Suitable protecting groups are described above. A skilled artisan will appreciate that the selection of a protecting group will be dictated by the nature of the nucleobase or the modified nucleobase. For example, an amine can be protected by Ac, iBu, Bn, or Bz.

Method of Making P-Chiral Phosphine

The present disclosure provides a method of making a P-chiral phosphine. The synthetic process is depicted in Scheme 1 below.

Scheme 1

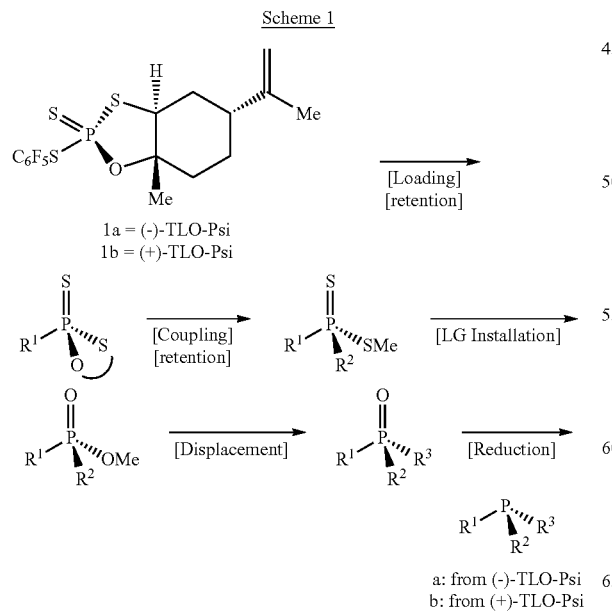

a: from (−)-TLO-Psi
b: from (+)-TLO-Psi

[net retention over two steps]

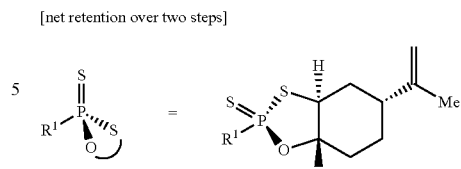

Scheme 1 illustrates the modular phosphine synthesis enabled by the TLO-Psi reagent (1) which takes place in an assembly line fashion: loading (to install $R^1$), coupling (to install $R^2$), displacement (leaving group installation followed by $R^3$ installation), and reduction. As confirmed by X-Ray crystallography, net stereoretention at P is observed during all of the steps in this sequence.

To ensure clarity, compounds originating from either (−)- or (+)-TLO-Psi are denoted by suffixes a and b [a for (−) and b for (+)]. If, however, only one reagent was in hand, simply changing the order of addition in this modular strategy could lead to either enantiomer of coupling or displacement products (vice versa).

In the process of making chiral phosphine, it is surprising to find that the P(V) reagents derived from a trans-limonene oxide ("TLO-Psi") have a superior reactivity profile than the P(V) reagents derived from cis-limonene oxide ("CLO-Psi"). Scheme 2 demonstrates that reagent 8a, which derives from TLO-Psi, can smoothly react with carbanion reagents to produce thiophosphinic acid 9a and subsequently thiophosphinic acid ester 11a while reagent 3, which derives from CLO-Psi, does not have such reactivity.

Scheme 2

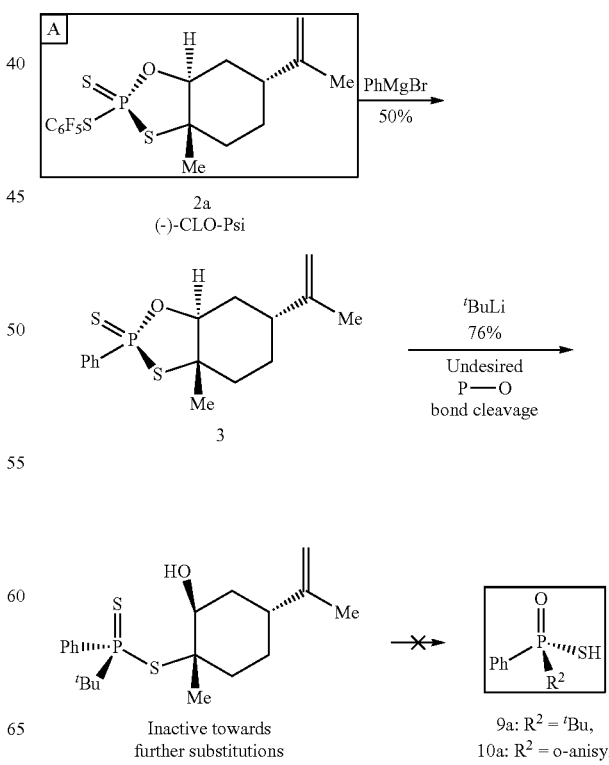

-continued

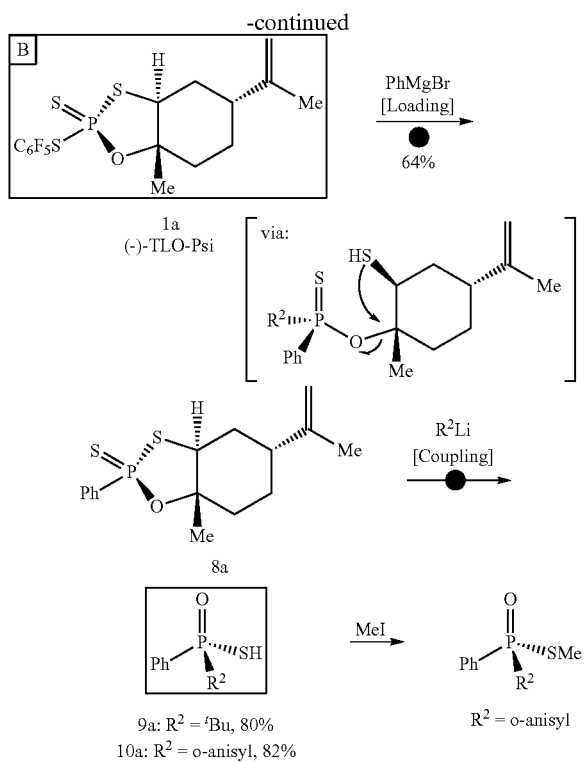

1a
(-)-TLO-Psi

9a: $R^2$ = $^tBu$, 80%
10a: $R^2$ = o-anisyl, 82%

In one aspect, the present disclosure provides a method of making a thiophosphinic acid, the method comprising:
reacting a carbanion reagent with a compound of Formula (Ia):

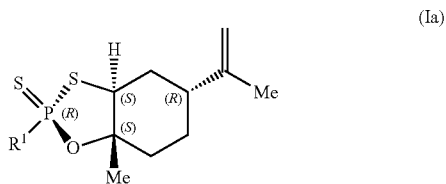

a salt thereof, an enantiomer thereof, or a combination thereof;
wherein
$R^1$ is $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl, wherein $R^1$ is optionally substituted with one or more, the same or different, $R^a$ groups;
$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl;
to form a thiophosphinic acid.

In one aspect, the thiophosphinic acid formed in the method above is represented by Formula (II):

wherein each of $R^1$ and $R^2$ is independently $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl, wherein each of $R^1$ and $R^2$ is optionally substituted with one or more, the same or different, $R^a$ groups; and $R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl.

In one aspect, the carbanion reagent is an organolithium reagent $R^2Li$, wherein $R^2$ is as defined above.

In one aspect, the thiophosphinic acid formed in the method above is represented by Formula (IIa):

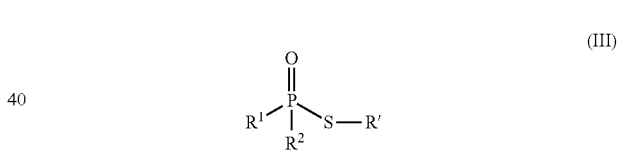

or an enantiomer thereof, wherein $R^1$ and $R^2$ are as defined above.

In one aspect, the method of making the thiophosphinic acid is carried out in an organic solvent. In one aspect, the organic solvent includes, but is not limited to, ether, THF, hexane, and dioxane.

In one aspect, the method of making the thiophosphinic acid is carried out at room temperature for about 2 to about 12 hours, about 2 to about 10 hours, about 2 to about 8 hours, or about 2 to about 6 hours.

In one aspect, the method further comprises reacting the thiophosphinic acid with an alkylating reagent to form a thiophosphinic acid ester.

In one aspect, the thiophosphinic acid ester is represented by Formula (III):

$$\underset{R^2}{\overset{O}{\underset{\|}{R^1-P-S-R'}}}$$ (III)

wherein
each of $R^1$ and $R^2$ is independently $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl;
wherein each of $R^1$ and $R^2$ is optionally substituted with one or more, the same or different, $R^a$ groups;
$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl; and R' is $C_{1-6}$ alkyl, $C_{2-6}$ alkenyl, or $C_{2-6}$ alkynyl.

In one aspect, the thiophosphinic acid ester is a compound having Formula (IIIa):

or an enantiomer thereof;
wherein $R^1$ and $R^2$ are as defined above.

In one aspect, the thiophosphinic acid ester is selected from the group consisting of

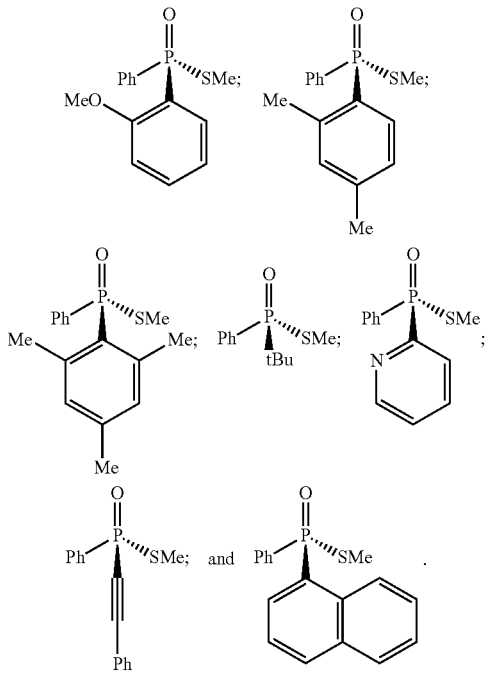

In one aspect, the alkylating reagent includes, but is not limited to methyl iodide, ethyl iodide, and propyl iodide.

In one aspect, the method of making the thiophosphinic acid ester is carried out in an organic solvent in the presence of a base at room temperature. In one aspect, the organic solvent includes, but is not limited to, ether, THF, hexane, and dioxane. In one aspect, the organic solvent is THF. In one aspect, the base includes, but is not limited, triethylamine, DIPEA, pyridine, 2,6-Lutidine, and imidazole.

In one aspect, the method further comprises reacting the thiophosphinic acid ester with an alkoxide agent to form an organophosphinate.

In one aspect, the organophosphinate has the Formula (IV):

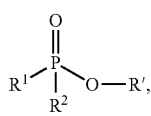
(IV)

wherein each of $R^1$ and $R^2$ is independently $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl;

wherein each of $R^1$ and $R^2$ is optionally substituted with one or more, the same or different, $R^a$ groups;

$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl; and R' is $C_{1-6}$ alkyl, $C_{2-6}$ alkenyl, or $C_{2-6}$ alkynyl.

In one aspect, the organophosphinate is the compound having Formula (IVa):

(IVa)

or an enantiomer thereof.

In one aspect, the organophosphinate is selected from the group consisting of

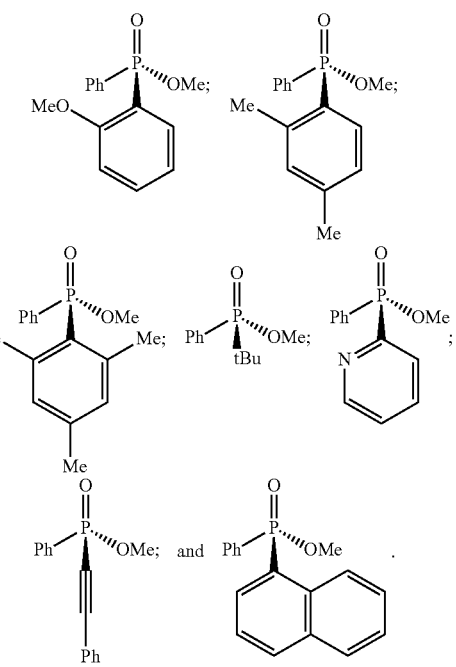

In one aspect, the method of making the phosphine oxide is carried out in an organic solvent. In one aspect, the organic solvent includes, but is not limited to, alcohol, ether, THF, hexane, and dioxane. In one aspect, the method is carried out in alcohol. In one aspect, the method is carried out at room temperature for about 4 hours.

In one aspect, the method further comprises organophosphinate with a carbanion reagent to form a phosphine oxide.

In one aspect, the phosphine oxide is a compound having Formula (V):

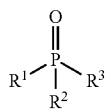
(V)

wherein each of $R^1$, $R^2$, and $R^3$ is independently $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl;

wherein each of $R^1$, $R^2$, and $R^3$ is optionally substituted with one or more, the same or different, $R^a$ groups;

$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl.

In one aspect, the phosphine oxide is a compound having Formula (Va):

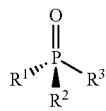

or an enantiomer thereof.

In one aspect, the carbanion reagent is a Grignard reagent $R^3MgBr$, wherein $R^3$ is defined above.

In one aspect, the Grignard reagent is selected from the group consisting of

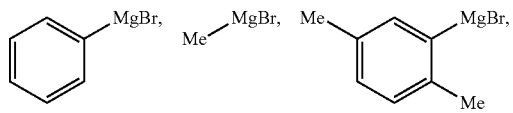

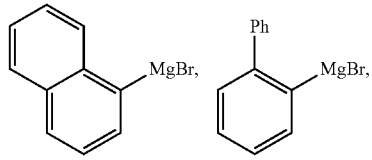

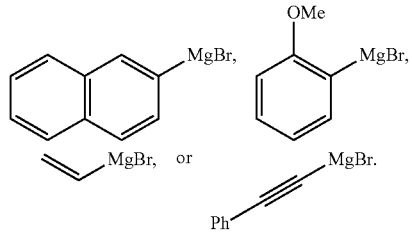

In one aspect, the phosphine oxide is selected from the group consisting of

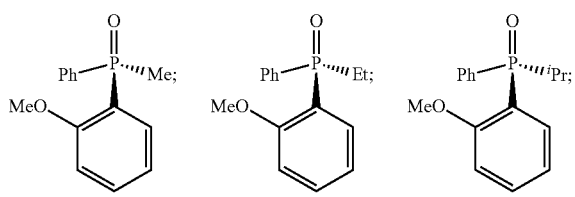

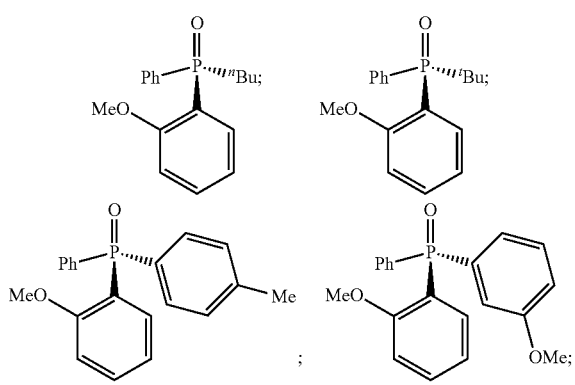

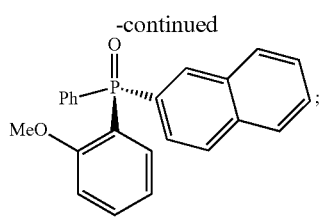

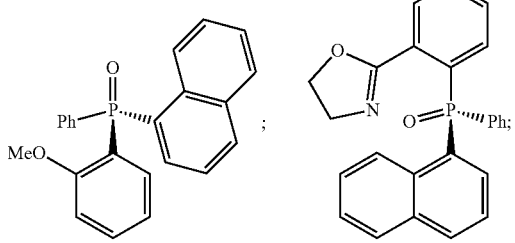

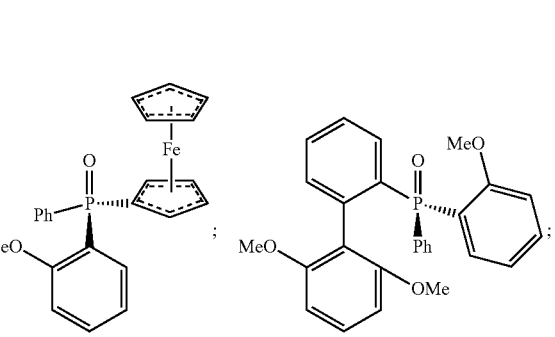

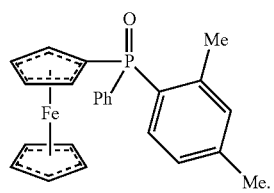

When enantiomerically-pure thiophosphinic acids [$R^1R^2P(O)SH$] are prepared, a search for the optimum leaving group during the final displacement reaction is performed. Table 5 below demonstrates that chlorophosphine sulfide (entry 1) was not active towards nucleophilic attack whereas chlorophosphine oxide (entry 2) reacted readily but gave diminished enantiomeric ratio ("e.r."). In contrast, thiophosphinic acid esters (alkylation of free SH) function as competent leaving groups. It is surprising to find that the e.r. of the displacement reaction is boosted to 98:2 while the reactivity maintains high when the leaving group is methoxy.

TABLE 5

Leaving Group Optimization for the Final Displacement

e.r. >98:2

| Entry | X | $R^2$ | Leaving group (conditions) | Yield | e.r. |
|---|---|---|---|---|---|
| 1 | S | $^t$Bu | Cl (SOCl$_2$) | no rxn | / |
| 2 | O | $^t$Bu | Cl (MeI, then SO$_2$Cl$_2$) | 65% | 67:33 |
| 3 | O | o-anisyl | Cl (MeI, then SO$_2$Cl$_2$) | mixture | / |
| 4 | O | o-anisyl | SMe (MeI) | 88% | 94:6 |
| 5 | O | o-anisyl | SEt (EtI) | 43% | 94:6 |
| 6 | O | o-anisyl | SBn (BnBr) | 43% | 94:6 |
| 7 | O | o-anisyl | OMe (MeI, then NaOMe) | 77% | 98:2 |
| 8 | O | o-anisyl | OPh (MeI, then NaOPh) | 80% | 50:50 |

In one aspect, the method of making the phosphine oxide is carried out in an organic solvent. In one aspect, the organic solvent includes, but is not limited to, ether, THF, hexane, and dioxane. In one aspect, the method is carried out in THF. In one aspect, the method is carried out at −78° C. for about 2 to about 12 hours, 2 to about 10 hours, 2 to about 8 hours, 2 to about 6 hours, or 2 to about 4 hours.

In one aspect, the method further comprises reacting the phosphine oxide with a reducing agent to form a phosphine.

In one aspect, the phosphine is a compound having Formula (VI):

$$R^1\overset{P}{\underset{R^2}{|}}R^3,$$ (VI)

wherein $R^1$, $R^2$, and $R^3$ are independently $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl;

wherein each of $R^1$, $R^2$, and $R^3$ is optionally substituted with one or more, the same or different, $R^a$ groups; and $R^a$ is deuterium, CD$_3$, $C_{1-6}$ alkyl, $C_{2-6}$ alkenyl, $C_{2-6}$ alkynyl, halogen, CF$_3$, $C_{1-6}$ alkoxy, $C_{3-10}$ cycloalkyl, $C_{6-10}$ aryl, or C-attached heteroaryl.

In one aspect, the phosphine is a compound having Formula (VIa):

or an enantiomer thereof.

In one aspect, the reducing agents include, but are not limited to, HSiCl$_3$ (with or without Et$_3$N), HSiCl$_3$ with sacrificial PPh$_3$, polymethylhydrosiloxane (PMHS) and Ti(OiPr)$_4$, and MeOTf/Meerwein's salt and NaBH$_4$.

In one aspect, the method of making the phosphine is carried out in an organic solvent. In one aspect, the organic solvent includes, but is not limited to, dichloromethane, ether, THF, hexane, and dioxane. In one aspect, the method is carried out in dichloromethane. In one aspect, the method is carried out at 50° C. for about 2 to about 4 hours.

The above reaction conditions are exemplary, and are not meant to be limiting. A skilled artisan will appreciate that the reaction conditions, such as reaction time and temperature, the identity and the amounts of the solvents, etc., can be varied according to the methods known in the art.

Method of Making Oligonucleotides

The present disclosure provides a method of making oligonucleotides. The synthetic process is depicted in Scheme 3 below.

Scheme 3 illustrates an efficient workflow to generate dinucleotides having a methyl phosphonate linkage. After methyl is installed on the reagent TLO-Psi, compounds 12a or 12b reacts with a nucleoside to give nucleoside-loaded organophosphorus compound (R$_p$)-12 or (S$_p$)-12. Then each compound couples with a second nucleoside to afford dinucleotides with high stereospecificity.

Scheme 3

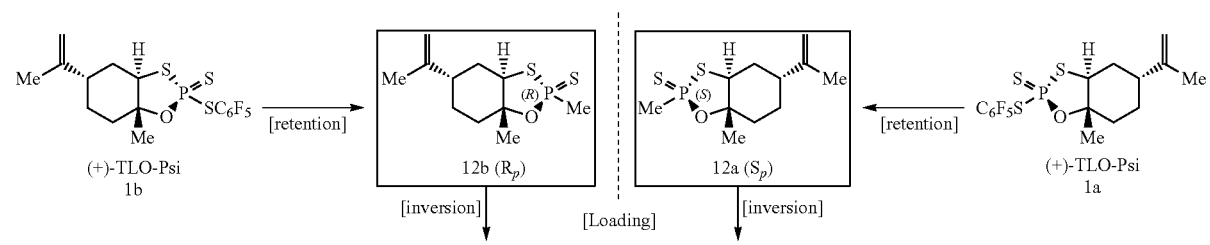

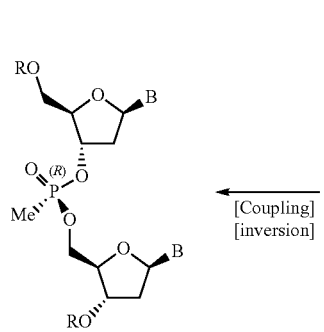
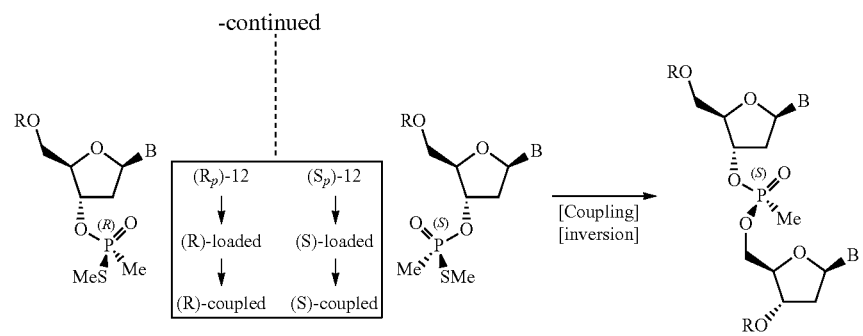

In the development of making the dinucleotides above, it is surprising to find that the P(V) reagents derived from a trans-limonene oxide ("TLO-Psi") has a superior reactivity profile than the P(V) reagents derived from cis-limonene oxide ("CLO-Psi") as well. Scheme 4 shows that compound 12a can readily react with 1-adamantylmethanol (Ad-CH$_2$—OH) to produce compound (S$_p$)-6 while compound 5 does not have such reactivity.

Scheme 4

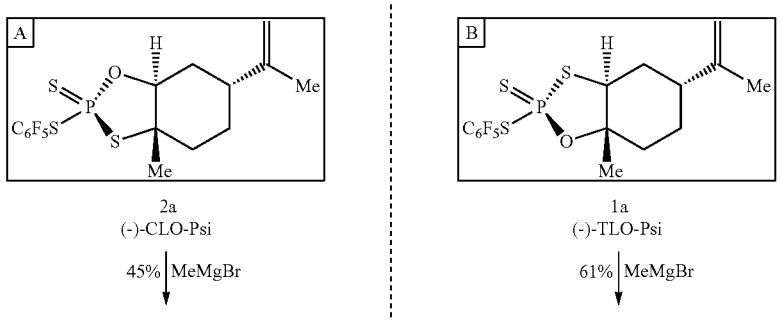
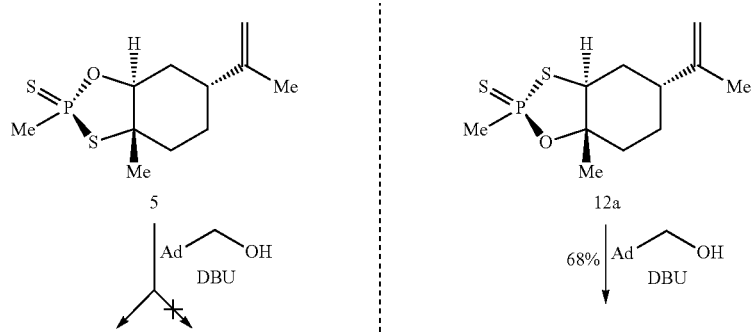
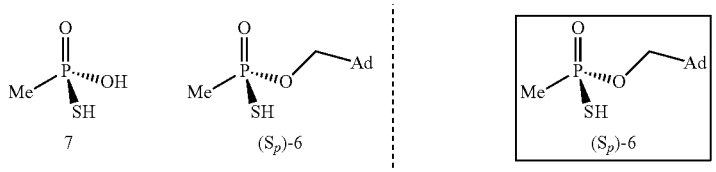

In one aspect, the present disclosure provides a method for making a nucleoside-loaded organophosphorus compound, comprising
reacting a nucleoside with a compound of Formula (Ia):

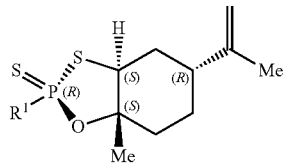

(Ia)

a salt thereof, an enantiomer thereof, or a combination thereof;
wherein
$R^1$ is $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl, wherein $R^1$ is optionally substituted with one or more, the same or different, $R^a$ groups;
$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl;
to form a nucleoside-loaded organophosphorus compound.

In one aspect, the nucleoside-loaded organophosphorus compound is a compound having Formula (VII) or (VIIa):

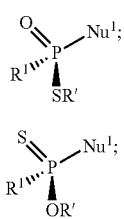

(VII)

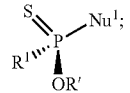

(VIIa)

or a diastereomer thereof,
wherein $R^1$ is $C_{1-6}$ alkyl, $C_{2-6}$ alkenyl, or $C_{2-6}$ alkynyl;
$R'$ is $C_{1-6}$ alkyl, $C_{2-6}$ alkenyl, or $C_{2-6}$ alkynyl;
$Nu^1$ is a nucleoside, and
wherein $Nu^1$ optionally comprises, independently of each other, one or more, the same or different, modification or one or more, the same or different, protecting group.
In one aspect, each of $R^1$ and $R'$ is —$CH_3$.
In one aspect, $Nu^1$ is a nucleoside selected from the group consisting of

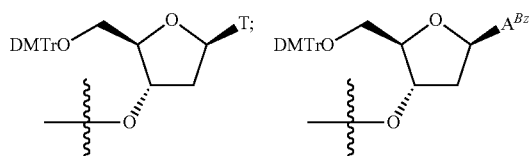

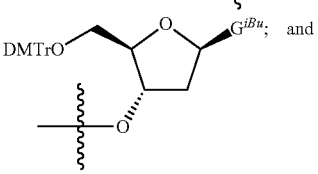

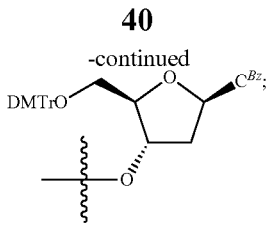

wherein
T is

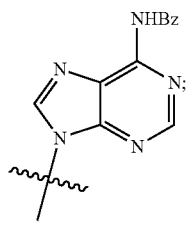

$A^{Bz}$ is

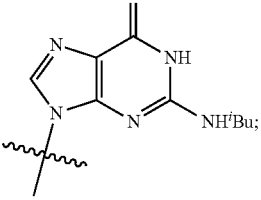

$G^{iBu}$ is

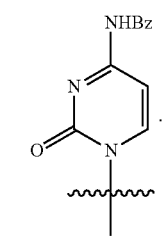

and
$C^{Bz}$ is

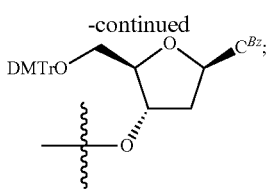

In one aspect, the method of making the nucleoside-loaded organophosphorus compound is carried out in an organic solvent. In one aspect, the organic solvent includes, but is not limited to, ether, THF, hexane, and dioxane.
In one aspect, the method of making the nucleoside-loaded organophosphorus compound is carried out at room temperature for about 2 to about 12 hours, about 2 to about 10 hours, about 2 to about 8 hours, or about 2 to about 6 hours.

In one aspect, the method of making the nucleoside-loaded organophosphorus compound is carried out in the presence of a base. In one aspect, the base includes, but is not limited, DBU, triethylamine, DIPEA, pyridine, 2,6-Lutidine, and imidazole.

In one aspect, the method further comprises reacting the nucleoside-loaded organophosphorus compound with a second nucleoside to form a dinucleotide.

In one aspect, the dinucleotide is a compound having Formula (VIII) or (VIIIa):

$$\underset{R^1\text{''''}}{\overset{O}{\underset{Nu^2}{\|}}}\overset{Nu^1}{\underset{P}{\|}}; \quad (VIII)$$

$$\underset{R^1\text{''''}}{\overset{S}{\underset{Nu^2}{\|}}}\overset{Nu^1}{\underset{P}{\|}}; \quad (VIIIa)$$

wherein $R^1$ is $C_{1-6}$ alkyl, $C_{2-6}$ alkenyl, or $C_{2-6}$ alkynyl; each of $Nu^1$ and $Nu^2$ is a nucleoside; and wherein either one or both $Nu^1$ and $Nu^2$ optionally comprise, independently of each other, one or more, the same of different, modification or one or more, the same or different, protecting group.

In one aspect, $R^1$ is —$CH_3$; and each of $Nu^1$ and $Nu^2$ is independently a nucleoside selected from the group consisting of

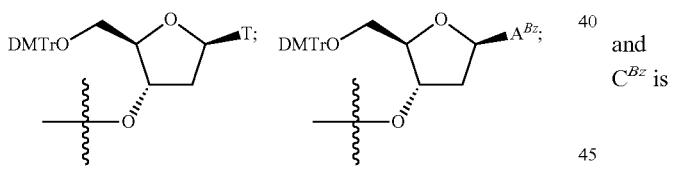

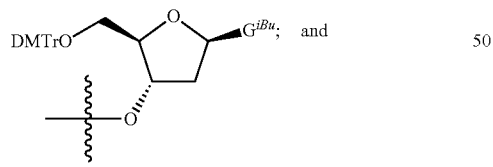

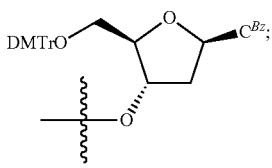

wherein

T is

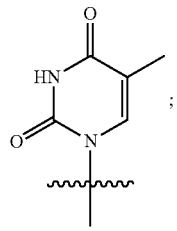

$A^{Bz}$ is

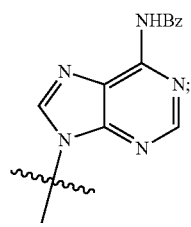

$G^{iBu}$ is

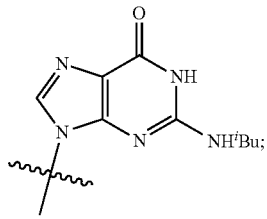

and $C^{Bz}$ is

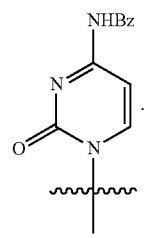

In one aspect, the method of making the dinucleotide is carried out in an organic solvent. In one aspect, the organic solvent includes, but is not limited to, ether, THF, hexane, and dioxane.

In one aspect, the method of making the dinucleotide is carried out at room temperature for about 2 to about 16 hours, about 2 to about 14 hours, about 2 to about 12 hours, or about 2 to about 10 hours.

In one aspect, the method of making the dinucleotide is carried out in the presence of a base. In one aspect, the base includes, but is not limited, DBU, triethylamine, DIPEA, pyridine, 2,6-lutidine, and imidazole.

In one aspect, the method further comprises:
a) reacting the dinucleotide with a compound of Formula (Ia) to form a loaded dinucleotide;
b) reacting the loaded dinucleotide formed in step (a) with a third nucleoside, to form a trinucleotide;
c) repeating steps (a) and (b) one or more times to form a oligonucleotide having a desired number of nucleotides.

In one aspect, the reaction conditions of step a) of the method of making the oligonucleotide are same as ones in the method of making the nucleoside-loaded organophosphorus compound. In one aspect, the reaction conditions of step b) of the method of making the oligonucleotide are same as ones in the method of making the dinucleotides.

In one aspect, the dinucleotide is a compound having Formulae (VIII) or (VIIIa):

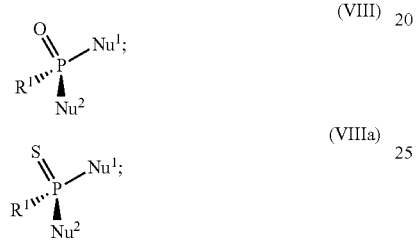

or an enantiomer thereof;
wherein $R^1$ is $C_{1-6}$ alkyl, $C_{2-6}$ alkenyl, or $C_{2-6}$ alkynyl;
each of $Nu^1$ and $Nu^2$ is a nucleoside;
wherein either one or both $Nu^1$ and $Nu^2$ optionally comprise, independently of each other, one or more, the same or different, modification or one or more, the same or different, protecting group.

In one aspect, the method for forming a dinucleotide further comprises
a) reacting the dinucleotide with a compound of Formula C:

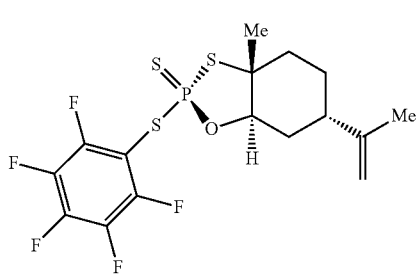

or an enantiomer thereof to form a loaded chimeric dinucleotide; and
b) reacting the loaded chimeric dinucleoside formed in step (a) with a third nucleoside, to form a chimeric trinucleotide bearing a phosphonate linkage and a phosphorothioate linkage.

In one aspect, step a) of the method for forming a chimeric trinucleotide is carried out in an organic solvent. In one aspect, the organic solvent includes, but is not limited to, ACN, ether, THF, hexane, and dioxane.

In one aspect, the method of making the nucleoside-loaded organophosphorus compound is carried out at room temperature for about 2 to about 12 hours, about 2 to about 10 hours, about 2 to about 8 hours, or about 2 to about 6 hours.

In one aspect, the method of making the nucleoside-loaded organophosphorus compound is carried out in the presence of a base. In one aspect, the base includes, but is not limited, DBU, triethylamine, DIPEA, pyridine, 2,6-Lutidine, and imidazole.

The above reaction conditions are exemplary, and are not meant to be limiting. A skilled artisan will appreciate that the reaction conditions, such as reaction time and temperature, the identity and the amounts of the solvents, etc., can be varied according to the methods known in the art.

Method of Making Compound of Formula (Ia)

In one aspect, the present disclosure is related to a method of making a compound of Formula (Ia):

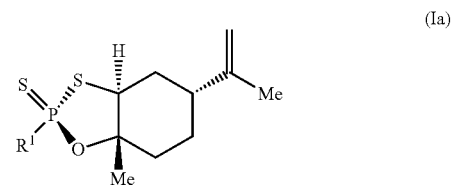

or an enantiomer thereof;
wherein $R^1$ is $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl;
wherein $R^1$ is optionally substituted with one or more, the same or different, $R^a$ groups;
$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl;
comprising reacting a carbanion reagent with a compound of Formula A:

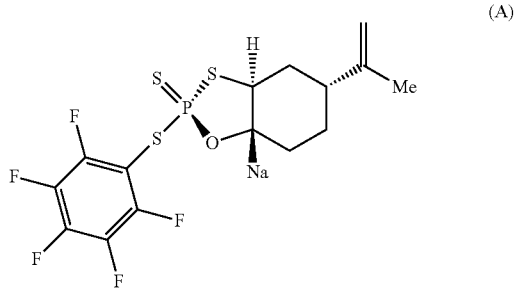

or an enantiomer thereof, to form a compound of Formula (Ia).

In one aspect, the carbanion reagent is a Grignard reagent. In one aspect, the Grignard reagent is $R^1MgBr$, wherein $R^1$ is defined above.

In one aspect, the Grignard reagent is selected from the group consisting of

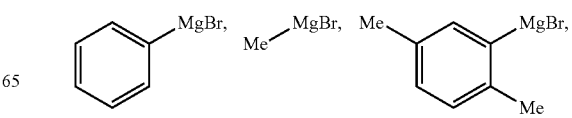

-continued

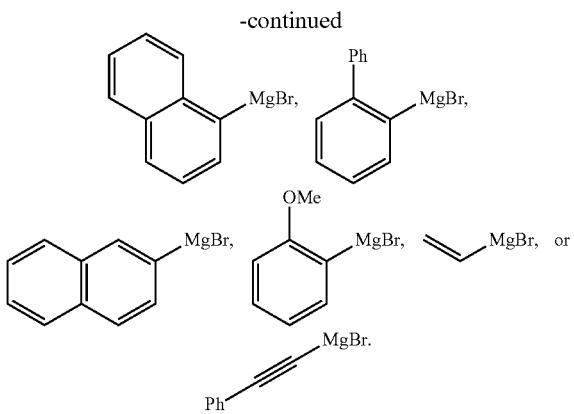

In one aspect, the method of making a compound of Formula (Ia) is carried out at room temperature for about 2 to about 12 hours, about 2 to about 10 hours, about 2 to about 8 hours, or about 2 to about 6 hours.

In one aspect, the method of making a compound of Formula (Ia) is carried out in an organic solvent. In one aspect, the organic solvent includes, but is not limited to, ether, THF, hexane, and dioxane.

The above reaction conditions are exemplary, and are not meant to be limiting. A skilled artisan will appreciate that the reaction conditions, such as reaction time and temperature, the identity and the amounts of the solvents, etc., can be varied according to the methods known in the art.

Definitions

Unless otherwise stated, the following terms used in this application, including the specification and claims, have the definitions given below. It must be noted that, as used in the specification and the appended claims, the singular forms "a," "an," and "the" include plural referents unless the context clearly dictates otherwise. Unless otherwise indicated, conventional methods of mass spectroscopy, NMR, HPLC, protein chemistry, biochemistry, recombinant DNA techniques and pharmacology are employed. In this application, the use of "or" or "and" means "and/or" unless stated otherwise. Furthermore, use of the term "including" as well as other forms, such as "include", "includes" and "included" is not limiting.

Units, prefixes, and symbols are denoted in their Système International de Unites (SI) accepted form. Numeric ranges are inclusive of the numbers defining the range. Where a range of values is recited, it is to be understood that each intervening integer value, and each fraction thereof, between the recited upper and lower limits of that range is also specifically disclosed, along with each subrange between such values. The upper and lower limits of any range can independently be included in or excluded from the range, and each range where either, neither or both limits are included is also encompassed within the invention. Where a value is explicitly recited, it is to be understood that values which are about the same quantity or amount as the recited value are also within the scope of the invention. Where a combination is disclosed, each subcombination of the elements of that combination is also specifically disclosed and is within the scope of the invention. Conversely, where different elements or groups of elements are individually disclosed, combinations thereof are also disclosed. Where any element of an invention is disclosed as having a plurality of alternatives, examples of that invention in which each alternative is excluded singly or in any combination with the other alternatives are also hereby disclosed; more than one element of an invention can have such exclusions, and all combinations of elements having such exclusions are hereby disclosed.

The present disclosure is intended to include all isotopes of atoms occurring in the present compounds. Isotopes include those atoms having the same atomic number but different mass numbers. By way of general example and without limitation, isotopes of hydrogen include deuterium and tritium. The isotopes of hydrogen can be denoted as $^1$H (hydrogen), $^2$H (deuterium) and $^3$H (tritium). They are also commonly denoted as D for deuterium and T for tritium. In the application, $CD_3$ denotes a methyl group wherein all of the hydrogen atoms are deuterium. Isotopes of carbon include $^{13}$C and $^{14}$C. Isotopically-labeled compounds of the invention can generally be prepared by conventional techniques known to those skilled in the art or by processes analogous to those described herein, using an appropriate isotopically-labeled reagent in place of the non-labeled reagent otherwise employed.

In the present disclosure, the term "stereoisomer" by itself refers to all possible different isomeric as well as conformational forms that a compound may possess (e.g., a compound of any formula described herein), in particular all possible stereochemically and conformationally isomeric forms, all diastereomers, enantiomers and/or conformers of the basic molecular structure. Some compounds of the present disclosure may exist in different tautomeric forms, all of the latter being included within the scope of the present disclosure.

In the present disclosure, the term "enantiomer" means each individual optically active form of a compound of the disclosure.

In the present disclosure, the term "diastereomer," means stereoisomers that are not mirror images of one another and are non-superimposable on one another.

In the present disclosure, the term "nucleic acid" encompasses poly- or oligo-ribonucleotides (RNA) and poly- or oligo-deoxyribonucleotides (DNA); RNA or DNA derived from N-glycosides or C-glycosides of nucleobases and/or modified nucleobases; nucleic acids derived from sugars and/or modified sugars; and nucleic acids derived from phosphate bridges and/or modified phosphorous-atom bridges. The term encompasses nucleic acids containing any combinations of nucleobases, modified nucleobases, sugars, modified sugars, phosphate bridges, or modified phosphorous atom bridges. Examples include, and are not limited to, nucleic acids containing ribose moieties, nucleic acids containing deoxyribose moieties, nucleic acids containing both ribose and deoxyribose moieties, nucleic acids containing ribose and modified ribose moieties. The prefix "poly-" refers to a nucleic acid containing about 1 to about 10,000 nucleotide monomer units, and the prefix "oligo-" refers to a nucleic acid containing about 1 to about 200 nucleotide monomer units. The term "nucleic acid" can also encompass CDNs.

In the present disclosure, the terms "nucleobase" and "nucleosidic base moiety," used interchangeably, refer to the parts of nucleic acids that are involved in the hydrogen-bonding that binds one nucleic acid strand to the complementary strand in a sequence-specific manner. The most common naturally-occurring nucleobases are adenine (A), guanine (G), uracil (U), cytosine (C), and thymine (T).

In the present disclosure, nucleobases can be represented by abbreviation A, G, U, C, T, Hyp. Abbreviation A refers to adenine; G refers to guanine; U refers to uracil; C refers to cytosine; T refers to thymine; Hyp refers to hypoxanthine.

In the present disclosure, the terms "modified nucleobase" and "modified nucleosidic base moiety," used interchangeably, refer to a moiety that can replace a nucleobase. The modified nucleobase mimics the spatial arrangement, electronic properties, or some other physicochemical property of the nucleobase and retains the property of hydrogen-bonding that binds one nucleic acid strand to another in a sequence-specific manner. A modified nucleobase generally can pair with naturally occurring bases (e.g., uracil, thymine, adenine, cytosine, guanine) without substantially affecting the melting behavior, recognition by intracellular enzymes or activity of the oligonucleotide duplex. The terms "modified nucleobase" and "modified nucleosidic base moiety," used interchangeably, is further intended to include heterocyclic compounds that can serve as nucleosidic bases, including certain 'universal bases' that are not nucleosidic bases in the most classical sense but serve as nucleosidic bases. Especially mentioned as a universal base is 3-nitropyrrole.

In the present disclosure, the term "nucleoside" refers to a compound, glycosylamine, wherein a nucleobase (a nitrogenous base, such as adenine, guanine, thymine, uracil, 5-methyluracil, etc.) or a modified nucleobase is covalently bound to a five-carbon sugar (ribose or deoxyribose) or a modified sugar.

In the present disclosure, the term "sugar" refers to a monosaccharide in closed and/or open form. Sugars include, but are not limited to, ribose, deoxyribose, pentofuranose, pentopyranose, morpholinos, carbocyclic analogs, hexopyranose moieties and bicyclic sugars such as those found in locked nucleic acids. Examples of locked nucleic acids include, without limitation, those disclosed in WO2016/079181.

In the present disclosure, the term "modified sugar" refers to a moiety that can replace a sugar. The modified sugar mimics the spatial arrangement, electronic properties, or some other physicochemical property of a sugar.

In the present disclosure, the term "nucleotide" refers to a moiety wherein a nucleobase or a modified nucleobase is covalently linked to a sugar or modified sugar, and the sugar or modified sugar is covalently linked to a phosphate group or a modified phosphorous-atom moiety, such a thiophosphate group.

In the present disclosure, the term "peptide" refers to a chain of amino acid monomers linked by a peptide bond. Generally, a peptide will have no more than about 50 amino acids. The term "peptide" encompasses both naturally and non-naturally occurring amino acids. A peptide can be linear or cyclic.

In the present disclosure, the term "protein" comprises one or more polypeptides arranged in a biologically-functional way. Examples of biologically-functional proteins include, but are not limited to, enzymes, antibodies, cytokines, hormones, trans-membrane proteins, etc.

In the present disclosure, the term "moiety" refers to a specific segment or functional group of a molecule. Chemical moieties are often recognized chemical entities embedded in or appended to a molecule.

In the present disclosure, the terms "solid-support" or "resin," used herein interchangeably, refer to any support which enables synthetic mass production of nucleic acids and/or peptides and can be reutilized at need. As used herein, the terms refer to a polymer that is insoluble in the media employed in the reaction steps performed to synthesize nucleic acids and/or peptides, and is derivatized to comprise reactive groups.

In the present disclosure, the term "linking moiety" refers to any moiety optionally positioned between the terminal nucleoside and the solid support or between the terminal nucleoside and another nucleoside, nucleotide, or nucleic acid.

In the present disclosure, the term "purified," when used in relation to nucleic acids, refers to one that is separated from at least one contaminant. As used herein, a "contaminant" is any substance that makes another unfit, impure or inferior. Thus, a purified oligonucleotide is present in a form or setting different from that, which existed prior to subjecting it to a purification method.

In the present disclosure, the term "alkyl" as used by itself or as part of another group refers to unsubstituted straight- or branched-chain aliphatic hydrocarbons containing one to twelve carbon atoms, i.e., $C_{1-12}$ alkyl, or the number of carbon atoms designated, e.g., a $C_1$ alkyl such as methyl, a $C_2$ alkyl such as ethyl, a $C_3$ alkyl such as propyl or isopropyl, and so on. In one aspect, the alkyl group is a $C_{1-10}$ alkyl. In another aspect, the alkyl group is a $C_{1-6}$ alkyl. In another aspect, the alkyl group is a $C_{1-4}$ alkyl. Non-limiting exemplary $C_{1-10}$ alkyl groups include methyl, ethyl, propyl, isopropyl, butyl, sec-butyl, tert-butyl, iso-butyl, 3-pentyl, hexyl, heptyl, octyl, nonyl, and decyl. Non-limiting exemplary $C_{1-6}$ alkyl groups include methyl, ethyl, propyl, isopropyl, butyl, sec-butyl, tert-butyl, iso-butyl, and hexyl. Non-limiting exemplary $C_{1-4}$ alkyl groups include methyl, ethyl, propyl, isopropyl, butyl, sec-butyl, tert-butyl, and iso-butyl.

In the present disclosure, the term "optionally substituted alkyl" is an alkyl group as defined above, that has one or more of $R^a$ groups.

In the present disclosure, the term "cycloalkyl" as used by itself or as part of another group refers to unsubstituted saturated and partially unsaturated, e.g., containing one or two double bonds, cyclic aliphatic hydrocarbons containing one to three rings having from three to twelve carbon atoms, i.e., $C_{3-12}$ cycloalkyl, or the number of carbons designated. In one aspect, the cycloalkyl group has two rings. In one aspect, the cycloalkyl group has one ring. In another aspect, the cycloalkyl is saturated. In another aspect, the cycloalkyl is unsaturated. In another aspect, the cycloalkyl group is a $C_{3-8}$ cycloalkyl group. In another aspect, the cycloalkyl group is a $C_{3-7}$ cycloalkyl group. In another aspect, the cycloalkyl group is a $C_{5-7}$ cycloalkyl group. In another aspect, the cycloalkyl group is a $C_{3-6}$ cycloalkyl group. The term "cycloalkyl" includes groups wherein a ring —$CH_2$— is replaced with a —C(=O)—. Non-limiting exemplary cycloalkyl groups include cyclopropyl, cyclobutyl, cyclopentyl, cyclohexyl, cycloheptyl, cyclooctyl, norbornyl, decalin, adamantyl, cyclohexenyl, cyclopentenyl, cyclohexenyl, and cyclopentanone.

In the present disclosure, the term "optionally substituted cycloalkyl" is a cycloalkyl group as defined above, that has one or more of $R^a$ groups.

The term optionally substituted cycloalkyl includes cycloalkyl groups having a fused optionally substituted aryl, e.g., phenyl, or fused optionally substituted heteroaryl, e.g., pyridyl. An optionally substituted cycloalkyl having a fused optionally substituted aryl or fused optionally substituted heteroaryl group may be attached to the remainder of the molecule at any available carbon atom on the cycloalkyl ring. In one aspect, the optionally substituted cycloalkyl group is a 5-, 6-, or 7-membered cycloalkyl group having a fused phenyl group, wherein the phenyl optionally substituted with one, two, or three substituents.

In the present disclosure, the term "alkenyl" as used by itself or as part of another group refers to an alkyl containing one, two or three carbon-to-carbon double bonds. In one aspect, the alkenyl group is a $C_{2-6}$ alkenyl group. In another aspect, the alkenyl group is a $C_{2-4}$ alkenyl group. Non-limiting exemplary alkenyl groups include ethenyl, propenyl, isopropenyl, butenyl, sec-butenyl, pentenyl, and hexenyl.

In the present disclosure, the term "optionally substituted alkenyl" as used herein by itself or as part of another group refers to an alkenyl that is either unsubstituted or substituted with one or more $R^a$ substituents.

In the present disclosure, the term "alkynyl" as used by itself or as part of another group refers to an alkyl containing one to three carbon-to-carbon triple bonds. In one aspect, the alkynyl has one carbon-to-carbon triple bond. In one aspect, the alkynyl group is a $C_{2-6}$ alkynyl group. In another aspect, the alkynyl group is a $C_{2-4}$ alkynyl group. Non-limiting exemplary alkynyl groups include ethynyl, propynyl, butynyl, 2-butynyl, pentynyl, and hexynyl groups.

In the present disclosure, the term "optionally substituted alkynyl" as used herein by itself or as part of another group refers to an alkynyl that is either unsubstituted or substituted with one or more $R^a$.

In the present disclosure, the term "aryl" as used by itself or as part of another group refers to a group comprising unsubstituted aromatic ring systems. In one aspect, the aryl group has monocyclic, bicyclic, or polycyclic aromatic rings having from five to fourteen carbon atoms, i.e., a $C_{5-14}$ aryl, $C_{6-12}$ aryl, $C_{6-10}$ aryl, or $C_{6-8}$ aryl. Non-limiting exemplary aryl groups include phenyl (abbreviated as "Ph"), naphthyl, phenanthryl, anthracyl, indenyl, azulenyl, biphenyl, biphenylenyl, and fluorenyl groups. In one aspect, the aryl group is a phenyl or naphthyl. In one aspect, the aryl group includes organometallic groups in which the aromatic ring binds with a metal atom. Non-limiting exemplary aryl groups includes ferrocene and cobaltocene. The radical or point of attachment is on the aromatic ring.

In the present disclosure, the term "optionally substituted aryl" as used herein by itself or as part of another group refers to an aryl that is either unsubstituted or substituted with one or more $R^a$ substituents.

In one aspect, the optionally substituted aryl is an optionally substituted phenyl. In one aspect, the optionally substituted phenyl has four substituents. In another aspect, the optionally substituted phenyl has three substituents. In another aspect, the optionally substituted phenyl has two substituents. In another aspect, the optionally substituted phenyl has one substituent. Non-limiting exemplary substituted aryl groups include 2-methylphenyl, 2-methoxyphenyl, 2-fluorophenyl, 2-chlorophenyl, 2-bromophenyl, 3-methylphenyl, 3-methoxyphenyl, 3-fluorophenyl, 3-chlorophenyl, 4-methylphenyl, 4-ethylphenyl, 4-methoxyphenyl, 4-fluorophenyl, 4-chlorophenyl, 2,6-di-fluorophenyl, 2,6-di-chlorophenyl, 2-methyl, 3-methoxyphenyl, 2-ethyl, 3-methoxyphenyl, 3,4-di-methoxyphenyl, 3,5-di-fluorophenyl 3,5-di-methylphenyl, 3,5-dimethoxy, 4-methylphenyl, 2-fluoro-3-chlorophenyl, and 3-chloro-4-fluorophenyl. The term optionally substituted aryl includes phenyl groups having fused optionally substituted cycloalkyl and fused optionally substituted heterocyclo rings. An optionally substituted aryl having a fused optionally substituted cycloalkyl and fused optionally substituted heterocycle is attached to the remainder of the molecule at any available carbon atom on the aryl ring. Non-limiting examples include:

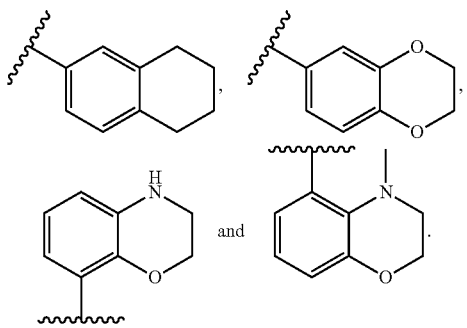

In the present disclosure, the term "aryloxy" as used by itself or as part of another group refers to an optionally substituted aryl attached to a terminal oxygen atom. A non-limiting exemplary aryloxy group is PhO⁻.

In the present disclosure, the term "heterocycle," "heterocyclyl," or "heterocyclic group" is intended to mean a stable 3-, 4-, 5-, 6-, or 7-membered monocyclic or bicyclic or 7-, 8-, 9-, 10-, 11-, 12-, 13-, or 14-membered polycyclic heterocyclic ring that is saturated, partially unsaturated, or fully unsaturated, and that contains carbon atoms and 1, 2, 3 or 4 heteroatoms independently selected from the group consisting of N, O and S; and including any polycyclic group in which any of the above-defined heterocyclic rings is fused to a benzene ring. The nitrogen and sulfur heteroatoms may optionally be oxidized (i.e., N→O and $S(O)_p$, wherein p is 0, 1 or 2). The nitrogen atom may be substituted or unsubstituted (i.e., N or NR wherein R is H or another substituent, if defined). The heterocyclic ring may be attached to its pendant group at any heteroatom or carbon atom that results in a stable structure. The heterocyclic rings described herein may be substituted on carbon or on a nitrogen atom if the resulting compound is stable. A nitrogen in the heterocycle may optionally be quaternized. It is preferred that when the total number of S and O atoms in the heterocycle exceeds 1, then these heteroatoms are not adjacent to one another. It is preferred that the total number of S and O atoms in the heterocycle is not more than 1. When the term "heterocycle" is used, it is intended to include heteroaryl.

Examples of heterocycles include, but are not limited to, acridinyl, azetidinyl, azocinyl, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, imidazolopyridinyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isothiazolopyridinyl, isoxazolyl, isoxazolopyridinyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolopyridinyl, oxazolidinylperimidinyl, oxindolyl, pyrimidinyl, phenanthridinyl, phenanthrolinyl, phenazinyl, phenothiazinyl, phenoxathiinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolopyridinyl, pyrazolyl, pyridazinyl, pyridooxazolyl, pyridoimidazolyl, pyridothiazolyl, pyridinyl, pyrimidinyl, pyrrolidinyl, pyrrolinyl, 2-pyrrolidonyl, 2H-pyrrolyl, pyrrolyl, quinazolinyl, quinolinyl, 4H-quinolizinyl, quinoxalinyl, quinuclidinyl, tetrazolyl, tetrahydrofuranyl, tetrahydroisoquinolinyl, tetrahydroquinolinyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thiazolopyridinyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, and xanthenyl. Also included are fused ring and spiro compounds containing, for example, the above heterocycles.

As used herein, the term "bicyclic heterocycle" or "bicyclic heterocyclic group" is intended to mean a stable 9- or 10-membered heterocyclic ring system which contains two fused rings and consists of carbon atoms and 1, 2, 3, or 4 heteroatoms independently selected from the group consisting of N, O and S. Of the two fused rings, one ring is a 5- or 6-membered monocyclic aromatic ring comprising a 5-membered heteroaryl ring, a 6-membered heteroaryl ring or a benzo ring, each fused to a second ring. The second ring is a 5- or 6-membered monocyclic ring which is saturated, partially unsaturated, or unsaturated, and comprises a 5-membered heterocycle, a 6-membered heterocycle or a carbocycle (provided the first ring is not benzo when the second ring is a carbocycle).

The bicyclic heterocyclic group may be attached to its pendant group at any heteroatom or carbon atom which results in a stable structure. The bicyclic heterocyclic group described herein may be substituted on carbon or on a nitrogen atom if the resulting compound is stable. It is preferred that when the total number of S and O atoms in the heterocycle exceeds 1, then these heteroatoms are not adjacent to one another. It is preferred that the total number of S and O atoms in the heterocycle is not more than 1.

Examples of a bicyclic heterocyclic group are, but not limited to, quinolinyl, isoquinolinyl, phthalazinyl, quinazolinyl, indolyl, isoindolyl, indolinyl, 1H-indazolyl, benzimidazolyl, 1,2,3,4-tetrahydroquinolinyl, 1,2,3,4-tetrahydroisoquinolinyl, 5,6,7,8-tetrahydro-quinolinyl, 2,3-dihydro-benzofuranyl, chromanyl, 1,2,3,4-tetrahydro-quinoxalinyl and 1,2,3,4-tetrahydro-quinazolinyl.

Bridged rings are also included in the definition of heterocycle. A bridged ring occurs when one or more, preferably one to three, atoms (i.e., C, O, N, or S) link two non-adjacent carbon or nitrogen atoms. Examples of bridged rings include, but are not limited to, one carbon atom, two carbon atoms, one nitrogen atom, two nitrogen atoms, and a carbon-nitrogen group. It is noted that a bridge always converts a monocyclic ring into a tricyclic ring. When a ring is bridged, the substituents recited for the ring may also be present on the bridge.

The term "heterocyclylalkyl" refers to a heterocyclyl or substituted heterocyclyl bonded to an alkyl group connected to the core of the compound.

As used herein, the term "aromatic heterocyclic group" or "heteroaryl" is intended to mean stable monocyclic and polycyclic aromatic hydrocarbons that include at least one heteroatom ring member such as sulfur, oxygen, or nitrogen. Heteroaryl groups include, without limitation, pyridyl, pyrimidinyl, pyrazinyl, pyridazinyl, triazinyl, furyl, quinolyl, isoquinolyl, thienyl, imidazolyl, thiazolyl, indolyl, pyrroyl, oxazolyl, benzofuryl, benzothienyl, benzthiazolyl, isoxazolyl, pyrazolyl, triazolyl, tetrazolyl, indazolyl, 1,2,4-thiadiazolyl, isothiazolyl, purinyl, carbazolyl, benzimidazolyl, indolinyl, benzodioxolanyl and benzodioxane. Heteroaryl groups are substituted or unsubstituted. The nitrogen atom is substituted or unsubstituted (i.e., N or NR wherein R is H or another substituent, if defined). The nitrogen and sulfur heteroatoms may optionally be oxidized (i.e., N→O and $S(O)_p$, wherein p is 0, 1 or 2).

In one aspect, the term "heteroaryl" or "heteroaromatic" refers to unsubstituted monocyclic and bicyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen and sulfur. In one aspect, the heteroaryl contains 1, 2, 3, or 4 heteroatoms independently selected from the group consisting of oxygen, nitrogen and sulfur. In one aspect, the heteroaryl has three heteroatoms. In another aspect, the heteroaryl has two heteroatoms. In another aspect, the heteroaryl has one heteroatom. In another aspect, the heteroaryl is a 5- to 10-membered heteroaryl. In another aspect, the heteroaryl is a 5- or 6-membered heteroaryl. In another aspect, the heteroaryl has 5 ring atoms, e.g., thienyl, a 5-membered heteroaryl having four carbon atoms and one sulfur atom. In another aspect, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one aspect, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term "heteroaryl" also includes possible N-oxides. A non-limiting exemplary N-oxide is pyridyl N-oxide.

In one aspect, the heteroaryl is a 5- or 6-membered heteroaryl. In one aspect, the heteroaryl is a 5-membered heteroaryl, i.e., the heteroaryl is a monocyclic aromatic ring system having 5 ring atoms wherein at least one carbon atom of the ring is replaced with a heteroatom independently selected from nitrogen, oxygen, and sulfur. Non-limiting exemplary 5-membered heteroaryl groups include thienyl, furyl, pyrrolyl, oxazolyl, pyrazolyl, imidazolyl, thiazolyl, isothiazolyl, and isoxazolyl.

In another aspect, the heteroaryl is a 6-membered heteroaryl, e.g., the heteroaryl is a monocyclic aromatic ring system having 6 ring atoms wherein at least one carbon atom of the ring is replaced with a nitrogen atom. Non-limiting exemplary 6-membered heteroaryl groups include pyridyl, pyrazinyl, pyrimidinyl, and pyridazinyl.

In one aspect, the radical or point of attachment of the heteroaryl is on the aromatic ring, which can be either a carbon atom or a heteroatom.

In the present disclosure, the term "C-attached heteroaryl" or "carbon-attached heteroaryl" as used by itself or as part of another group refers to the heteroaryl which attaches to the remainder of the molecule at any available carbon atom on the heteroaryl ring.

In the present disclosure, the term "optionally substituted heteroaryl" as used by itself or as part of another group refers to a heteroaryl that is either unsubstituted or substituted with one to four substituents, e.g., one or two substituents, independently selected from the group consisting of halo, nitro, cyano, hydroxy, amino, alkylamino, dialkylamino, haloalkyl, hydroxyalkyl, alkoxy, haloalkoxy, aryloxy, aralkyloxy, alkylthio, carboxamido, sulfonamido, alkylcarbonyl, arylcarbonyl, alkylsulfonyl, arylsulfonyl, carboxy, carboxyalkyl, optionally substituted alkyl, optionally substituted cycloalkyl, alkenyl, alkynyl, aryl, heteroaryl, heterocyclo, (alkoxy)alkyl, (amino)alkyl, (carboxamido)alkyl, mercaptoalkyl, and (heterocyclo)alkyl. In one aspect, the optionally substituted heteroaryl has one substituent. Any available carbon or nitrogen atom can be substituted. Non-limiting exemplary substituted heteroaryl groups include, but are not limited to:

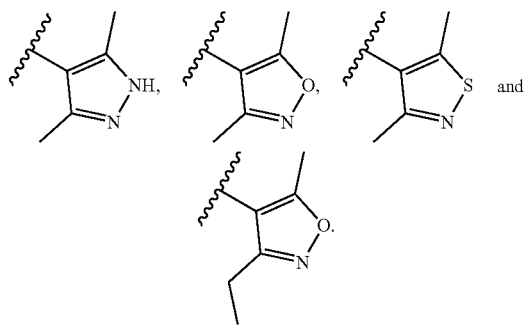

The term "optionally substituted heteroaryl" includes heteroaryl groups having a fused optionally substituted cycloalkyl or fused optionally substituted heterocyclo group. An optionally substituted heteroaryl having a fused optionally substituted cycloalkyl or fused optionally substituted heterocyclo group may be attached to the remainder of the molecule at any available carbon atom on the heteroaryl ring. Non-limiting examples include:

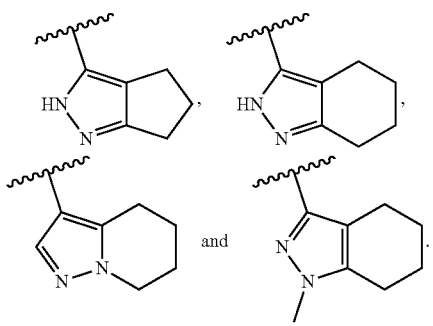

In the present disclosure, the term "halogen" is intended to include fluorine, chlorine, bromine and iodine.

In the present disclosure, the term "internucleoside linkage" refers to a naturally-occurring or modified linkage between two adjacent nucleosides in an oligonucleotide or a CDN. Naturally occurring RNA and DNA contain phosphorodiester internucleoside linkages. An example of a modified internucleoside linkage is a phosphorothioate linkage.

In the present disclosure, the term "chimeric nucleic acids" or "chimeric sequence" refers to a nucleic acid having different internucleoside linkages. In one aspect, the chimeric nucleic acid has a combination of a phosphorothioate linkage and a phosphonate linkage.

In the present disclosure, the term "heterochiral nucleic acids" refers to nucleic acids comprising internucleoside linkages containing phosphorous atoms in different stereochemical configurations. By analogy, the term "homochiral nucleic acids" refers to nucleic acids comprising internucleoside linkages containing phosphorous atoms in the same stereochemical configuration.

In the present disclosure, the term "protecting group" refers to a group that protects a functional group, such as alcohol, amine, carbonyl, carboxylic acid, phosphate, terminal alkyne, etc., from an unwanted chemical reaction. In some aspects, the functional group is a nucleophile. Examples of alcohol protecting groups include, but are not limited to, acetyl (Ac), benzoyl (Bz), benzyl (Bn), β-methoxyethoxymethyl ether (MEM), dimethoxytrityl (DMT), methoxymethyl ether (MOM), methoxytrityl (MMT), p-methoxybenzyl ether (PMB), trimethylsilyl (TMS), tert-butyldimethylsilyl (TBS), tert-Butyldiphenylsilyl ether (TBDPS), tri-iso-propylsilyloxymethyl (TOM), trityl (Triphenyl methyl, Tr), pivaloyl (Piv), and the like. In one aspect, the protecting group is the protecting group is 4,4'-dimethoxytrityl. Examples of amine protecting groups include, but are not limited to, carbobenzyloxy (Cbz), isobutyryl (iBu), p-methoxybenzyl carbonyl (MOZ), tert-butylcarbonyl (Boc), acetyl (Ac), benzoyl (Bz), benzyl (Bn), p-methoxybenzyl (PMB), p-methoxyphenyl (PMP), tosyl (Ts), and the like. Examples of carbonyl protecting groups include, but are not limited to, acetals and ketals, acylals, dithianes, and the like. Examples of carboxylic acid protecting groups include, but are not limited to, methyl esters, benzyl esters, tert-butyl esters, silyl esters, orthoesters, oxazoline, and the like. Examples of phosphate protecting groups include, but are not limited to, 2-cyanoethyl, methyl and the like. Examples of terminal alkyne protecting groups include, but are not limited to, propargyl and silyl groups. In one aspect, a protecting group is used to protect a 5'-hydroxy group of a nucleoside used in the methods of the present disclosure. In one aspect, the protecting group is DMT. In another aspect, a protecting group is used to protect a nucleobase of a nucleoside used in the methods of the present disclosure. In some aspects, the protecting group is an amine protecting group. In one aspect, the protecting group is Ac. In another aspect, the protecting group is Bz. In yet another aspect, the protecting group is iBu.

EXAMPLES

Useful embodiments of compounds/reagents and processes of the disclosure are provided in the following Examples. It should be understood that the Examples are given by way of illustration only.

General Experimental

Tetrahydrofuran (THF), N,N-dimethylformamide (DMF), dichloromethane (DCM), acetonitrile (MeCN) and methanol (MeOH) were obtained by passing the previously degassed solvents through an activated alumina column. DBU was purchased from Chem-Impex. All 5'-DMTr protected nucleosides carrying conventional nucleobase protections (T=none, A=benzoyl, G=isobutyryl, C=benzoyl) were purchased from Chem-Impex. All reagents were purchased at the highest commercial quality and used without further purification unless otherwise stated. Yields refer to chromatographically and spectroscopically ($^1$H NMR) homogeneous material, unless otherwise stated. Reactions were monitored by thin layer chromatography (TLC), GC/MS, GC/FID, or LC/MS. TLC was performed using 0.25 mm E. Merck silica plates (60F-254), using short-wave UV light as the visualizing agent, and phosphomolybdic acid, p-anisaldehyde, or KMnO$_4$ and heat as developing agents. NMR spectra were recorded on Bruker DRX-600, DRX-500, and AMX-400 instruments and are calibrated using residual undeuterated solvent (CHCl$_3$, CH$_2$Cl$_2$, DMSO, MeOH, acetone at 7.26, 5.32, 2.50, 3.31 and 2.05 ppm for $^1$H NMR, respectively, and 77.16, 53.84, 39.52, 49.00 and 29.84 ppm for $^{13}$C NMR, respectively). The following abbreviations were used to explain multiplicities: s=singlet, d=doublet, t=triplet, q=quartet, m=multiplet, br=broad. Column chromatography was performed using E. Merck silica gel (60, particle size 0.043-0.063 mm), and preparative TLC (pTLC) was performed on Merck silica plates (60F-254). High-resolution mass spectra (HRMS) were recorded on an Agilent LC/MSD TOF mass spectrometer by electrospray ionization time of flight reflectron experiments. Melting points were recorded on a Fisher-Johns 12-144 melting point apparatus and are uncorrected. The enantiomeric ratios were determined with Waters UPC2 SFC equipped with a photodiode array detector or an Agilent Technologies 1220 Infinity II LC HPLC. Optical rotation data was recorded on an Anton Paar 100 Modular Circular Polarimeter.

Example 1

Synthesis of PI Reagents

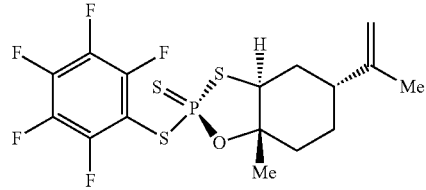

a. Synthesis of SI-1 and SI-2

Compounds SI-1 and SI-2 (both enantiomers) were synthesized according to published procedures. See Knouse, et al., Unlocking P(V): Reagents for chiral phosphorothioate synthesis, Science 2018, 361, 1234.

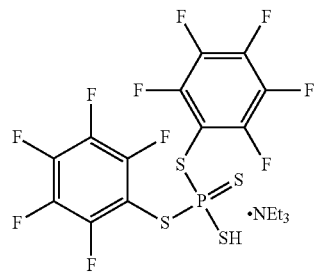

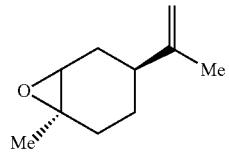

(−)-trans-limonene oxide

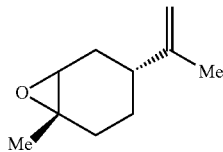

(+)-trans-limonene oxide b. Synthesis of (−)-Π (1a):

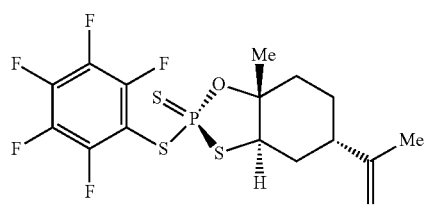

Synthesis of (−)-Π follows an analogous procedure to the previously reported synthesis of Ψ reagents, where detailed pictorial guides can be found. See Knouse, et al., Unlocking P(V): Reagents for chiral phosphorothioate synthesis, Science 2018, 361, 1234. To a solution of SI-1 (1.00 g, 1.68 mmol, 1.0 equiv.) and trans-(+)-limonene oxide SI-2 (0.383 g, 2.52 mmol, 1.5 equiv.) in dichloromethane (5.0 mL) was added trifluoroacetic acid (0.19 mL, 2.52 mmol, 1.5 equiv.) The reaction was warmed to 35° C. and allowed to stir for 1 hour. The reaction mixture was cooled to ambient temperature, and hexane (10 mL) was added into the batch to form a biphasic mixture. The stream was washed with water (5 mL), saturated NaHCO₃ (10 mL), and KH₂PO₄ (10% aqueous, 3 mL). The organic phase was filtered through a MgSO₄ pad and concentrated to ~3 mL. Methanol (5 mL) was added, the batch was concentrated to ~3 mL; this procedure was repeated twice. The mixture was cooled to 5-10° C. and stirred for 5 min. The resulting slurry was filtered and the reactor and cake were washed with cold methanol (1 mL). The filter cake was dried in vacuo to afford 1a [(−)-II] as a crystalline white solid (0.56 g, 75% yield, >20:1 d.r., >98:2 e.r.).

Physical state: white crystalline solid; m.p.=104-106° C.; [α]$^{25}_D$=−125° (c=1.00 in CHCl₃); R$_f$=0.50 (hexane:toluene=1:1).

¹H NMR (600 MHz, CDCl₃) δ 4.96 (s, 1H), 4.70 (d, J=2.1 Hz, 1H), 2.90 (dd, J=13.4, 2.9 Hz, 1H), 2.42 (s, 1H), 2.10 (ddp, J=13.7, 6.4, 2.2 Hz, 2H), 2.02 (ddd, J=12.5, 4.3, 2.7 Hz, 1H), 1.77-1.66 (m, 2H), 1.65 (s, 3H), 1.64 (s, 3H), 1.52 (td, J=13.3, 4.2 Hz, 1H).

¹³C NMR (151 MHz, CDCl₃) δ 148.86, 147.19, 144.69, 144.02, 142.28, 138.75, 137.05, 111.83, 104.30, 93.64, 93.60, 58.65, 58.64, 38.81, 34.21, 34.13, 28.39, 28.32, 24.89, 22.18, 18.74.

¹⁹F NMR (376 MHz, CDCl₃) δ −128.54 (dd, J=20.7, 4.6 Hz, 2F), −146.87 (ddd, J=25.5, 14.7, 6.0 Hz, 1F), −159.16-−160.51 (m, 2F).

³¹P NMR (162 MHz, CDCl₃) δ 102.08.

HRMS (ESI-TOF): calc'd for C₁₆H₁₇F₅OPS₃ [M+H]⁺: 447.0094, found: 447.0093.

c. Synthesis of (+)-II (1b):

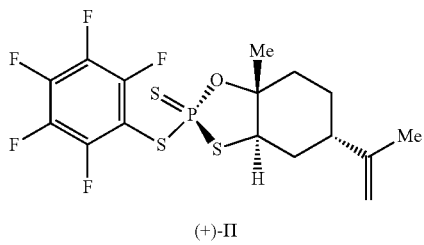

(+)-II

Synthesis of 1b followed the same procedures outlined for 1a. All characterization data were identical except the optical rotation, [α]$^{25}_D$=+124° (c=1.00 in CHCl₃).

Example 2

Synthesis of Adamantylmethanol Loaded Phosphonothioate

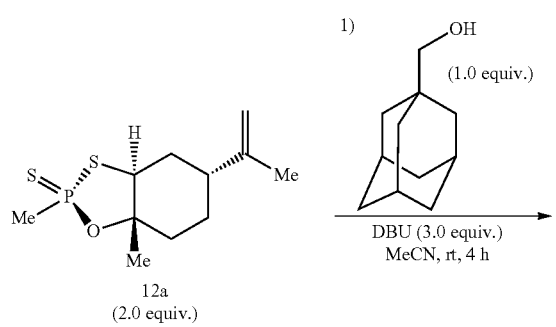

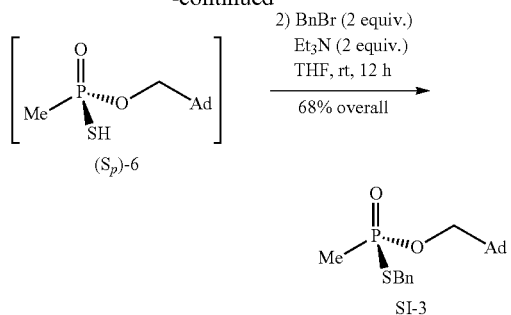

To a flame-dried culture tube under argon was charged 1-adamantanemethanol (16.6 mg, 0.1 mmol, 1.0 equiv.), 12a (52.5 mg, 0.2 mmol, 2.0 equiv.), and MeCN (1 mL). DBU (0.05 mL, 3.0 mmol, 3.0 equiv.) was added and the resulting solution was stirred for 4 h at rt. 2 mL of 1×PBS solution was added, and the mixture was extracted with DCM (3×3 mL). The combined organics were washed with brine (1 mL), dried over Na₂SO₄, filtered and concentrated. The resulting crude oil was dissolved in THF (1 mL). Et₃N (2 equiv.) and BnBr (2 equiv.) were added, and the resulting mixture was stirred for 12 h. The reaction was quenched with 1 mL of water and extracted with EtOAc (3×3 mL). The combined organics were dried over Na₂SO₄, filtered and concentrated. Purification by silica gel chromatography (hexane/EtOAc=5:2) afforded 24.0 mg (69%) of the title compound SI-3.

Physical State: colorless oil; R$_f$=0.40 (hexane/EtOAc=5:2).

¹H NMR (400 MHz, CDCl₃) δ 7.41-7.22 (m, 5H), 4.14-3.97 (m, 2H), 3.65 (dd, J=9.6, 6.5 Hz, 1H), 3.46 (dd, J=9.7, 6.8 Hz, 1H), 1.98 (s, 3H), 1.77-1.57 (m, 9H), 1.50 (d, J=2.9 Hz, 6H).

¹³C NMR (151 MHz, CDCl₃) δ 138.13, 138.11, 129.05, 128.82, 127.64, 74.81, 74.76, 39.02, 37.03, 34.68, 34.65, 33.68, 33.63, 28.10, 20.35, 19.62.

³¹P NMR (162 MHz, CDCl₃) δ 53.64.

HRMS (ESI-TOF): calc'd for C₁₉H₂₈O₂PS [M+H]⁺: 351.1548, found: 351.1546.

Example 3

Synthesis of Grignard and Organolithium Reagents a. Synthesis of Grignard Reagents All Grignard reagents were prepared from aryl bromides via Mg insertion in the presence of LiCl or purchased from commercial sources.

1. General Procedure for Mg Insertion:

LiCl (0.530 g, 12.5 mmol, 1.25 equiv.) was flame-dried under vacuum. After cooling, the flask was placed under Ar atmosphere, and Mg turnings (0.608 g, 25 mmol, 2.5 equiv.), iodine (a few grains) and THF (2 mL) were added. In a separate flask under Ar atmosphere, a solution of aryl bromide (10 mmol, 1.0 equiv.) in THF (8 mL) was prepared. A few drops of the aryl bromide solution in THF was added to the flask containing Mg, and the mixture was gently heated with a heat gun until the solution color changed from brown to colorless. The remaining aryl bromide solution was then slowly added. Upon complete addition, the mixture was placed in an oil bath (55° C.) and heated for 1-2 hr. The Grignard was titrated against iodine/LiCl before use following Knochel's published procedures.

The following Grignard reagents were synthesized using the above procedures:

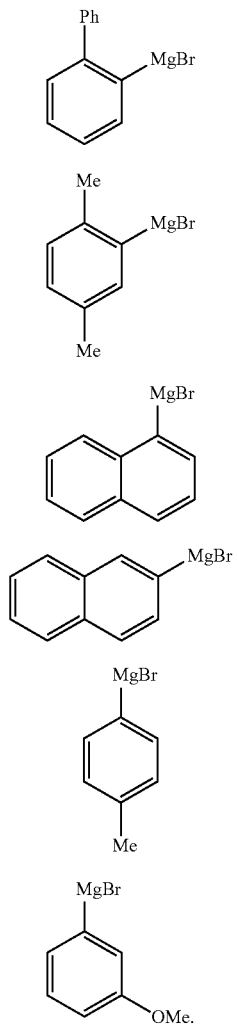

The following Grignard reagents were directly purchased from Sigma-Aldrich:

| PhMgBr | MeMgBr | EtMgBr | <image of 2-MeO-C6H4-MgBr> | Ph—≡—MgBr | CH2=CH-MgBr |
|---|---|---|---|---|---|
| 1.0M | 3.0M | 3.0M | 1.0M | 1.0M | 1.0M |
| SI-10 | SI-11 | SI-12 | SI-13 | SI-14 | SI-15. | b. Synthesis of Grignard Reagents

Unless otherwise stated, all organolithium reagents were freshly prepared by lithium-halogen exchange of aryl bromides, via direct deprotonation of terminal alkynes, or purchased from commercial sources. FcLi was prepared according to a published procedure. See Han, Z. S.; et al., Efficient Asymmetric Synthesis of P-Chiral Phosphine Oxides via Properly Designed and Activated Benzoxazaphosphinine-2-oxide Agents. *J. Am. Chem. Soc.* 2013, 135, 2474-2477.

1. General Procedure for Lithium-Halogen Exchange:

To a flame dried round-bottom flask under argon atmosphere was charged aryl bromide (11 mmol, 1.1 equiv.) and THF (40 mL). The mixture was cooled to −78° C. and nBuLi solution (10 mmol, 1.0 equiv.) was added dropwise. The resulting mixture was allowed to stir for 30 min at −78° C. and used directly.

The following organolithium reagents were synthesized using the above methods:

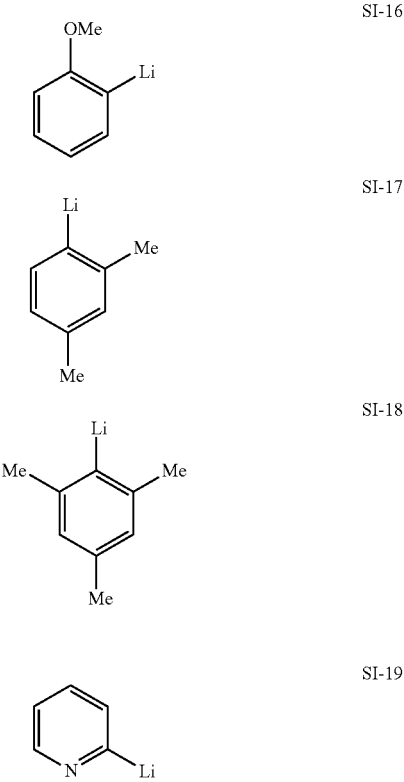

-continued

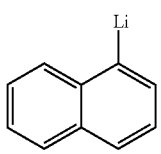

SI-20

-continued

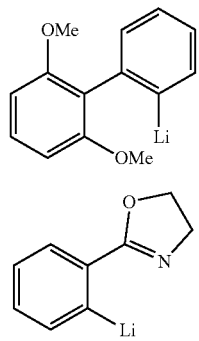
SI-21

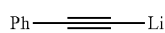
SI-22

Direct deprotonation of terminal alkynes follows the same procedure as lithium-halogen exchange. The following organolithium reagent was synthesized by direct deprotonation:

Ph≡≡Li  SI-23

2. Synthesis of FcLi:

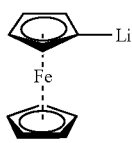
SI-24

To a flame dried round-bottom flask under argon atmosphere was charged ferrocene (186 mg, 1 mmol, 1.0 equiv.), $^t$BuOK (0.15 mL, 1.0 M, 0.15 mmol, 0.15 equiv.) and THF (8 mL). The reaction was cooled to −78° C. and $^t$BuLi (1.18 mL, 1.7 M, 2 mmol, 2.0 equiv.) was added dropwise. The resulting mixture was allowed to stir at −78° C. for 1 h, brought to 0° C. for 30 min, and then used directly.

The following organolithium reagents were purchased from Sigma-Aldrich:

| $^i$PrLi | $^n$BuLi | $^t$BuLi |
|---|---|---|
| 0.7M | 2.5M | 1.6M |
| SI-25 | SI-26 | SI-27. |

Example 4

Synthesis of P-Chiral Phosphine a. Loading

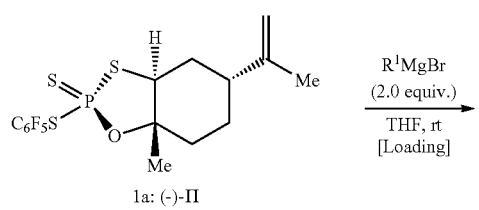
1a: (−)-Π

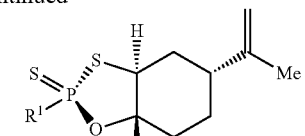
XXa

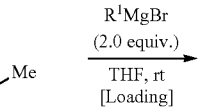
1b: (+)-Π

XXb

1. General Procedure A

To a flamed-dried 250 mL round-bottom flask was charged 1 (4.46 g, 10 mmol, 1 equiv.). The flask was evacuated and backfilled with argon, after which anhydrous THF (100 mL, 0.1 M) was introduced via syringe. Grignard reagent (20 mmol, 2 equiv.) was then added dropwise, and the resulting solution was allowed to stir at room temperature until $^{31}$P NMR showed complete consumption of starting material. The reaction was quenched with slow addition of saturated aqueous NH$_4$Cl solution (20 mL) and diluted with water (80 mL) and EtOAc (150 mL). The two layers were separated, and the aqueous layer was washed twice with EtOAc (2×80 mL). The combined organic layers were washed with saturated aqueous NaHCO$_3$ solution (50 mL), brine (50 mL), and dried over anhydrous Na$_2$SO$_4$. The mixture was then filtered, concentrated in vacuo, and purified by silica gel chromatography to afford the desired product.

2. Compound 8a:

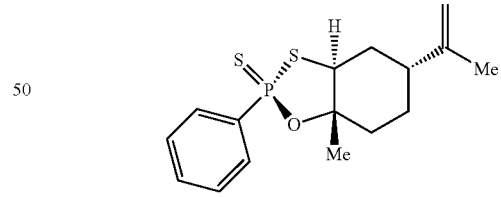

Following General Procedure A on 10 mmol scale with 1a and Grignard reagent SI-10. Reaction time 2 h. Purification by silica gel column chromatography (hexane/toluene=2:1 to 1:2) afforded 1.93 g (60%, >20:1 d.r.) of the title compound 8a. On 50 mmol scale, 9.20 g (57%, >20:1 d.r.) of 8a was obtained after purification. Physical State: white solid; m.p.=108-110° C.; $[\alpha]^{25}_D$=−27.3° (c=1.00 in CHCl$_3$); R$_f$=0.35 (hexane/toluene=1:2).

$^1$H NMR (400 MHz, CDCl$_3$) δ 7.87 (ddd, J=15.2, 8.1, 1.5 Hz, 2H), 7.56-7.40 (m, 3H), 4.98 (s, 1H), 4.89 (s, 1H), 3.86 (dd, J=13.2, 3.1 Hz, 1H), 2.50 (s, 1H), 2.26-2.09 (m, 3H), 2.08-1.84 (m, 2H), 1.83 (s, 3H), 1.73 (s, 3H).

$^{13}$C NMR (126 MHz, CDCl$_3$) δ 145.45, 138.93, 138.02, 132.21, 132.19, 130.30, 130.20, 128.70, 128.58, 111.94, 92.62, 92.59, 57.25, 57.24, 39.00, 34.91, 34.82, 29.05, 28.98, 25.36, 22.83, 19.33.

$^{31}$P NMR (162 MHz, CDCl$_3$) δ 97.21.

HRMS (ESI-TOF): calc'd for C$_{16}$H$_{22}$OPS$_2$ [M+H]$^+$: 325.0850, found: 325.0849.

3. Compound 8b:

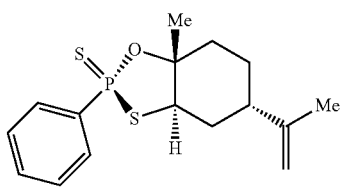 [SMILES: C=C(C)[C@H]1CC[C@@]2(C)O[P@@](=S)(c3ccccc3)S[C@@H]2C1]

Following General Procedure A on 10 mmol scale with 1b and Grignard reagent SI-10. Reaction time 2 h. Purification by silica gel column chromatography (hexane/toluene=2:1 to 1:2) afforded 2.11 g (65%, >20:1 d.r.) of the title compound 8b. All physical and spectroscopic properties are identical with 8a except for the optical rotation: [α]$^{25}_D$=+31.6° (c=1.00 in CHCl$_3$).

4. Compound 12a:

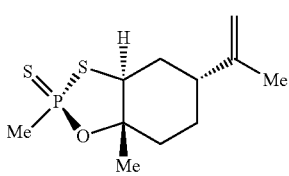

Following General Procedure A on 10 mmol scale with 1a and Grignard reagent SI-11. Reaction time 2 h. Purification by silica gel column chromatography (hexane/toluene/EtOAc=1:1:0 to 1:2:0 to 1:2:0.05) afforded 1.73 g (66%, >20:1 d.r.) of the title compound 12a.

Physical State: white solid; m.p.=102-105° C.; [α]$^{25}_D$=+136.4° (c=0.50 in CHCl$_3$); R$_f$=0.20 (hexane/toluene=1:2).

$^1$H NMR (400 MHz, CDCl$_3$) δ 5.01 (s, 1H), 4.89 (s, 1H), 3.74 (dd, J=13.3, 3.1 Hz, 1H), 2.48 (s, 1H), 2.23 (d, J=13.8 Hz, 1H), 2.20 (s, 3H), 2.17 (d, J=0.8 Hz, 3H), 2.11 (d, J=11.2 Hz, 1H), 2.06-2.00 (m, 1H), 1.80 (d, J=8.1 Hz, 3H), 1.76 (s, 3H), 1.68 (s, 3H).

$^{13}$C NMR (151 MHz, CDCl$_3$) δ 145.25, 112.07, 92.26, 92.23, 56.99, 56.97, 38.93, 35.16, 35.08, 31.27, 30.74, 28.99, 28.93, 25.21, 22.78, 18.85.

$^{31}$P NMR (162 MHz, CDCl$_3$) δ 106.19.

HRMS (ESI-TOF): calc'd for C$_{11}$H$_{20}$OPS$_2$ [M+H]$^+$: 263.0693, found: 263.0697.

5. Compound 12b:

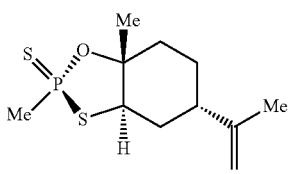

Following General Procedure A on 5 mmol scale with 1b and Grignard reagent SI-11. Reaction time 2 h. Purification by silica gel column chromatography (hexane/toluene/EtOAc=1:1:0 to 1:2:0 to 1:2:0.05) afforded 923 mg (70%, >20:1 d.r.) of the title compound 12b. On 25 mmol scale, 3.41 g (52%, >20:1 d.r.) of 12b was obtained after purification. All physical and spectroscopic properties are identical with 8a except for the [α]$^{25}_D$=−130.2° (c=0.50 in CHCl$_3$).

6. Compound 13a:

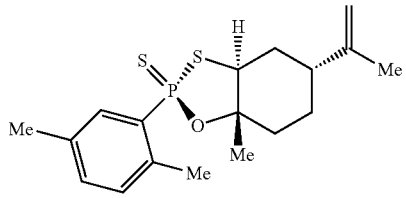 [SMILES: C=C(C)[C@@H]1CC[C@]2(C)O[P@](=S)(c3cc(C)ccc3C)S[C@H]2C1]

Following General Procedure A on 0.5 mmol scale with 1a and Grignard reagent SI-5. Reaction time 12 h. Purification by silica gel column chromatography (hexane/toluene=2:1 to 1:2) afforded 60 mg (33%, >20:1 d.r.) of the title compound 13a.

Physical State: colorless gel; [α]$^{25}_D$=−25.0° (c=0.70 in CHCl$_3$); R$_f$=0.41 (hexane/EtOAc=92:8). $^1$H NMR (400 MHz, CDCl$_3$) δ 7.51 (dd, J=15.2, 1.8 Hz, 1H), 7.23-7.09 (m, 2H), 4.85 (d, J=1.4 Hz, 1H), 4.78 (s, 1H), 3.55 (ddd, J=13.3, 3.2, 1.6 Hz, 1H), 2.70 (s, 3H), 2.44 (t, J=5.3 Hz, 1H), 2.33 (s, 3H), 2.23-2.06 (m, 3H), 2.02-1.81 (m, 3H), 1.79 (s, 3H), 1.66 (s, 3H).

$^{13}$C NMR (151 MHz, CDCl$_3$) δ 145.29, 137.41, 136.73, 136.68, 136.63, 135.04, 134.95, 132.36, 132.34, 132.29, 132.19, 129.44, 129.38, 111.88, 92.48, 92.44, 77.37, 77.16, 77.08, 76.95, 56.19, 56.17, 38.89, 34.78, 34.71, 28.96, 28.89, 25.35, 22.78, 21.56, 21.53, 21.13, 19.69.

$^{31}$P NMR (162 MHz, CDCl$_3$) δ 94.99.

HRMS (ESI-TOF): calc'd for C$_{18}$H$_{26}$OPS$_2$ [M+H]$^+$: 353.1163, found: 353.1168.

7. Compound 13b:

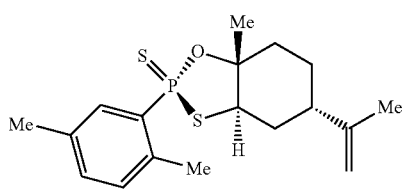 [SMILES: C=C(C)[C@H]1CC[C@@]2(C)O[P@@](=S)(c3cc(C)ccc3C)S[C@@H]2C1]

Following General Procedure A on 0.5 mmol scale with 1b and Grignard reagent SI-5. Reaction time 12 h. Purification by silica gel column chromatography (hexane/toluene=2:1 to 1:2) afforded 58 mg (32%, >20:1 d.r.) of the title compound 13b. All physical and spectroscopic properties are identical with 13a except for the optical rotation: [α]$^{25}_D$=+31° (c=0.60 in CHCl$_3$).

8. Compound 14a:

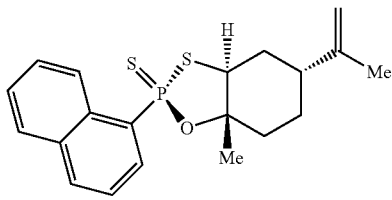 [SMILES: C=C(C)[C@@H]1CC[C@]2(C)O[P@](=S)(c3cccc4ccccc34)S[C@H]2C1]

Following General Procedure A on 1 mmol scale with 1a and Grignard reagent SI-6. Reaction time 12 h. Purification by silica gel column chromatography (hexane/toluene=2:1 to 1:2) afforded 292 mg (77%, >20:1 d.r.) of the title compound 14a.

Physical State: light yellow solid; m.p.=114-116° C.;
$[\alpha]^{25}_D$=−121.8° (c=1.00 in CHCl$_3$);
$R_f$=0.24 (hexane/Et$_2$O=9:1).
$^1$H NMR (500 MHz, CDCl$_3$) δ 8.84 (dd, J=8.4, 0.9 Hz, 1H), 8.03-7.83 (m, 3H), 7.65 (ddd, J=8.5, 6.9, 1.4 Hz, 1H), 7.56 (ddd, J=8.1, 6.9, 1.2 Hz, 1H), 7.47 (ddd, J=8.1, 7.3, 3.6 Hz, 1H), 4.80 (d, J=1.4 Hz, 1H), 4.73 (s, 1H), 3.57 (ddd, J=13.3, 3.2, 1.6 Hz, 1H), 2.44 (d, J=6.0 Hz, 1H), 2.22 (ddd, J=12.4, 4.4, 2.8 Hz, 1H), 2.16-2.08 (m, 2H), 2.02-1.78 (m, 3H), 1.86 (s, 3H), 1.62 (d, J=1.3 Hz, 3H).
$^{13}$C NMR (151 MHz, CDCl$_3$) δ 163.86, 163.74, 159.73, 159.72, 145.52, 145.34, 145.15, 136.41, 136.32, 134.58, 133.59, 131.03, 130.99, 129.45, 129.43, 129.17, 129.08, 128.80, 127.79, 114.09, 114.07, 114.03, 97.12, 87.93, 87.76, 87.69, 86.90, 86.86, 85.92, 85.89, 75.87, 75.84, 72.60, 65.22, 65.18, 63.37, 55.55, 42.11, 40.79, 40.77, 26.16, 18.50, 12.25, 11.30, −4.52, −4.65.
$^{31}$P NMR (162 MHz, CDCl$_3$) δ 92.77.
HRMS (ESI-TOF): calc'd for C$_{20}$H$_{24}$OPS$_2$ [M+H]$^+$: 375.1006, found: 375.1006.

9. Compound 14b:

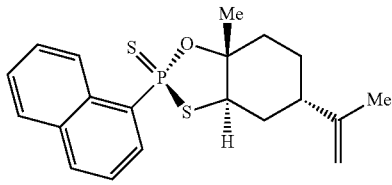 [SMILES: C=C(C)[C@H]1CC[C@@]2(C)O[P@@](=S)(c3cccc4ccccc34)S[C@@H]2C1]

Following General Procedure A on 0.5 mmol scale with 1b and Grignard reagent SI-6. Reaction time 12 h. Purification by silica gel column chromatography (hexane/toluene=2:1 to 1:2) afforded 152 mg (80%, >20:1 d.r.) of the title compound 14b. All physical and spectroscopic properties are identical with 14a except for the optical rotation:
$[\alpha]^{25}_D$=+125.1° (c=0.35 in DCM).

10. Compound 15a:

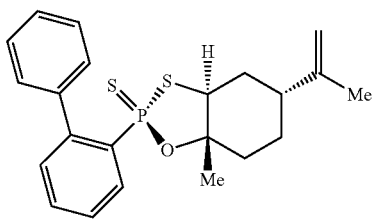 [SMILES: C=C(C)[C@@H]1CC[C@]2(C)O[P@](=S)(c3ccccc3-c3ccccc3)S[C@H]2C1]

Following General Procedure A on 0.5 mmol scale with 1a and Grignard reagent SI-4. Reaction time 12 h. Purification by silica gel column chromatography (hexane/toluene=2:1 to 1:2) afforded 74 mg (37%, >20:1 d.r.) of the title compound 15a.

Physical State: light yellow gel
$[\alpha]^{25}_D$=−83.8° (c=0.22 in DCM)
$R_f$=0.31 (hexane/Et$_2$O=9:1)
$^1$H NMR (400 MHz, CDCl$_3$) δ 7.44 (dd, J=7.6, 1.4 Hz, 1H), 7.40-7.27 (m, 8H), 4.95 (d, J=1.4 Hz, 1H), 4.89-4.82 (m, 1H), 3.74 (ddd, J=13.3, 3.2, 1.6 Hz, 1H), 2.50 (s, 1H), 2.25-2.10 (m, 3H), 1.97-1.77 (m, 3H), 1.75 (s, 3H), 1.74-1.71 (m, 3H).
$^{13}$C NMR (151 MHz, CDCl$_3$) δ 145.07, 143.68, 140.20, 131.89, 131.05, 129.01, 128.55, 128.41, 128.25, 127.68, 112.31, 93.62, 93.59, 56.99, 56.97, 38.84, 34.76, 34.68, 28.76, 28.69, 25.31, 22.78, 19.60.
$^{31}$P NMR (162 MHz, CDCl$_3$) δ 77.83.
HRMS (ESI-TOF): calc'd for C$_{22}$H$_{26}$OPS$_2$ [M+H]$^+$: 401.1163, found: 401.1157.

11. Compound 15b:

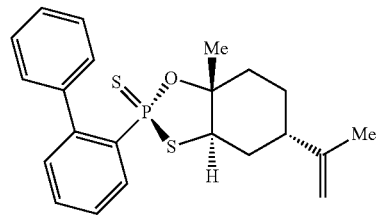 [SMILES: C=C(C)[C@H]1CC[C@@]2(C)O[P@@](=S)(c3ccccc3-c3ccccc3)S[C@@H]2C1]

Following General Procedure A on 4 mmol scale with 1b and Grignard reagent SI-4. Reaction time 2 h. Purification by silica gel column chromatography (hexane/toluene=2:1 to 1:2) afforded 882 mg (55%, >20:1 d.r.) of the title compound 15b. All physical and spectroscopic properties are identical with 15a except for the optical rotation:
$[\alpha]^{25}_D$=+95.7° (c=1.00 in CHCl$_3$).

12. Compound 16a:

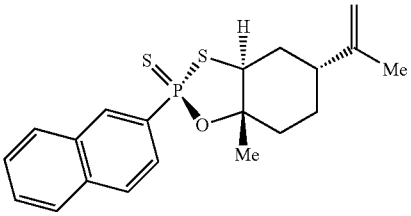 [SMILES: C=C(C)[C@@H]1CC[C@]2(C)O[P@](=S)(c3ccc4ccccc4c3)S[C@H]2C1]

Following General Procedure A on 0.5 mmol scale with 1a and Grignard reagent SI-7. Reaction time 12 h. Purification by silica gel column chromatography (hexane/toluene=2:1) afforded 126 mg (68%, >20:1 d.r.) of the title compound 16a.

Physical State: light yellow gel
$[\alpha]^{25}_D$=−48.8° (c=0.50 in CHCl$_3$)
$R_f$=0.2 (hexane/toluene=2:1)
$^1$H NMR (400 MHz, CDCl$_3$) δ 8.41 (d, J=17.9 Hz, 1H), 7.95-7.81 (m, 4H), 7.63-7.53 (m, 2H), 4.99 (d, J=1.4 Hz, 1H), 4.92 (s, 1H), 3.95 (dd, J=13.3, 3.1 Hz, 1H), 2.51 (s, 1H), 2.26-2.15 (m, 3H), 2.09 (td, J=13.3, 12.6, 4.1 Hz, 1H), 1.99-1.88 (m, 2H), 1.87 (s, 3H), 1.73 (s, 3H).
$^{13}$C NMR (151 MHz, CDCl$_3$) δ 144.93, 135.15, 134.39, 134.31, 134.29, 131.82, 131.71, 131.46, 131.38, 128.80, 128.20, 128.10, 127.93, 127.29, 126.61, 124.81, 124.72, 111.35, 92.14, 92.11, 56.73, 56.72, 38.47, 34.38, 34.31, 28.49, 28.43, 24.82, 22.26, 18.84.

$^{31}$P NMR (162 MHz, CDCl$_3$) δ 97.21.

HRMS (ESI-TOF): calc'd for C$_{20}$H$_{24}$OPS$_2$ [M+H]$^+$: 375.1006, found: 375.0999.

13. Compound 16b:

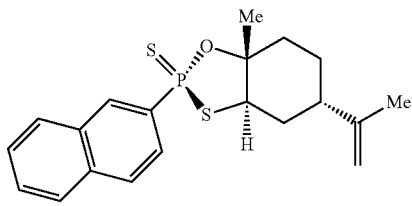 [SMILES: C=C(C)[C@H]1CC[C@@]2(C)O[P@@](=S)(c3ccc4ccccc4c3)S[C@@H]2C1]

Following General Procedure A on 0.5 mmol scale with 1b and Grignard reagent SI-7. Reaction time 12 h. Purification by silica gel column chromatography (hexane/toluene=2:1) afforded 137 mg (72%, >20:1 d.r.) of the title compound 16b. All physical and spectroscopic properties are identical with 16a except for the optical rotation: [α]$^{25}_D$=+40.1° (c=0.21 in DCM).

14. Compound 17a:

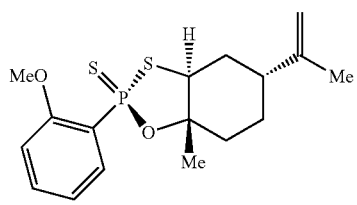 [SMILES: C=C(C)[C@@H]1CC[C@]2(C)O[P@](=S)(c3ccccc3OC)S[C@H]2C1]

Following General Procedure A on 2 mmol scale with 1a and Grignard reagent SI-13. Reaction time 12 h. Purification by silica gel column chromatography (hexane/toluene/EtOAc=2:1:0 to 1:1:0 to 1:1:0.05) afforded 420 mg (59%, >20:1 d.r.) of the title compound 17a.

Physical State: colorless oil

[α]$^{25}_D$=−38.2° (c=0.50 in DCM)

R$_f$=0.22 (hexane/Et$_2$O=9:1)

$^1$H NMR (400 MHz, CDCl$_3$) δ 7.98 (ddd, J=17.3, 7.7, 1.7 Hz, 1H), 7.52-7.42 (m, 1H), 7.01 (tdd, J=7.6, 3.4, 1.0 Hz, 1H), 6.95 (ddd, J=8.2, 7.1, 0.9 Hz, 1H), 4.95 (q, J=1.4 Hz, 1H), 4.88 (s, 1H), 3.98 (ddd, J=13.5, 3.1, 0.7 Hz, 1H), 3.92 (s, 3H), 2.48 (s, 1H), 2.25-2.07 (m, 3H), 2.00-1.84 (m, 3H), 1.82 (s, 3H), 1.73 (dt, J=1.4, 0.7 Hz, 3H).

$^{13}$C NMR (151 MHz, CDCl$_3$) δ 159.92, 159.89, 145.68, 134.24, 134.22, 134.07, 134.01, 125.12, 124.37, 120.49, 120.39, 111.99, 111.94, 111.88, 92.25, 92.22, 56.65, 56.64, 55.93, 39.05, 34.93, 34.85, 28.82, 28.76, 25.26, 22.78, 19.49.

$^{31}$P NMR (162 MHz, CDCl$_3$) δ 93.72.

HRMS (ESI-TOF): calc'd for C$_{17}$H$_{24}$O$_2$PS$_2$ [M+H]$^+$: 355.0955, found: 355.0951.

15. Compound 17b:

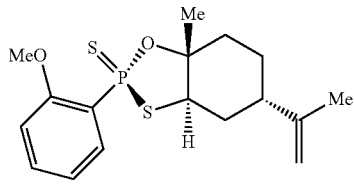 [SMILES: C=C(C)[C@H]1CC[C@@]2(C)O[P@@](=S)(c3ccccc3OC)S[C@@H]2C1]

Following General Procedure A on 2.5 mmol scale with 1b and Grignard reagent SI-13. Reaction time 12 h. Purification by silica gel column chromatography (hexane/toluene/EtOAc=2:1:0 to 1:1:0 to 1:1:0.05) afforded 525 mg (59%, >20:1 d.r.) of the title compound 17b. All physical and spectroscopic properties are identical with 17a except for the optical rotation: [α]$^{25}_D$=+50.8° (c=1.00 in CHCl$_3$).

16. Compound 18a:

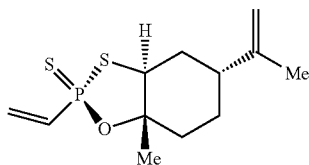 [SMILES: C=C[P@@]1(=S)O[C@@]2(C)CC[C@@H](C(=C)C)C[C@@H]2S1]

Following General Procedure A on 1 mmol scale with 1a and Grignard reagent SI-15. Reaction time 0.5 h. Purification by silica gel column chromatography (hexane/toluene=2:1 to 1:1) afforded 146 mg (54%, >20:1 d.r.) of the title compound 18a.

Physical State: colorless oil

[α]$^{25}_D$=+12.5° (c=0.28 in CHCl$_3$)

R$_f$=0.41 (hexane/Et$_2$O=9:1)

$^1$H NMR (500 MHz, CDCl$_3$) δ 6.38 (ddd, J=29.8, 17.7, 11.4 Hz, 1H), 6.20 (ddd, J=29.4, 17.7, 1.3 Hz, 1H), 5.98 (ddd, J=57.5, 11.4, 1.3 Hz, 1H), 4.99 (d, J=1.5 Hz, 1H), 4.88 (s, 1H), 3.74 (dd, J=13.3, 3.2 Hz, 1H), 2.48 (s, 1H), 2.22 (dd, J=13.8, 1.8 Hz, 1H), 2.16-2.09 (m, 1H), 2.06 (dd, J=7.3, 4.7 Hz, 1H), 1.92-1.77 (m, 3H), 1.75 (dt, J=1.5, 0.8 Hz, 3H), 1.72 (s, 3H).

$^{13}$C NMR (151 MHz, CDCl$_3$) δ 163.86, 163.74, 159.73, 159.72, 145.52, 145.34, 145.15, 136.41, 136.32, 134.58, 133.59, 131.03, 130.99, 129.45, 129.43, 129.17, 129.08, 128.80, 127.79, 114.09, 114.07, 114.03, 97.12, 87.93, 87.76, 87.69, 86.90, 86.86, 85.92, 85.89, 75.87, 75.84, 72.60, 65.22, 65.18, 63.37, 55.55, 42.11, 40.79, 40.77, 26.16, 18.50, 12.25, 11.30, −4.52, −4.65.

$^{31}$P NMR (162 MHz, CDCl$_3$) δ 93.96.

HRMS (ESI-TOF): calc'd for C$_{12}$H$_{20}$OPS$_2$ [M+H]$^+$: 275.0693, found: 275.0695.

17. Compound 18b:

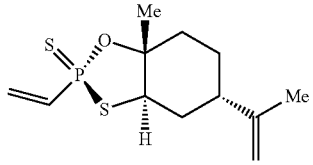 [SMILES: C=C[P@]1(=S)O[C@]2(C)CC[C@H](C(=C)C)C[C@H]2S1]

Following General Procedure A on 0.5 mmol scale with 1b and Grignard reagent SI-15. Reaction time 0.5 h. Purification by silica gel column chromatography (hexane/toluene=2:1 to 1:1) afforded 85 mg (63%, >20:1 d.r.) of the title compound 18b. All physical and spectroscopic properties are identical with 18a except for the optical rotation: [α]$^{25}_D$=−7.96° (c=0.21 in DCM).

18. Compound 19a:

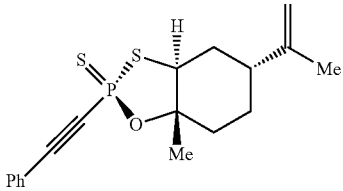 [SMILES: C=C(C)[C@@H]1CC[C@]2(C)O[P@](=S)(C#Cc3ccccc3)S[C@H]2C1]

Following General Procedure A on 1 mmol scale with 1a and Grignard reagent SI-14. Reaction time 1 h. Purification by silica gel column chromatography (hexane/toluene=2:1 to 1:2) afforded 232 mg (67%, >20:1 d.r.) of the title compound 19a.

Physical State: light yellow solid m.p.=107-110° C.

[α]$^{25}_D$=+115.3° (c=0.22 in DCM).

$R_f$=0.24 (hexane/Et$_2$O=9:1)

$^1$H NMR (500 MHz, CDCl$_3$) δ 7.57-7.49 (m, 2H), 7.48-7.40 (m, 1H), 7.40-7.33 (m, 2H), 5.02 (d, J=1.5 Hz, 1H), 4.95 (s, 1H), 4.14 (dt, J=13.2, 2.7 Hz, 1H), 2.51 (t, J=6.0 Hz, 1H), 2.29 (ddd, J=13.8, 3.4, 1.7 Hz, 1H), 2.15 (d, J=15.0 Hz, 1H), 2.10 (ddd, J=12.5, 4.4, 2.9 Hz, 1H), 2.03-1.86 (m, 2H), 1.85-1.79 (m, 1H), 1.78 (s, 3H), 1.67 (s, 3H).

$^{13}$C NMR (151 MHz, CDCl$_3$) δ 145.31, 132.66, 132.65, 130.72, 128.62, 120.06, 120.03, 112.15, 99.29, 99.03, 93.04, 93.01, 87.23, 85.86, 57.13, 57.10, 39.01, 35.14, 35.06, 29.03, 28.96, 25.49, 22.86, 19.79.

$^{31}$P NMR (162 MHz, CDCl$_3$) δ 60.28.

HRMS (ESI-TOF): calc'd for C$_{18}$H$_{22}$OPS$_2$ [M+H]$^+$: 349.0850, found: 349.0841.

19. Compound 19b:

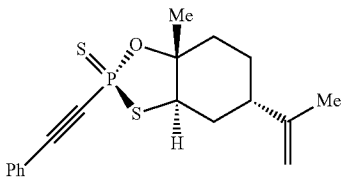 [SMILES: C=C(C)[C@H]1CC[C@@]2(C)O[P@@](=S)(C#Cc3ccccc3)S[C@@H]2C1]

Following General Procedure A on 0.5 mmol scale with 1b and Grignard reagent SI-14. Reaction time 1 h. Purification by silica gel column chromatography (hexane/toluene=2:1 to 1:2) afforded 118 mg (68%, >20:1 d.r.) of the title compound 19b. All physical and spectroscopic properties are identical with 19a except for the optical rotation: [α]$^{25}_D$=−104.0° (c=0.20 in DCM).

b. Coupling

1. General Procedure B (One-Pot MeI Quench):

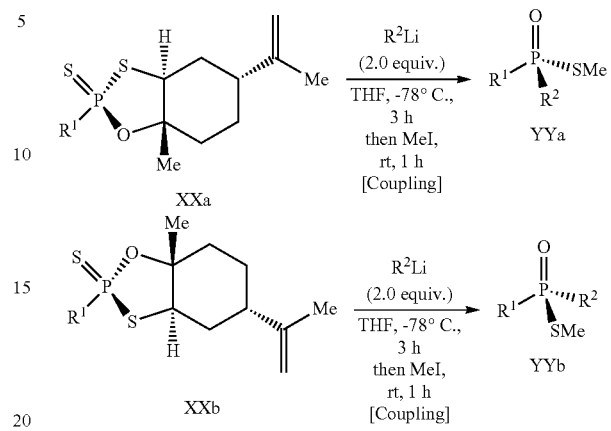

The organolithium reagent (4.0 mmol, 2.0 equiv., see Example 3, Synthesis of Grignard and Organolithium Reagents) in 14 mL of THF was cooled to −78° C. if not already at such temperature. A solution of the starting material (2.0 mmol, 1.0 equiv.) in 6 mL THF was prepared in a flame-dried flask under argon atmosphere, which was then added dropwise to the flask containing the organolithium reagent. The resulting mixture was stirred for 3 h while being kept at −78° C. After $^{31}$P NMR analysis of a small aliquot showed complete consumption of starting material, the reaction was quenched with an excess of methyl iodide (8.0 mmol, 4.0 equiv.), warmed to room temperature, and stirred for another hour. To the resulting mixture was added saturated aqueous NH$_4$Cl solution (20 mL) and EtOAc (40 mL). The layers were separated, and the aqueous layer was washed with EtOAc (2×20 mL). The combined organic layers were washed with brine (20 mL), dried over anhydrous Na$_2$SO$_4$, filtered and concentrated. The residue was purified by silica gel chromatography to afford the desired product.

2. General Procedure C (Stepwise):

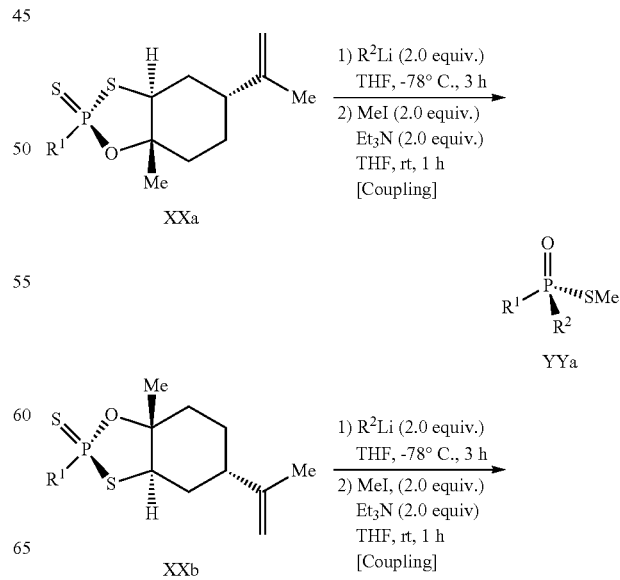

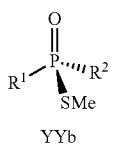

The organolithium reagent (4.0 mmol, 2.0 equiv., see Example 3, Synthesis of Grignard and Organolithium Reagents) in 14 mL of THF was cooled to −78° C. if not already at such temperature. A solution of the starting material (2.0 mmol, 1.0 equiv.) in 6 mL THF was prepared in a flame-dried flask under argon atmosphere, which was then added dropwise to the flask containing the organolithium reagent. The resulting mixture was stirred for 3 h while being kept at −78° C. After $^{31}$P NMR analysis of a small aliquot showed complete consumption of starting material, the reaction was carefully quenched with slow addition of saturated aqueous NH$_4$Cl solution (20 mL) and then diluted with water (10 mL) and DCM (40 mL). The layers were separated, and the aqueous layer was washed with DCM (2×20 mL). The combined organic layers were washed with brine (20 mL), dried over anhydrous Na$_2$SO$_4$, filtered and concentrated. The residue was dissolved in THF (10 mL), to which Et$_3$N (4.0 mmol, 2.0 equiv.) and MeI (4.0 mmol, 2.0 equiv.) were added. After stirring for 1 h, the reaction was diluted with water (20 mL) and extracted with EtOAc (3×40 mL). The combined organic layers were washed with brine (20 mL), dried over anhydrous Na$_2$SO$_4$, filtered and concentrated. The residue was purified by silica gel chromatography to afford the desired product.

3. Compound 11a

Following General Procedure B on 4 mmol scale with 8a and organolithium reagent SI-16. Purification by silica gel column chromatography (hexane/EtOAc=2:1 to 1:2) afforded 916 mg (82%, >98:2 e.r.) of the title compound 11a. On 20 mmol scale, 4.70 g (84%, >98:2 e.r.) of 11a was obtained after purification.

Physical State: light yellow solid
m.p.=89-92° C.
$[\alpha]^{25}_D$=−13.1° (c=1.00 in CHCl$_3$)
$R_f$=0.42 (hexane/EtOAc=1:2)
$^1$H NMR (400 MHz, CDCl$_3$) δ 7.97 (dddd, J=14.2, 7.6, 1.8, 0.4 Hz, 1H), 7.94-7.86 (m, 2H), 7.55-7.40 (m, 4H), 7.08 (tdd, J=7.5, 2.5, 0.9 Hz, 1H), 6.89 (ddd, J=8.3, 6.1, 0.9 Hz, 1H), 3.71 (s, 3H), 2.27 (d, J=12.3 Hz, 3H).
$^{13}$C NMR (126 MHz, CDCl$_3$) δ 160.45, 160.41, 134.73, 134.55, 134.53, 134.01, 133.95, 133.85, 131.89, 131.86, 131.53, 131.44, 128.36, 128.25, 121.66, 120.99, 120.89, 120.82, 111.66, 111.60, 55.57, 10.43, 10.41.
$^{31}$P NMR (162 MHz, CDCl$_3$) δ 41.34.
HRMS (ESI-TOF): calc'd for C$_{14}$H$_{16}$O$_2$PS [M+H]$^+$: 279.0609, found: 279.0612.

4. Compound 11b

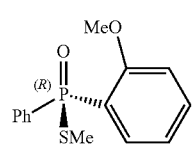

Following General Procedure B on 5 mmol scale with 8b and organolithium reagent SI-16. Purification by silica gel column chromatography (hexane/EtOAc=2:1 to 1:2) afforded 1.07 g (77%, >98:2 e.r.) of the title compound 11b.

All physical and spectroscopic properties are identical with 11a except for the optical rotation: $[\alpha]^{25}_D$=+15.6 (c=1.00 in CHCl$_3$).

5. Compound 20a

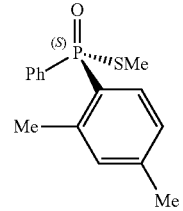

Following General Procedure B on 0.5 mmol scale with 8a and organolithium reagent SI-17. Purification by silica gel column chromatography (hexane/EtOAc=3:1 to 1:1) afforded 72.0 mg (52%, >98:2 e.r.) of the title compound 20a.

Physical State: white amorphous solid
$[\alpha]^{25}_D$=+15.5 (c=0.40 in CHCl$_3$)
$R_f$=0.45 (hexane/EtOAc=1:2)
$^1$H NMR (400 MHz, CDCl$_3$) δ 7.85-7.76 (m, 2H), 7.65 (dd, J=14.8, 8.3 Hz, 1H), 7.57-7.50 (m, 1H), 7.50-7.43 (m, 2H), 7.07 (ddd, J=5.5, 1.6, 0.8 Hz, 2H), 2.49 (s, 1H), 2.35 (s, 4H), 2.27 (d, J=11.9 Hz, 3H).
$^{13}$C NMR (126 MHz, CDCl$_3$) δ 143.15, 143.13, 142.59, 142.51, 134.02, 133.17, 133.14, 133.12, 133.04, 133.02, 132.22, 132.20, 131.68, 131.60, 128.81, 128.71, 127.83, 126.98, 126.46, 126.35, 21.65, 21.62, 21.50, 10.83, 10.81.
$^{31}$P NMR (162 MHz, CDCl$_3$) δ 46.50.
HRMS (ESI-TOF): calc'd for C$_{15}$H$_{18}$OPS [M+H]$^+$: 277.0816, found: 277.0818.

6. Compound 20b

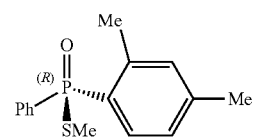

Following General Procedure B on 1 mmol scale with 8b and organolithium reagent SI-17. Purification by silica gel column chromatography (hexane/EtOAc=3:1 to 1:1) afforded 176 mg (64%, >98:2 e.r.) of the title compound 20b. All physical and spectroscopic properties are identical with 20a except for the optical rotation: $[\alpha]^{25}_D$=−15.1° (c=0.40 in CHCl$_3$).

7. Compound 21a

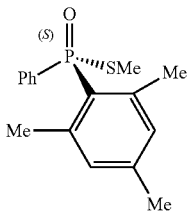

Following General Procedure C on 0.2 mmol scale with 8a and organolithium reagent SI-18. Purification by pTLC (hexane/EtOAc=1:1) afforded 47 mg (81%, 61:39 e.r.) of the title compound 21a.

Physical State: colorless oil
[α]$^{25}_D$=−4.9° (c=0.45 in CHCl$_3$)
R$_f$=0.45 (hexane/EtOAc=1:2)
$^1$H NMR (400 MHz, CDCl$_3$) δ 7.82-7.73 (m, 2H), 7.53-7.39 (m, 3H), 6.89 (dd, J=4.3, 0.6 Hz, 2H), 2.44 (s, 6H), 2.39 (d, J=11.8 Hz, 3H), 2.29 (s, 3H).
$^{13}$C NMR (151 MHz, CDCl$_3$) δ 143.55, 143.48, 142.30, 142.28, 137.36, 136.66, 131.89, 131.87, 131.39, 131.31, 130.51, 130.44, 128.92, 128.83, 125.85, 125.16, 23.76, 23.74, 21.19, 21.18, 11.02, 11.00.
$^{31}$P NMR (162 MHz, CDCl$_3$) δ 47.36.
HRMS (ESI-TOF): calc'd for C$_{16}$H$_{20}$OPS [M+H]$^+$: 291.0972, found: 291.0975.

8. Compound 21b

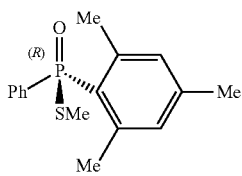

Following General Procedure C on 0.2 mmol scale with 8b and organolithium reagent SI-18. Purification by pTLC (hexane/EtOAc=1:1) afforded 48 mg (83%, 37:63 e.r.) of the title compound 21b. All physical and spectroscopic properties are identical with 21a except for the optical rotation: [α]$^{25}_D$=+3.5° (c=1.00 in CHCl$_3$).

9. Compound 22a

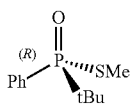

Following General Procedure B on 2 mmol scale with 8a and organolithium reagent SI-27. Purification by silica gel column chromatography (hexane/EtOAc=2:1 to 1:2) afforded 364 mg (80%, >98:2 e.r.) of the title compound 22a.
Physical State: white solid
m.p.=80-82° C.
[α]$^{25}_D$=+142.5° (c=1.00 in CHCl$_3$)
R$_f$=0.56 (hexane:EtOAc=1:2)
$^1$H NMR (400 MHz, CDCl$_3$) δ 7.92-7.85 (m, 2H), 7.56-7.44 (m, 3H), 2.12 (d, J=10.5 Hz, 3H), 1.17 (d, J=16.9 Hz, 9H).
$^{13}$C NMR (151 MHz, CDCl$_3$) δ 133.23, 133.17, 132.06, 132.04, 130.64, 130.03, 128.47, 128.39, 36.67, 36.20, 24.80, 9.61, 9.59.
$^{31}$P NMR (162 MHz, CDCl$_3$) δ 68.92.
HRMS (ESI-TOF): calc'd for C$_{11}$H$_{18}$OPS [M+H]$^+$: 229.0806, found: 229.0818.

10. Compound 22b

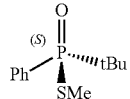

Following General Procedure B on 2 mmol scale with 8b and organolithium reagent SI-27. Purification by silica gel column chromatography (hexane/EtOAc=2:1 to 1:2) afforded 352 mg (77%, >98:2 e.r.) of the title compound 22b. All physical and spectroscopic properties are identical with 22a except for the optical rotation: [α]$^{25}_D$=−135.2° (c=1.00 in CHCl$_3$).

11. Compound 23a

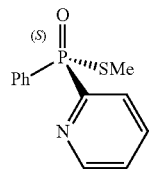

Following General Procedure C on 0.2 mmol scale with 8a and organolithium reagent SI-19. Purification by silica gel column chromatography (hexane/EtOAc=1:2 to pure EtOAc) afforded 15.1 mg (30%, >98:2 e.r.) of the title compound 23a.
Physical State: light yellow oil
[α]$^{25}_D$=−21.6° (c=0.38 in CHCl$_3$)
R$_f$=0.34 (hexane/EtOAc=1:4)
$^1$H NMR (600 MHz, CDCl$_3$) δ 8.81 (d, J=4.7 Hz, 1H), 8.16 (ddt, J=7.7, 5.5, 1.1 Hz, 1H), 8.12-8.02 (m, 2H), 7.83 (tdd, J=7.7, 4.8, 1.7 Hz, 1H), 7.57-7.52 (m, 1H), 7.50-7.45 (m, 2H), 7.40 (dddd, J=7.6, 4.8, 2.7, 1.3 Hz, 1H), 2.23 (d, J=12.2 Hz, 3H).
$^{13}$C NMR (151 MHz, CDCl$_3$) δ 156.56, 155.64, 150.74, 150.60, 136.49, 136.42, 132.63, 132.61, 132.18, 132.14, 132.07, 131.48, 128.73, 128.66, 128.65, 128.15, 128.00, 125.92, 125.90, 10.21, 10.19.
$^{31}$P NMR (162 MHz, CDCl$_3$) δ 40.29.
HRMS (ESI-TOF): calc'd for C$_{12}$H$_{13}$NOPS [M+H]$^+$: 250.0455, found: 250.0459.

12. Compound 23b

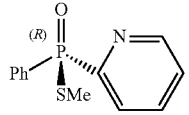

Following General Procedure C on 0.2 mmol scale with 8b and organolithium reagent SI-19. Purification by silica gel column chromatography (hexane/EtOAc=1:2 to pure EtOAc) afforded 15.9 mg (32%, 98:2 e.r.) of the title compound 23b. All physical and spectroscopic properties are identical with 23a except for the optical rotation: [α]$^{25}_D$=+24.1° (c=0.80 in CHCl$_3$).

13. Compound 24a

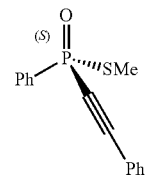

Following General Procedure C on 0.05 mmol scale with 8a and organolithium reagent SI-23. Purification by pTLC (hexane/EtOAc=1:1) afforded 8.6 mg (63%, >98:2 e.r.) of the title compound 24a.

Physical State: white amorphous solid
[α]$_D^{25}$=−10.5° (c=0.43 in CHCl$_3$)
R$_f$=0.50 (hexane/EtOAc=1:2)
$^1$H NMR (500 MHz, CDCl$_3$) δ 8.01 (dd, J=15.1, 8.4 Hz, 2H), 7.66-7.50 (m, 5H), 7.46 (t, J=7.5 Hz, 1H), 7.38 (t, J=8.1 Hz, 2H), 2.40 (d, J=14.1 Hz, 3H).
$^{13}$C NMR (126 MHz, CDCl$_3$) δ 133.07, 133.04, 132.93, 132.76, 132.74, 131.90, 131.12, 131.03, 128.98, 128.86, 128.75, 119.75, 119.71, 104.97, 104.71, 83.08, 81.64, 11.56, 11.53.
$^{31}$P NMR (162 MHz, CDCl$_3$) δ 18.40.
HRMS (ESI-TOF): calc'd for C$_{15}$H$_{14}$OPS [M+H]$^+$: 273.0503, found: 273.0508.

14. Compound 24b

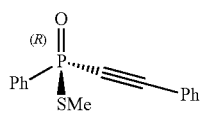

Following General Procedure C on 0.05 mmol scale with 8b and organolithium reagent SI-23. Purification by pTLC (hexane/EtOAc=1:1) afforded 8.3 mg (61%, >98:2 e.r.) of the title compound 24b. All physical and spectroscopic properties are identical with 24a except for the optical rotation: [α]$_D^{25}$=+11.9° (c=0.42 in CHCl$_3$).

15. Compound 25a

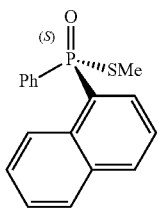

Following General Procedure C on 1 mmol scale with 8a and organolithium reagent SI-20. Purification by silica gel column chromatography (hexane/EtOAc=3:1 to 2:1) afforded 94 mg (32%, 96:4 e.r.) of the title compound 25a.
Physical State: white amorphous solid
[α]$_D^{25}$=−39.2° (c=0.24 in CHCl$_3$)
R$_f$=0.44 (hexane/EtOAc=1:1)
$^1$H NMR (400 MHz, CDCl$_3$) δ 8.78-8.72 (m, 1H), 8.08-7.98 (m, 2H), 7.94-7.84 (m, 3H), 7.60-7.44 (m, 6H), 2.34 (d, J=12.1 Hz, 3H).
$^{13}$C NMR (151 MHz, CDCl$_3$) δ 134.17, 134.10, 133.94, 133.92, 133.67, 133.47, 133.40, 133.26, 133.20, 132.96, 132.53, 132.51, 131.83, 131.76, 129.02, 129.01, 128.97, 128.88, 128.82, 128.13, 127.51, 127.12, 127.09, 126.72, 124.58, 124.48, 11.19, 11.17.
$^{31}$P NMR (162 MHz, CDCl$_3$) δ 46.99.
HRMS (ESI-TOF): calc'd for C$_{17}$H$_{16}$OPS [M+H]$^+$: 299.0659, found: 299.0662.

16. Compound 25b

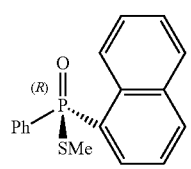

Following General Procedure C on 1 mmol scale with 8b and organolithium reagent SI-20. Purification by silica gel column chromatography (hexane/EtOAc=3:1 to 2:1) afforded 68 mg (23%, 97:3 e.r.) of the title compound 25b. All physical and spectroscopic properties are identical with 25a except for the optical rotation: [α]$_D^{25}$=+37.5° (c=1.00 in CHCl$_3$).

c. Leaving Group Installation

1. General Procedure D

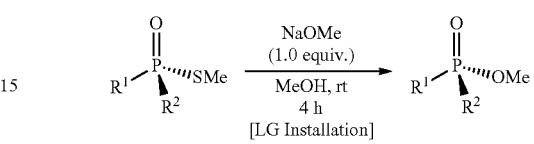

[LG Installation]

To a flame-dried 50 mL round-bottom flask was charged the starting material (1.0 mmol, 1.0 equiv.). The flask was evacuated and backfilled with argon, and then anhydrous methanol (8 mL) was introduced via syringe, followed by NaOMe (2.0 mL, 0.5 M solution in MeOH, 1.0 mmol, 1.0 equiv.). The resulting mixture was stirred at room temperature for 4 h, after which saturated aqueous NH$_4$Cl solution (10 mL) and EtOAc (20 mL) were added. The layers were separated, and the aqueous layer was washed with EtOAc (2×10 mL). The combined organic layers were washed with brine (10 mL), dried over anhydrous Na$_2$SO$_4$, filtered and concentrated. (Note: filter again if white precipitates are observed after concentration). The crude product was purified by silica gel chromatography to afford the desired product.

2. Compound SI-28a

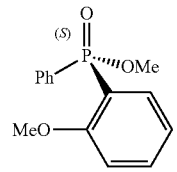

Following General Procedure D on 1 mmol scale with 11a. Purification by silica gel column chromatography (hexane/EtOAc=1:1 to 1:4) afforded 186 mg (70%, 98:2 e.r.) of the title compound SI-28a. On 16 mmol scale, 3.24 g (77%, 97:3 e.r.) of SI-28a was obtained after purification.
Physical State: colorless oil
[α]$_D^{25}$=−16.5° (c=0.84 in CHCl$_3$)
R$_f$=0.25 (hexane/EtOAc=1:3)
$^1$H NMR (400 MHz, CDCl$_3$) δ 7.98 (ddd, J=13.3, 7.5, 1.8 Hz, 1H), 7.88-7.80 (m, 2H), 7.50 (dddd, J=9.6, 6.8, 2.1, 1.1 Hz, 2H), 7.46-7.38 (m, 2H), 7.06 (tdd, J=7.5, 2.6, 0.9 Hz, 1H), 6.87 (dd, J=6.1, 2.2 Hz, 1H), 3.75 (d, J=11.4 Hz, 3H), 3.71 (s, 3H).
$^{13}$C NMR (151 MHz, CDCl$_3$) δ 161.11, 161.08, 134.90, 134.86, 134.59, 134.57, 132.54, 131.93, 131.90, 131.87, 131.86, 131.59, 128.18, 128.10, 120.79, 120.71, 119.41, 118.51, 111.39, 111.34, 55.62, 51.53, 51.49.
$^{31}$P NMR (162 MHz, CDCl$_3$) δ 31.78.
HRMS (ESI-TOF): calc'd for C$_{14}$H$_{16}$O$_3$P [M+H]$^+$: 263.0837, found: 263.0842.

3. Compound SI-28b

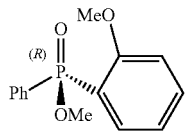

Following General Procedure D on 0.9 mmol scale with organolithium reagent 11b. Purification by silica gel column chromatography (hexane/EtOAc=1:1 to 1:4) afforded 151 mg (64%, 98:2 e.r.) of the title compound SI-28b. All physical and spectroscopic properties are identical with SI-28a except for the optical rotation: $[\alpha]^{25}_D$=+19.2° (c=0.91 in CHCl$_3$).

4. Compound SI-29a

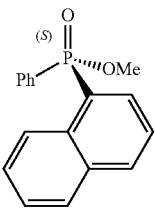

Following General Procedure D on 0.30 mmol scale with organolithium reagent 25a. Purification by silica gel column chromatography (hexane:/EtOAc=2:1 to 1:1) afforded 68.4 mg (80%, 92:8 e.r.) of the title compound SI-29a.
Physical State: white amorphous solid
$[\alpha]^{25}_D$=−18.6° (c=0.65 in CHCl$_3$)
R$_f$=0.33 (hexane/EtOAc=1:1)
$^1$H NMR (600 MHz, CDCl$_3$) δ 8.55-8.48 (m, 1H), 8.21 (ddd, J=14.8, 7.1, 1.3 Hz, 1H), 8.04 (d, J=8.1 Hz, 1H), 7.91-7.85 (m, 1H), 7.85-7.77 (m, 2H), 7.56 (ddd, J=8.3, 7.1, 2.8 Hz, 1H), 7.53-7.47 (m, 3H), 7.42 (td, J=7.5, 3.1 Hz, 2H), 3.82 (d, J=11.1 Hz, 3H).
$^{13}$C NMR (151 MHz, CDCl$_3$) δ 134.31, 134.26, 133.84, 133.80, 133.78, 133.77, 133.07, 132.99, 132.40, 132.30, 132.28, 131.56, 131.49, 129.03, 129.02, 128.73, 128.64, 127.64, 127.21, 126.47, 126.43, 126.33, 124.80, 124.70, 51.75, 51.71.
$^{31}$P NMR (162 MHz, CDCl$_3$) δ 34.77.
HRMS (ESI-TOF): calc'd for C$_{17}$H$_{16}$O$_2$P [M+H]$^+$: 283.0888, found: 283.0890.

5. Compound SI-29b

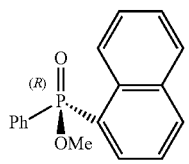

Following General Procedure D on 0.22 mmol scale with organolithium reagent 25b. Purification by silica gel column chromatography (hexane/EtOAc=2:1 to 1:1) afforded 50.6 mg (81%, 92:8 e.r.) of the title compound SI-29b. All physical and spectroscopic properties are identical with SI-29a except for the optical rotation: $[\alpha]^{25}_D$=+14.3° (c=0.59 in CHCl$_3$).

6. Compound SI-30a

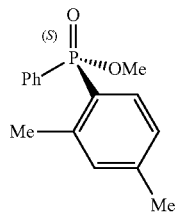

Following General Procedure D on 0.66 mmol scale with organolithium reagent 20a. Purification by silica gel column chromatography (hexane:EtOAc 2:1 to 1:1) afforded 97 mg (56%, 97:3 e.r.) of the title compound SI-30a.
Physical State: colorless oil
$[\alpha]^{25}_D$=+16.1° (c=0.80 in CHCl$_3$)
R$_f$=0.30 (hexane/EtOAc=1:2)
$^1$H NMR (400 MHz, CDCl$_3$) δ 7.83-7.68 (m, 3H), 7.55-7.48 (m, 1H), 7.48-7.38 (m, 2H), 7.10 (dt, J=7.9, 2.2 Hz, 1H), 7.03 (d, J=4.9 Hz, 1H), 3.74 (d, J=11.1 Hz, 3H), 2.36 (s, 3H), 2.34 (s, 3H).
$^{13}$C NMR (126 MHz, CDCl$_3$) δ 143.07, 143.05, 142.03, 141.94, 133.66, 133.59, 132.53, 132.50, 132.43, 132.09, 132.07, 131.72, 131.64, 131.43, 128.63, 128.53, 126.47, 126.36, 125.26, 51.30, 51.25, 21.55, 21.26, 21.22.
$^{31}$P NMR (162 MHz, CDCl$_3$) δ 34.34.
HRMS (ESI-TOF): calc'd for C$_{15}$H$_{18}$O$_2$P [M+H]$^+$: 261.1044, found: 261.1050.

7. Compound SI-30b

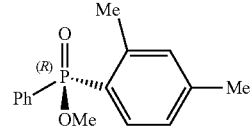

Following General Procedure D on 0.59 mmol scale with organolithium reagent 20b. Purification by silica gel column chromatography (hexane:EtOAc 2:1 to 1:1) afforded 80 mg (52%, 98:2 e.r.) of the title compound SI-30b. All physical and spectroscopic properties are identical with SI-30a except for the optical rotation: $[\alpha]^{25}_D$=−16.9° (c=0.80 in CHCl$_3$).

d. Displacement

1. General Procedure E:

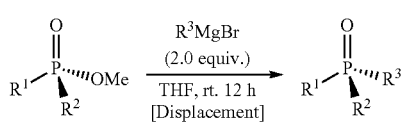

To a flame-dried 13×100 mm culture tube under argon was charged the starting material (0.05 mmol, 1.0 equiv.) in THF (0.5 mL). The Grignard reagent (0.10 mmol, 2.0 equiv., unless otherwise specified) was added dropwise, and the reaction was stirred for 12 h at. room temperature. Saturated aqueous NH$_4$Cl solution (1 mL) and EtOAc (2 mL) were added. The layers were separated, and the aqueous layer was washed with EtOAc (2×2 mL). The combined organic layers were washed with brine (1 mL), dried over anhydrous Na$_2$SO$_4$, filtered and concentrated. The crude product was purified by pTLC or silica gel chromatography to afford the desired product.

2. General Procedure F:

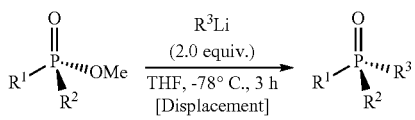

To a flame-dried 13×100 mm culture tube under argon was charged the starting material (0.05 mmol, 1.0 equiv.) in THF (0.5 mL) and cooled to −78° C. The organolithium reagent (0.10 mmol, 2.0 equiv., unless otherwise specified) was added dropwise, and the reaction was stirred for 3 h at −78° C. Saturated aqueous NH$_4$Cl solution (1 mL) and EtOAc (2 mL) were added. The layers were separated, and the aqueous layer was washed with EtOAc (2×. 2 mL). The combined organic layers were washed with brine (1 mL), dried over anhydrous Na$_2$SO$_4$, filtered and concentrated. The crude product was purified by pTLC or silica gel chromatography to afford the desired product.

3. General Procedure G:

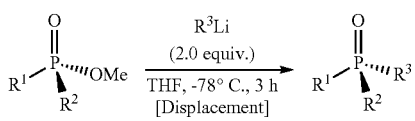

The organolithium reagent (0.10 mmol, 2.0 equiv., unless otherwise specified) in 0.3 mL of THF was prepared in a flame-dried 13×100 mm culture tube under argon (see Synthesis of Grignard and Organolithium Reagents). The starting material (0.05 mmol, 1.0 equiv.) in 0.2 mL of THF was added dropwise, and the reaction was stirred for 3 h at −78° C. Saturated aqueous NH$_4$Cl solution (1 mL) and EtOAc (2 mL) were added. The layers were separated, and the aqueous layer was washed with EtOAc (2×2 mL). The combined organic layers were washed with brine (1 mL), dried over anhydrous Na$_2$SO$_4$, filtered and concentrated. The crude product was purified by pTLC or silica gel chromatography to afford the desired product.

4. Compound 26a

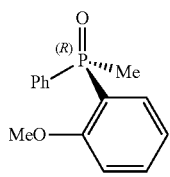

Following General Procedure E on 0.05 mmol scale with SI-28a and Grignard reagent SI-11. Purification by pTLC (5% MeOH in EtOAc) afforded 10.9 mg (89%, 98:2 e.r.) of the title compound 26a. On 12 mmol scale, 2.54 g (84%, 97:3 e.r.) of 26a was obtained after purification.

Physical State: white solid
m.p.=81-83° C.
$[\alpha]^{25}_D$=+30.4° (c=0.55 in CHCl$_3$)
$R_f$=0.43 (5% MeOH in EtOAc)
$^1$H NMR (400 MHz, CDCl$_3$) δ 7.95 (ddd, J=13.1, 7.5, 1.8 Hz, 1H), 7.79-7.68 (m, 2H), 7.55-7.37 (m, 4H), 7.10 (t, J=7.5 Hz, 1H), 6.88 (dd, J=8.3, 5.2 Hz, 1H), 3.72 (s, 3H), 2.08 (d, J=14.0 Hz, 3H).

$^{13}$C NMR (151 MHz, CDCl$_3$) δ 160.04, 160.01, 135.34, 134.67, 134.06, 134.05, 134.03, 131.42, 131.40, 130.40, 130.34, 128.38, 128.30, 121.80, 121.22, 121.15, 111.03, 110.99, 55.42, 16.53, 16.03.
$^{31}$P NMR (162 MHz, CDCl$_3$) δ 29.41.
HRMS (ESI-TOF): calc'd for C$_{14}$H$_{16}$O$_2$P [M+H]$^+$: 247.0888, found: 247.0889.

5. Compound 26b

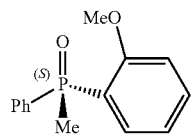

Following General Procedure E on 0.05 mmol scale with SI-28b and Grignard reagent SI-11. Purification by pTLC (5% MeOH in EtOAc) afforded 10.0 mg (81%, 98:2 e.r.) of the title compound 26b. All physical and spectroscopic properties are identical with 26a except for the optical rotation: $[\alpha]^{25}_D$=−28.5° (c=0.64 in CHCl$_3$).

6. Compound 27a

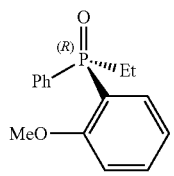

Following General Procedure E on 0.05 mmol scale with SI-28a and Grignard reagent SI-12. Purification by pTLC (5% MeOH in EtOAc) afforded 11.4 mg (87%, 97:3 e.r.) of the title compound 27a.

7. Compound 27b

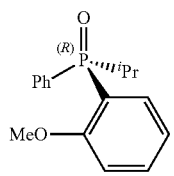

Following General Procedure E on 0.03 mmol scale with SI-28b and Grignard reagent SI-12. Purification by pTLC (5% MeOH in EtOAc) afforded 6.6 mg (85%, 97:3 e.r.) of the title compound 27b. All physical and spectroscopic properties are identical with 27a except for the optical rotation: $[\alpha]^{25}_D$=−18.1° (c=0.33 in CHCl$_3$).

8. Compound 28a

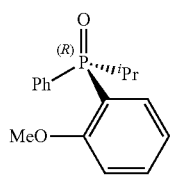

Following General Procedure F on 0.05 mmol scale with SI-28a and organolithium reagent SI-25. Purification by pTLC (hexane/EtOAc=1:3) afforded 10.5 mg (77%, 97:3 e.r.) of the title compound 28a.

Physical State: white amorphous solid $[\alpha]^{25}_D$=+13.8° (c=0.50 in CHCl$_3$)

$R_f$=0.5 (EtOAc)

$^1$H NMR (400 MHz, CDCl$_3$) δ 8.08 (ddd, J=12.4, 7.6, 1.8 Hz, 1H), 7.88 (ddd, J=11.2, 7.9, 1.7 Hz, 2H), 7.52-7.36 (m, 4H), 7.09 (t, J=7.7 Hz, 1H), 6.87 (dd, J=8.3, 5.2 Hz, 1H), 3.83 (s, 3H), 2.87 (dq, J=14.1, 7.1 Hz, 1H), 1.15 (ddd, J=38.7, 17.0, 7.2 Hz, 6H).

$^{13}$C NMR (151 MHz, CDCl$_3$) δ 159.43, 159.39, 134.88, 134.85, 133.70, 133.65, 133.63, 133.07, 131.26, 131.24, 131.22, 131.20, 128.23, 128.16, 121.44, 121.37, 121.12, 120.50, 110.64, 110.59, 55.30, 26.66, 26.17, 15.45, 15.44, 15.09, 15.07.

$^{31}$P NMR (162 MHz, CDCl$_3$) δ 38.08.

HRMS (ESI-TOF): calc'd for C$_{16}$H$_{20}$O$_2$P [M+H]$^+$: 275.1201, found: 275.1203.

9. Compound 28b

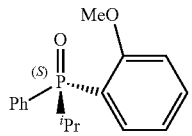

Following General Procedure F on 0.03 mmol scale with SI-28b and organolithium reagent SI-25. Purification by pTLC (hexane/EtOAc=1:3) afforded 5.6 mg (68%, >98:2 e.r.) of the title compound 28b. All physical and spectroscopic properties are identical with 28a except for the optical rotation: $[\alpha]^{25}_D$=+12.6° (c=0.28 in CHCl$_3$).

10. Compound 29a

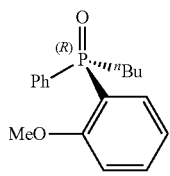

Following General Procedure F on 0.05 mmol scale with SI-28a and organolithium reagent SI-26. Purification by pTLC (hexane/EtOAc=1:3) afforded 13.6 mg (94%, 97:3 e.r.) of the title compound 29a.

Physical State: colorless oil $[\alpha]^{25}_D$=+5.3° (c=0.43 in CHCl$_3$)

$R_f$=0.54 (EtOAc)

$^1$H NMR (600 MHz, Acetone-d$_6$) δ 8.01-7.94 (m, 1H), 7.88-7.80 (m, 2H), 7.57-7.41 (m, 4H), 7.14-7.09 (m, 1H), 7.09-7.04 (m, 1H), 3.85 (s, 3H), 2.51-2.40 (m, 1H), 2.38-2.26 (m, 1H), 1.61-1.48 (m, 1H), 1.47-1.35 (m, 3H), 0.90-0.81 (m, 3H).

$^{13}$C NMR (151 MHz, Acetone-d$_6$) δ 160.67, 160.64, 136.89, 136.23, 134.97, 134.94, 134.51, 134.50, 131.82, 131.81, 131.51, 131.45, 128.96, 128.89, 123.05, 122.43, 121.67, 121.60, 111.99, 111.94, 55.72, 29.77, 29.28, 24.64, 24.61, 24.58, 24.54, 13.95.

$^{31}$P NMR (162 MHz, Acetone-d$_6$) δ 29.39.

HRMS (ESI-TOF): calc'd for C$_{17}$H$_{22}$O$_2$P [M+H]$^+$: 289.1357, found: 289.1362.

11. Compound 29b

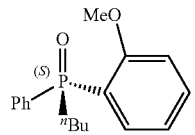

Following General Procedure F on 0.03 mmol scale with SI-28b and organolithium reagent SI-26. Purification by pTLC (hexane/EtOAc=1:3) afforded 7.4 mg (86%, 97:3 e.r.) of the title compound 29b. All physical and spectroscopic properties are identical with 29a except for the optical rotation: $[\alpha]^{25}_D$=−7.1° (c=0.37 in CHCl$_3$).

12. Compound 30a

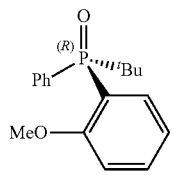

Following General Procedure F on 0.05 mmol scale with SI-28a and organolithium reagent SI-27. Purification by pTLC (hexane/EtOAc=1:3) afforded 12.0 mg (83%, 90:10 e.r.) of the title compound 30a.

Physical State: white amorphous solid $[\alpha]^{25}_D$=+10.7° (c=0.27 in CHCl$_3$)

$R_f$=0.53 (EtOAc)

$^1$H NMR (400 MHz, CDCl$_3$) δ 8.16 (ddd, J=12.1, 7.6, 1.8 Hz, 1H), 7.99-7.88 (m, 2H), 7.54-7.36 (m, 4H), 7.11 (tt, J=7.5, 1.2 Hz, 1H), 6.91 (dd, J=8.3, 5.1 Hz, 1H), 3.75 (s, 3H), 1.26 (d, J=15.4 Hz, 9H).

$^{13}$C NMR (151 MHz, CDCl$_3$) δ 159.73, 159.70, 136.27, 136.24, 133.70, 133.69, 133.27, 132.65, 132.18, 132.12, 131.18, 131.16, 127.97, 127.89, 121.27, 121.20, 120.56, 119.97, 110.97, 110.93, 54.77, 35.10, 34.63, 26.11, 26.10.

$^{31}$P NMR (162 MHz, CDCl$_3$) δ 43.50.

HRMS (ESI-TOF): calc'd for C$_{17}$H$_{22}$O$_2$P [M+H]$^+$: 289.1357, found: 289.1361.

13. Compound 30b

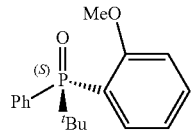

Following General Procedure F on 0.03 mmol scale with SI-28b and organolithium reagent SI-27. Purification by pTLC (hexane/EtOAc=1:3) afforded 6.8 mg (79%, 87:13 e.r.) of the title compound 30b. All physical and spectroscopic properties are identical with 30a except for the optical rotation: $[\alpha]^{25}_D$=−12.5° (c=0.33 in CHCl$_3$).

14. Compound 31a

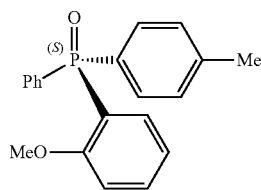

Following General Procedure E on 0.05 mmol scale with SI-28a and Grignard reagent SI-8 (4.0 equiv.). Purification by pTLC (hexane/EtOAc=1:2) afforded 14.5 mg (90%, 96:4 e.r.) of the title compound 31a.

Physical State: colorless gel
$[\alpha]^{25}_D$=-6.7° (c=0.73 in CHCl$_3$)
$R_f$=0.35 (hexane/EtOAc=1:3)
$^1$H NMR (400 MHz, CDCl$_3$) δ 7.75 (ddd, J=13.4, 7.6, 1.8 Hz, 1H), 7.68 (ddd, J=12.5, 8.2, 1.3 Hz, 2H), 7.59 (dd, J=12.3, 8.0 Hz, 2H), 7.55-7.45 (m, 2H), 7.44-7.37 (m, 2H), 7.23 (dd, J=8.3, 2.7 Hz, 2H), 7.10-7.02 (m, 1H), 6.90 (dd, J=8.3, 5.2 Hz, 1H), 3.55 (s, 3H), 2.38 (s, 3H).
$^{13}$C NMR (126 MHz, CDCl$_3$) δ 161.01 (d, J=3.2 Hz), 141.96 (d, J=2.6 Hz), 135.08 (d, J=7.1 Hz), 134.28 (d, J=1.8 Hz), 133.67 (d, J=107.6 Hz), 132.01 (d, J=10.6 Hz), 131.88 (d, J=10.2 Hz), 131.44 (d, J=2.7 Hz), 129.85 (d, J=109.8 Hz), 128.99 (d, J=12.9 Hz), 128.16 (d, J=12.4 Hz), 121.02 (d, J=11.6 Hz), 120.62 (d, J=103.8 Hz), 111.50 (d, J=6.5 Hz), 55.37, 21.71.
$^{31}$P NMR (162 MHz, CDCl$_3$) δ 27.45.
HRMS (ESI-TOF): calc'd for C$_{20}$H$_{20}$O$_2$P [M+H]$^+$: 323.1201, found: 323.1200.

15. Compound 31b

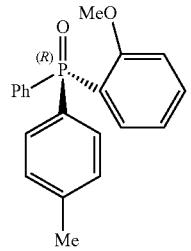

Following General Procedure E on 0.05 mmol scale with SI-28b and Grignard reagent SI-8 (4.0 equiv.). Purification by pTLC (hexane/EtOAc=1:2) afforded 13.6 mg (84%, 97:3 e.r.) of the title compound 31b. All physical and spectroscopic properties are identical with 31a except for the optical rotation: $[\alpha]^{25}_D$=+6.5° (c=0.68 in CHCl$_3$).

16. Compound 32a

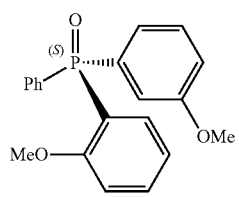

Following General Procedure E on 0.05 mmol scale with SI-28a and Grignard reagent SI-9. Purification by pTLC (hexane/EtOAc=1:3) afforded 15.8 mg (93%, 97:3 e.r.) of the title compound 32a.

Physical State: white amorphous solid
$[\alpha]^{25}_D$=-9.5° (c=0.78 in CHCl$_3$)
$R_f$=0.33 (hexane/EtOAc=1:3)
$^1$H NMR (400 MHz, CDCl$_3$) δ 7.76-7.64 (m, 3H), 7.56-7.46 (m, 2H), 7.45-7.38 (m, 2H), 7.36-7.28 (m, 2H), 7.22 (ddt, J=12.1, 7.5, 1.2 Hz, 1H), 7.10-7.00 (m, 2H), 6.91 (dd, J=8.2, 5.3 Hz, 1H), 3.78 (s, 3H), 3.57 (s, 3H).
$^{13}$C NMR (151 MHz, CDCl$_3$) δ 161.14, 161.12, 159.49, 159.39, 135.10, 135.05, 134.93, 134.44, 134.43, 134.23, 133.61, 132.89, 131.91, 131.85, 131.61, 131.59, 129.46, 129.36, 128.29, 128.20, 124.28, 124.22, 121.08, 121.00, 120.69, 120.01, 117.84, 117.82, 116.77, 116.69, 111.62, 111.57, 55.52, 55.44.
$^{31}$P NMR (162 MHz, CDCl$_3$) δ 27.38.
HRMS (ESI-TOF): calc'd for C$_{20}$H$_{20}$O$_3$P [M+H]$^+$: 339.1150, found: 339.1150.

17. Compound 32b

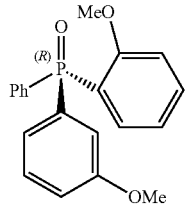

Following General Procedure E on 0.05 mmol scale with SI-28b and Grignard reagent SI-9. Purification by pTLC (hexane/EtOAc=1:3) afforded 15.8 mg (93%, 97:3 e.r.) of the title compound 32b. All physical and spectroscopic properties are identical with 32a except for the optical rotation: $[\alpha]^{25}_D$=+8.1° (c=0.78 in CHCl$_3$).

18. Compound 33a

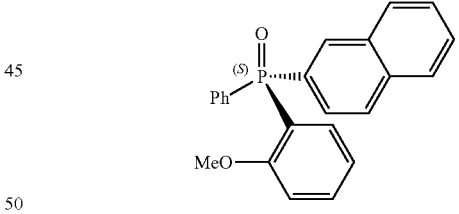

Following General Procedure E on 0.05 mmol scale with SI-28a and Grignard reagent SI-7 (10 equiv.). Purification by silica gel column chromatography (hexane/EtOAc=1:2 to pure EtOAc) afforded 16.7 mg (93%, 95:5 e.r.) of the title compound 33a.

Physical State: colorless gel
$[\alpha]^{25}_D$=-7.6° (c=0.50 in CHCl$_3$)
$R_f$=0.37 (hexane/EtOAc=1:4)
$^1$H NMR (600 MHz, CDCl$_3$) δ 8.37-8.31 (m, 1H), 7.90-7.83 (m, 3H), 7.76 (dddd, J=23.9, 12.5, 8.0, 1.6 Hz, 3H), 7.67 (ddd, J=10.2, 8.4, 1.5 Hz, 1H), 7.60-7.49 (m, 4H), 7.44 (ddd, J=8.9, 7.0, 3.0 Hz, 2H), 7.12-7.05 (m, 1H), 6.96-6.90 (m, 1H), 3.55 (s, 3H).
$^{13}$C NMR (151 MHz, CDCl$_3$) δ 161.14, 161.12, 135.19, 135.14, 134.75, 134.73, 134.50, 134.49, 133.79, 133.73, 133.02, 132.66, 132.57, 131.97, 131.90, 131.66, 131.64, 130.81, 130.09, 129.09, 128.36, 128.28, 128.03, 127.88, 127.86, 127.78, 127.20, 127.13, 126.76, 121.17, 121.09, 120.71, 120.02, 111.60, 111.56, 55.44.

$^{31}$P NMR (162 MHz, CDCl$_3$) δ 27.55.

HRMS (ESI-TOF): calc'd for C$_{23}$H$_{20}$O$_2$P [M+H]$^+$: 359.1201, found: 359.1205.

19. Compound 33b

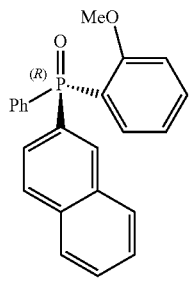

Following General Procedure E on 0.05 mmol scale with SI-28b and Grignard reagent SI-7 (10 equiv.). Purification by silica gel column chromatography (hexane/EtOAc=1:2 to pure EtOAc) afforded 16.5 mg (92%, 80:20 e.r.) of the title compound 33b. All physical and spectroscopic properties are identical with 33a except for the optical rotation: [α]$^{25}_D$=+8.1° (c=0.83 in CHCl$_3$).

20. Compound 34a

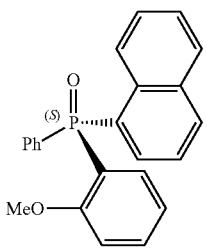

Following General Procedure G on 0.05 mmol scale with SI-28a and organolithium reagent SI-20. Purification by pTLC (hexane/EtOAc=1:3) afforded 11.7 mg (65%, 98:2 e.r.) of the title compound 34a.

Physical State: white crystalline solid m.p.=167-169° C.

[α]$^{25}_D$=+21.3 (c=0.52 in CHCl$_3$)

R$_f$=0.36 (hexane/EtOAc=1:3)

$^1$H NMR (400 MHz, CDCl$_3$) δ 8.57 (d, J=8.5 Hz, 1H), 7.98 (d, J=8.0 Hz, 1H), 7.87 (d, J=8.2 Hz, 1H), 7.83-7.70 (m, 3H), 7.57-7.36 (m, 8H), 7.08 (tdd, J=7.5, 2.1, 0.9 Hz, 1H), 6.91 (dd, J=7.9, 5.3 Hz, 1H), 3.46 (s, 3H).

$^{13}$C NMR (151 MHz, CDCl$_3$) δ 161.17, 161.15, 134.99, 134.94, 134.36, 134.35, 134.05, 133.94, 133.88, 133.82, 133.34, 133.18, 133.10, 132.84, 132.82, 132.25, 132.18, 131.58, 131.56, 129.60, 128.89, 128.80, 128.79, 128.31, 128.23, 127.62, 127.58, 127.17, 126.32, 124.39, 124.29, 121.42, 121.29, 121.22, 120.74, 111.75, 111.71, 55.45.

$^{31}$P NMR (162 MHz, CDCl$_3$) δ 30.93.

HRMS (ESI-TOF): calc'd for C$_{23}$H$_{20}$O$_2$P [M+H]$^+$: 359.1201, found: 359.1197.

21. Compound 34b

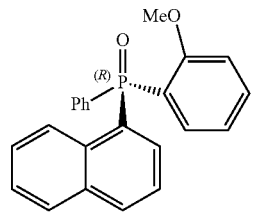

Following General Procedure G on 0.03 mmol scale with SI-28b and organolithium reagent SI-20. Purification by pTLC (hexane/EtOAc=1:3) afforded 5.7 mg (53%, 97:3 e.r.) of the title compound 34b. All physical and spectroscopic properties are identical with 34a except for the optical rotation: [α]$^{25}_D$=−22.5° (c=0.29 in CHCl$_3$).

22. Compound 35a

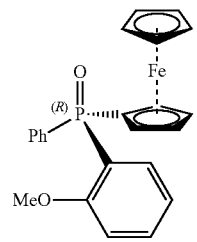

Following General Procedure G on 0.05 mmol scale with SI-28a and organolithium reagent SI-24. Purification by pTLC (hexane/EtOAc=1:3) afforded 19.3 mg (93%, 97:3 e.r.) of the title compound 35a.

Physical State: orange gel

[α]$^{25}_D$=−38.2° (c=0.10 in CHCl$_3$)

R$_f$=0.29 (hexane/EtOAc=1:3)

$^1$H NMR (400 MHz, CDCl$_3$) δ 7.95 (ddd, J=13.4, 7.5, 1.8 Hz, 1H), 7.71-7.62 (m, 2H), 7.54-7.45 (m, 1H), 7.44 (td, J=7.2, 1.6 Hz, 1H), 7.41-7.34 (m, 2H), 7.10 (tdd, J=7.5, 1.8, 0.9 Hz, 1H), 6.87 (dd, J=8.3, 5.3 Hz, 1H), 4.59 (s, 1H), 4.47 (s, 1H), 4.44 (s, 2H), 4.12 (s, 5H), 3.51 (s, 3H).

$^{13}$C NMR (126 MHz, CDCl$_3$) δ 160.44, 160.41, 136.23, 135.35, 134.48, 134.43, 133.84, 133.83, 131.00, 130.98, 130.90, 127.90, 127.80, 123.26, 122.42, 120.92, 120.83, 111.64, 111.59, 73.41, 72.97, 72.87, 72.45, 72.29, 72.19, 71.42, 71.33, 71.17, 71.08, 69.69, 55.35.

$^{31}$P NMR (162 MHz, CDCl$_3$) δ 27.37.

HRMS (ESI-TOF): calc'd for C$_{23}$H$_{22}$FeO$_2$P [M+H]$^+$: 415.0754, found: 415.0747.

23. Compound 35b

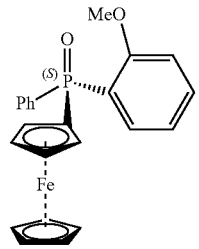

Following General Procedure G on 0.05 mmol scale with SI-28b and organolithium reagent SI-24. Purification by pTLC (hexane:EtOAc=1:3) afforded 18.3 mg (88%, 97:3 e.r.) of the title compound 35b. All physical and spectroscopic properties are identical with 35a except for the optical rotation: $[\alpha]^{25}_D$=+39.0 (c=0.10 in CHCl$_3$).

24. Compound 36a

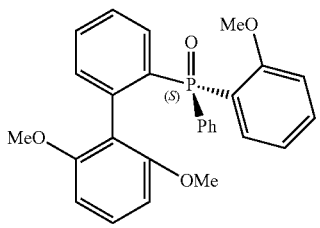

Following General Procedure G on 0.05 mmol scale with SI-28a and organolithium reagent SI-21. Purification by pTLC (hexane/EtOAc=1:3) afforded 18.3 mg (83%, 93:7 e.r.) of the title compound 36a.

Physical State: white solid m.p.=187-189° C.

$[\alpha]^{25}_D$=+49.6° (c=0.74 in CHCl$_3$)

R$_f$=0.25 (hexane/EtOAc=1:3)

$^1$H NMR (400 MHz, CDCl$_3$) δ 7.70-7.58 (m, 3H), 7.55-7.45 (m, 2H), 7.41-7.30 (m, 3H), 7.30-7.24 (m, 2H), 7.19 (dddd, J=7.6, 4.2, 1.3, 0.5 Hz, 1H), 7.03 (t, J=8.3 Hz, 1H), 6.89 (tdd, J=7.5, 2.0, 0.9 Hz, 1H), 6.76 (dd, J=8.0, 5.2 Hz, 1H), 6.28 (dd, J=8.4, 0.8 Hz, 1H), 6.19 (dd, J=8.4, 0.8 Hz, 1H), 3.52 (s, 3H), 3.50 (s, 3H), 3.43 (s, 3H).

$^{13}$C NMR (126 MHz, CDCl$_3$) δ 160.58, 160.55, 157.95, 157.61, 139.20, 139.13, 134.76, 134.70, 134.35, 133.66, 133.56, 133.50, 133.27, 133.26, 132.70, 132.56, 132.48, 132.11, 132.03, 131.01, 130.99, 130.70, 130.68, 129.22, 127.51, 127.41, 126.39, 126.28, 122.33, 121.51, 120.60, 120.50, 117.83, 117.80, 111.02, 110.97, 103.04, 102.92, 55.37, 55.28, 55.12.

$^{31}$P NMR (162 MHz, CDCl$_3$) δ 26.90.

HRMS (ESI-TOF): calc'd for C$_{27}$H$_{26}$O$_4$P [M+H]$^+$: 445.1569, found: 445.1565.

25. Compound 36b

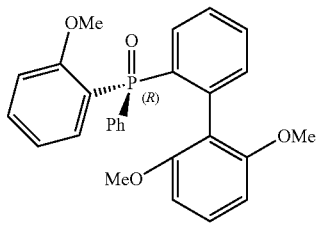

Following General Procedure G on 0.05 mmol scale with SI-28b and organolithium reagent SI-21. Purification by pTLC (hexane/EtOAc=1:3) afforded 18.3 mg (83%, 93:7 e.r.) of the title compound 36b. All physical and spectroscopic properties are identical with 36a except for the optical rotation: $[\alpha]^{25}_D$=−44.5° (c=1.00 in CHCl$_3$).

26. Compound 37a

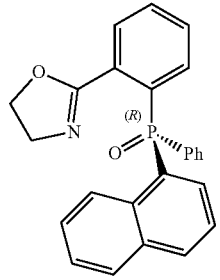

Following General Procedure G on 0.05 mmol scale with SI-29a and organolithium reagent SI-22 (4 equiv.). Purification by pTLC (hexane/EtOAc=1:2) afforded 11.4 mg (56%, 94:6 e.r.) of the title compound 37a.

Physical State: yellow amorphous solid $[\alpha]^{25}_D$=−23.5° (c=0.38 in CHCl$_3$)

R$_f$=0.40 (hexane/EtOAc=1:2)

$^1$H NMR (400 MHz, Acetone-d$_6$) δ 8.65 (d, J=8.6 Hz, 1H), 8.12 (d, J=8.2 Hz, 1H), 8.00 (d, J=8.3 Hz, 1H), 7.79-7.70 (m, 3H), 7.67 (tt, J=7.6, 1.6 Hz, 1H), 7.64-7.47 (m, 7H), 7.45-7.36 (m, 2H), 3.91 (ddd, J=10.1, 8.8, 7.7 Hz, 1H), 3.80 (ddd, J=10.5, 8.4, 7.7 Hz, 1H), 3.65-3.48 (m, 2H).

$^{13}$C NMR (151 MHz, Acetone-d$_6$) δ 164.58, 164.56, 135.47, 134.90, 134.84, 134.76, 134.71, 134.64, 134.61, 134.56, 134.15, 134.11, 134.10, 134.02, 133.34, 133.32, 133.11, 133.04, 132.45, 132.43, 132.38, 132.36, 131.66, 131.27, 131.21, 130.97, 130.83, 130.75, 129.63, 129.63, 129.15, 129.07, 128.59, 128.56, 127.45, 127.16, 125.25, 125.15, 68.28, 55.74.

$^{31}$P NMR (162 MHz, Acetone-d$_6$) δ 32.05.

HRMS (ESI-TOF): calc'd for C$_{25}$H$_{21}$NO$_2$P [M+H]$^+$: 398.1310, found: 398.1306.

27. Compound 37b

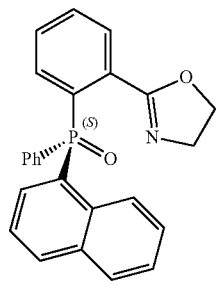

Following General Procedure G on 0.05 mmol scale with SI-29b and organolithium reagent SI-22 (4 equiv.). Purification by pTLC (hexane/EtOAc=1:2) afforded 8.0 mg (40%, e.r. between 89:11 to 94:6, unsatisfactory chiral HPLC separation, vide infra) of the title compound 37b. All physical and spectroscopic properties are identical with 37a except for the optical rotation: $[\alpha]^{25}_D$=+22.8° (c=0.40 in CHCl$_3$).

28. Compound 38a

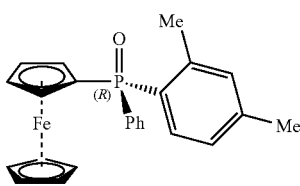

Following General Procedure G on 0.05 mmol scale with SI-30a and organolithium reagent SI-24. Purification by pTLC (hexane/EtOAc=1:3) afforded 16.6 mg (84%, 98:2 e.r.) of the title compound 38a.

Physical State: orange amorphous solid
$[\alpha]^{25}_D$=+88.0° (c=0.10 in CHCl$_3$)
$R_f$=0.35 (hexane/EtOAc=1:3)
$^1$H NMR (400 MHz, CDCl$_3$) δ 7.76-7.67 (m, 2H), 7.51 (dtd, J=16.2, 8.6, 8.1, 6.2 Hz, 3H), 7.11 (dd, J=14.0, 7.8 Hz, 1H), 6.99 (s, 1H), 6.92 (d, J=7.9 Hz, 1H), 4.72 (s, 1H), 4.54 (s, 1H), 4.40 (s, 1H), 4.21 (s, 5H), 3.93 (s, 1H), 2.30 (d, J=4.1 Hz, 6H).
$^{13}$C NMR (151 MHz, CDCl$_3$) δ 142.33, 142.27, 142.10, 142.08, 134.78, 134.09, 133.58, 133.49, 132.56, 132.49, 131.45, 131.43, 131.32, 131.26, 130.16, 129.45, 128.33, 128.25, 125.79, 125.71, 74.30, 73.52, 72.84, 72.75, 72.35, 72.28, 71.97, 71.90, 71.33, 71.26, 69.81, 21.47, 21.39, 21.36.
$^{31}$P NMR (162 MHz, CDCl$_3$) δ 31.77.
HRMS (ESI-TOF): calc'd for C$_{24}$H$_{24}$FeOP [M+H]$^+$: 413.0961, found: 413.0954.

29. Compound 38b

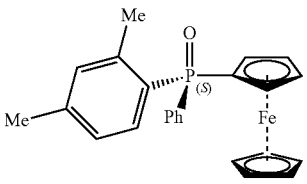

Following General Procedure G on 0.05 mmol scale with SI-30b and organolithium reagent SI-24. Purification by pTLC (hexane/EtOAc=1:3) afforded 15.8 mg (76%, between 97:3 and 98:2 e.r., unsatisfactory chiral HPLC separation, vide infra) of the title compound 38b. All physical and spectroscopic properties are identical with 38a except for the optical rotation: $[\alpha]^{25}_D$=−79.0° (c=0.10 in CHCl$_3$).

e. Stereospecific Reduction of Phosphine Oxides

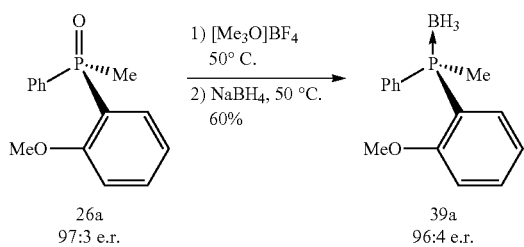

Reduction of chiral phosphine follows a reported procedure (see Rajendran, K. V.; et al., Simple unprecedented conversion of phosphine oxides and sulfides to phosphine boranes using sodium borohydride. *Chem. Comm.* 2012, 48, 817-819): A solution of 26a (0.5 mmol, 1.0 equiv.) in DCM (1 mL) was added dropwise at room temperature to a stirred solution of Meerwein's salt (0.5 mmol, 1.0 equiv.) in DCM (1 mL) under argon atmosphere. The reaction mixture was refluxed gently for 2 h at which point $^{31}$P NMR showed the complete conversion of phosphine oxide to the alkoxyphosphonium salt. After cooling to room temperature, sodium borohydride (3 mmol, 6.0 equiv.) dissolved in diglyme (1 mL) was added dropwise to the reaction mixture. This mixture was refluxed gently for 2 h. Once the $^{31}$P NMR showed the full conversion of salt to phosphine borane the reaction mixture was washed with water (5 mL), and the isolated organic layer was dried over anhydrous MgSO$_4$. The drying agent was removed by filtration, and the solvent was removed in vacuo to give a colorless oil, which was purified by silica gel chromatography (hexane/EtOAc=4:1) to yield 39a (60%, 96:4 e.r.) as a white solid. All spectroscopic data were identical with literature. Enantiomeric ratio was measured with a Chiralpak AD-H column with 2% isopropanol in hexane as eluent and 1 mL/min as the flow rate.

Example 5

Synthesis of 3'-O-Protected Nucleosides

1. General Procedure for Synthesis of 3'-O-Protected Nucleosides (General Procedure G)

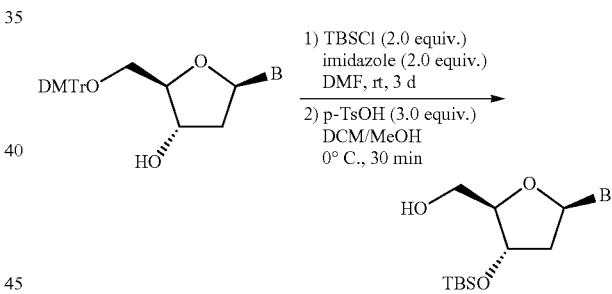

Synthetic methods of 3'-O-TBS protected nucleosides were adapted from literature procedures. A solution of 5'-O-DMTr protected nucleoside (10 mmol, 1.0 equiv.) and imidazole (3.14 g, 46.2 mmol, 2.0 equiv.) in DMF (30 mL) was cooled to 0° C., to which TBSCl (20 mmol, 2.0 equiv.) was added. The reaction was stirred at room temperature for 3 days, and then diluted with EtOAc (80 mL) and washed with water (100 mL×3). The organic layer was dried over MgSO$_4$ and the solvent was removed in vacuo. The residue was dissolved in 100 mL of DCM and 40 mL of MeOH, then cooled to 0° C. A solution of p-toluenesulfonic acid (20 mmol, 2.0 equiv.) in 10 mL in MeOH was added, and the reaction was stirred at 0° C. for 30 min. Pyridine (1 mL) was added to neutralize the excess acid. The crude reaction mixture was evaporated to dryness, diluted in EtOAc (100 mL) and washed with saturated NaHCO$_3$ (50 mL) and brine (50 mL). The organic layer was dried over Na$_2$SO$_4$, filtered and concentrated in vacuo. The crude product was purified by silica gel chromatography (pure DCM to 5% MeOH in DCM gradient) to afford the desired product.

2. Compound SI-31

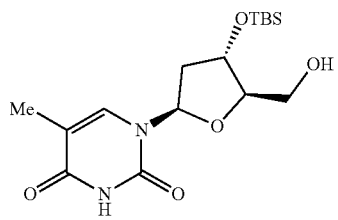 [SMILES: Cc1cn([C@H]2C[C@H](O[Si](C)(C)C(C)(C)C)[C@@H](CO)O2)c(=O)[nH]c1=O]

Following General Procedure G on 10 mmol scale with 5'-O-(4,4'-dimethoxytrityl) thymidine. SI-31 (2.8 g, 79%) was isolated as a white foam with identical spectroscopic properties as reported in literature. See Huang, H.-S.; et al., A Practical Method for Regioselective 5'-O-tert-Butyldimethylsilyl Deprotection of Persilylated Nucleosides by Methanolic Phosphomolybdic Acid. *Synlett* 2018, 29, 2437-2443.

3. Compound SI-32

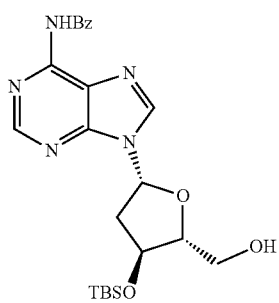

Following General Procedure G on 10 mmol scale with $N^6$-benzoyl-5'-O-(4,4'-dimethoxytrityl)-2'-deoxyadenosine. SI-32 (3.8 g, 81%) was isolated as a white foam with identical spectroscopic properties as reported in literature. See Molina, A. G.; et al., Acetylated and Methylated β-Cyclodextrins as Viable Soluble Supports for the Synthesis of Short 2'-Oligodeoxyribo-nucleotides in Solution. *Molecules* 2012, 17, 12102-12120.

4. Compound SI-33

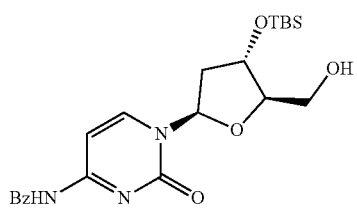

Following General Procedure G on 10 mmol scale with $N^4$-benzoyl-5'-O-(4,4'-dimethoxytrityl)-2'-deoxycytidine. SI-33 (3.7 g, 83%) was isolated as a white foam with identical spectroscopic properties as reported in literature. See Huang, H.-S.; et al., *Synlett* 2018, 29, 2437-2443.

5. Compound SI-34

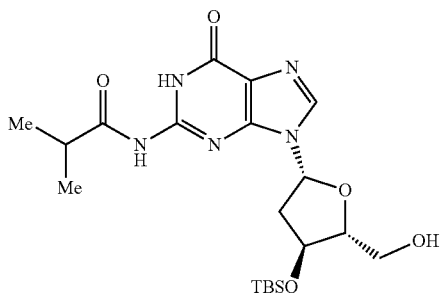 [SMILES: CC(C)C(=O)Nc1nc2c(ncn2[C@H]2C[C@H](O[Si](C)(C)C(C)(C)C)[C@@H](CO)O2)c(=O)[nH]1]

Following General Procedure G on 10 mmol scale with $N^2$-isobutyryl-5'-O-(4,4'-dimethoxytrityl)-2'-deoxyguanosine. SI-34 (3.3 g, 72%) was isolated as a white foam with identical spectroscopic properties as reported in literature. See Huang, H.-S.; et al., *Synlett* 2018, 29, 2437-2443.

Example 6

MPO Synthesis a. Loading

1. General Procedure H

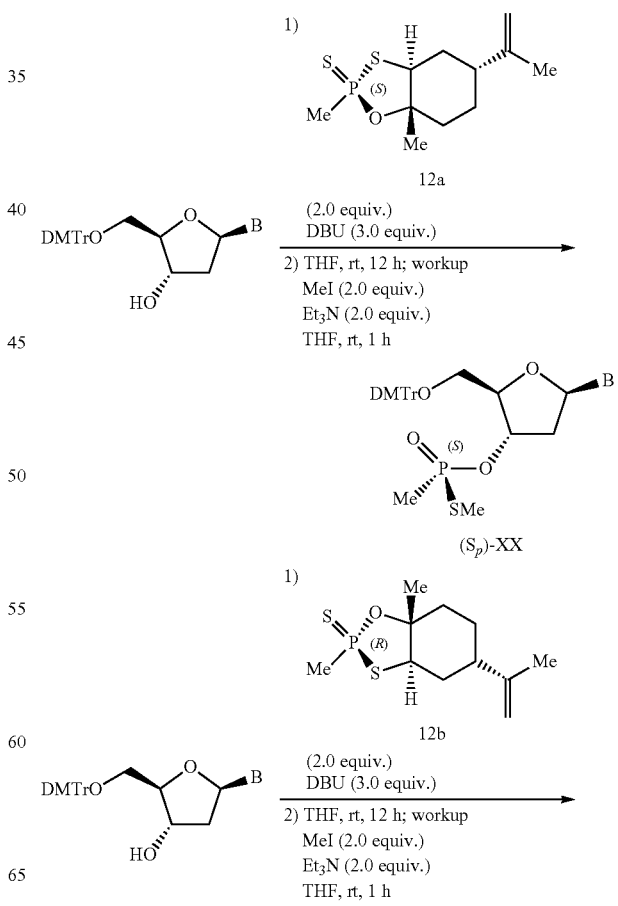

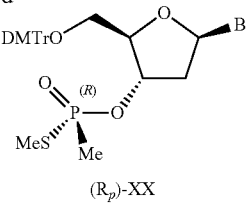

To a flame-dried 50 mL round bottom flask under argon was charged nucleoside (1.0 mmol, 1.0 equiv.), 12 (524.6 mg, 2.0 mmol, 2.0 equiv.), and THF (10 mL). DBU (3.0 mmol, 3.0 equiv.) was added dropwise, and the resulting solution was stirred for 12 h at rt. The reaction was then quenched with 20 mL of 1×PBS solution and extracted with DCM (3×30 mL). The combined organic layers were washed with saturated aqueous NaHCO$_3$ solution (10 mL), brine (10 mL), dried over Na$_2$SO$_4$, filtered and concentrated. The residue was re-dissolved in THF (5 mL). Et$_3$N (2 equiv.) and MeI (2 equiv.) were added, and the heterogeneous mixture was stirred vigorously for 1 h. The reaction was quenched with 10 mL of water and extracted with EtOAc (3×20 mL). The combined organic layers were dried over Na$_2$SO$_4$, filtered and concentrated. The residue was purified by silica gel chromatography to afford the desired product.

Nucleobase Nomenclature: Unless otherwise stated, the following naming conventions will be adopted for nucleobases in this disclosure:

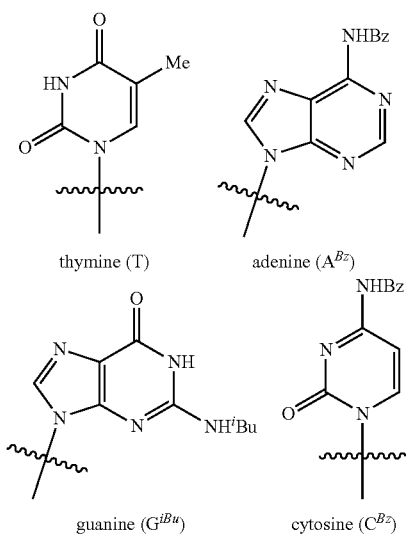

2. Compound (R$_p$)-40

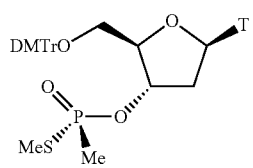

Following General Procedure H on 0.5 mmol scale with 12b and 5'-O-(4,4'-dimethoxytrityl) thymidine. Purification by silica gel column chromatography (2% to 5% MeOH in DCM) afforded 275 mg (85%, >20:1 d.r.) of the title compound (R$_p$)-40.

Physical State: white foam

R$_f$=0.3 (EtOAc)

$^1$H NMR (600 MHz, Acetone-d$_6$) δ 10.01 (s, 1H), 7.58 (d, J=1.3 Hz, 1H), 7.53-7.47 (m, 2H), 7.41-7.31 (m, 6H), 7.30-7.23 (m, 1H), 6.95-6.89 (m, 4H), 6.38 (dd, J=8.3, 6.0 Hz, 1H), 5.32 (ddt, J=10.9, 5.3, 2.5 Hz, 1H), 4.23 (q, J=3.2 Hz, 1H), 3.79 (s, 6H), 3.49-3.40 (m, 2H), 2.63-2.57 (m, 2H), 2.18 (d, J=13.1 Hz, 3H), 1.82 (d, J=15.7 Hz, 3H), 1.50 (d, J=1.2 Hz, 3H).

$^{13}$C NMR (151 MHz, Acetone-d$_6$) δ 164.22, 159.94, 159.93, 151.35, 145.81, 138.60, 136.58, 136.44, 136.24, 131.13, 130.15, 129.86, 129.14, 129.13, 128.90, 128.88, 128.39, 127.95, 127.51, 126.23, 114.18, 113.71, 111.44, 87.82, 85.26, 85.21, 85.19, 76.47, 76.43, 64.33, 55.67, 55.57, 39.94, 39.92, 21.51, 19.11, 18.39, 12.51, 12.49, 12.28.

$^{31}$P NMR (162 MHz, Acetone-d$_6$) δ 56.16.

HRMS (ESI-TOF): calc'd for C$_{33}$H$_{37}$N$_2$O$_8$PSNa [M+Na]$^+$: 675.1906, found: 675.1914.

3. Compound (S$_p$)-40

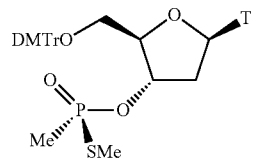

Following General Procedure H on 1 mmol scale with 12a and 5'-O-(4,4'-dimethoxytrityl) thymidine. Purification by silica gel column chromatography (2% to 5% MeOH in DCM) afforded 574 mg (88%, >20:1 d.r.) of the title compound (S$_p$)-40.

Physical State: white foam

R$_f$=0.34 (EtOAc)

$^1$H NMR (600 MHz, Acetone-d$_6$) δ 10.13 (s, 1H), 7.61 (d, J=1.3 Hz, 1H), 7.53-7.47 (m, 2H), 7.40-7.35 (m, 4H), 7.33 (t, J=7.8 Hz, 2H), 7.28-7.22 (m, 1H), 6.94-6.87 (m, 4H), 6.39 (dd, J=8.3, 6.1 Hz, 1H), 5.38 (ddd, J=10.0, 5.4, 2.9 Hz, 1H), 4.36 (q, J=3.0 Hz, 1H), 3.78 (s, 6H), 3.46 (ddd, J=49.2, 10.6, 3.2 Hz, 2H), 2.63-2.53 (m, 2H), 2.31 (d, J=13.0 Hz, 3H), 1.82 (d, J=15.7 Hz, 3H), 1.46 (d, J=1.3 Hz, 3H).

$^{13}$C NMR (151 MHz, Acetone-d$_6$) δ 164.19, 159.77, 159.75, 151.29, 145.77, 136.51, 136.34, 136.11, 131.03, 129.02, 128.77, 127.78, 114.05, 111.31, 87.71, 85.72, 85.70, 85.11, 76.74, 76.70, 64.10, 55.54, 39.35, 39.32, 19.09, 18.37, 12.36, 12.34, 12.14.

$^{31}$P NMR (162 MHz, Acetone-d$_6$) δ 56.63.

HRMS (ESI-TOF): calc'd for C$_{33}$H$_{37}$N$_2$O$_8$PSNa [M+Na]$^+$: 675.1906, found: 675.1988.

4. Compound (R$_p$)-41

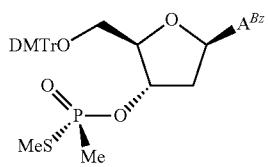

Following General Procedure H on 1 mmol scale with 12b and N$^6$-benzoyl-5'-O-(4,4'-dimethoxytrityl)-2'-deoxyadenosine. Purification by silica gel column chromatography (2% to 5% MeOH in DCM) afforded 628 mg (82%, 20:1 d.r.) of the title compound ($R_p$)-41.

Physical State: white foam
$R_f$=0.23 (DCM/MeOH=98:2)
$^1$H NMR (600 MHz, Acetone-$d_6$) δ 9.97 (s, 1H), 8.55 (s, 1H), 8.41 (s, 1H), 8.12 (d, J=7.6 Hz, 2H), 7.64 (t, J=7.4 Hz, 1H), 7.56 (dd, J=8.3, 6.9 Hz, 2H), 7.51-7.44 (m, 2H), 7.38-7.30 (m, 4H), 7.28 (dd, J=8.3, 6.6 Hz, 2H), 7.25-7.17 (m, 1H), 6.90-6.80 (m, 4H), 6.60 (dd, J=7.7, 6.2 Hz, 1H), 5.48 (ddt, J=8.8, 5.6, 2.7 Hz, 1H), 4.37 (td, J=5.3, 2.5 Hz, 1H), 3.77 (d, J=1.9 Hz, 6H), 3.51-3.28 (m, 3H), 2.92-2.85 (m, 1H), 2.27 (d, J=13.0 Hz, 3H), 1.85 (d, J=15.7 Hz, 3H).
$^{13}$C NMR (151 MHz, Acetone-$d_6$) δ 165.93, 159.80, 159.78, 153.02, 152.69, 151.42, 146.06, 143.84, 136.77, 136.75, 135.18, 133.34, 131.11, 131.04, 129.88, 129.54, 129.26, 129.16, 129.10, 128.73, 127.75, 126.46, 126.24, 114.04, 87.40, 85.78, 85.73, 76.98, 76.93, 64.29, 55.65, 38.56, 21.53, 19.21, 18.49, 12.65, 12.63.
$^{31}$P NMR (162 MHz, Acetone-$d_6$) δ 55.94.
HRMS (ESI-TOF): calc'd for $C_{40}H_{41}N_5O_7PS$ [M+H]$^+$: 766.2464, found: 766.2474.

5. Compound ($S_p$)-41

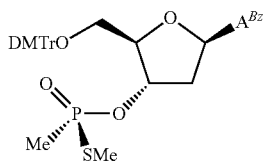

Following General Procedure H on 1 mmol scale with 12a and N$^6$-benzoyl-5'-O-(4,4'-dimethoxytrityl)-2'-deoxyadenosine. Purification by silica gel column chromatography (2% to 5% MeOH in DCM) afforded 690 mg (90%, >20:1 d.r.) of the title compound ($S_p$)-41.

Physical State: white foam
$R_f$=0.38 (EtOAc/acetone=2:1)
$^1$H NMR (600 MHz, Acetone-$d_6$) δ 10.06 (s, 1H), 8.54 (s, 1H), 8.41 (s, 1H), 8.11 (d, J=7.7 Hz, 2H), 7.65-7.58 (m, 1H), 7.53 (t, J=7.9 Hz, 2H), 7.47 (dd, J=8.4, 1.3 Hz, 2H), 7.34 (d, J=8.6 Hz, 4H), 7.25 (t, J=7.7 Hz, 2H), 7.21-7.16 (m, 1H), 6.82 (t, J=9.1 Hz, 4H), 6.59 (dd, J=7.8, 6.2 Hz, 1H), 5.49 (ddd, J=12.3, 5.5, 2.5 Hz, 1H), 4.52 (td, J=5.0, 2.5 Hz, 1H), 3.75 (d, J=2.6 Hz, 6H), 3.51-3.41 (m, 2H), 3.41-3.33 (m, 1H), 2.77 (ddd, J=14.1, 6.2, 2.7 Hz, 1H), 2.33 (d, J=13.0 Hz, 3H), 1.85 (d, J=15.7 Hz, 3H).
$^{13}$C NMR (151 MHz, Acetone-$d_6$) δ 165.90, 159.57, 159.55, 152.86, 152.55, 151.28, 145.98, 143.66, 136.67, 135.01, 133.17, 130.99, 130.93, 129.36, 129.15, 128.99, 128.55, 127.53, 126.26, 113.87, 87.18, 86.17, 86.14, 85.63, 76.94, 76.89, 64.25, 55.50, 38.10, 38.07, 19.21, 18.49, 12.35, 12.33.
$^{31}$P NMR (162 MHz, Acetone-$d_6$) δ 56.03.
HRMS (ESI-TOF): calc'd for $C_{40}H_{41}N_5O_7PS$ [M+H]$^+$: 766.2464, found: 766.2480.

6. Compound ($R_p$)-42

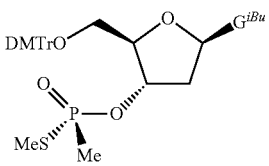

Following General Procedure H on 1 mmol scale with 12b and N$^2$-isobutyryl-5'-O-(4,4'-dimethoxytrityl)-2'-deoxyguanosine. Purification by silica gel column chromatography (2% to 5% MeOH in DCM) afforded 343 mg (46%, >20:1 d.r.) of the title compound ($R_p$)-42.

Physical State: white foam
$R_f$=0.18 (EtOAc/acetone=2:1)
$^1$H NMR (600 MHz, Acetone-$d_6$) δ 12.02 (s, 1H), 10.52 (s, 1H), 7.96 (s, 1H), 7.47-7.42 (m, 2H), 7.35-7.17 (m, 7H), 6.89-6.82 (m, 4H), 6.33 (dd, J=7.5, 6.0 Hz, 1H), 5.54-5.47 (m, 1H), 4.28 (td, J=4.6, 3.0 Hz, 1H), 3.81-3.78 (m, 6H), 3.43-3.37 (m, 1H), 3.12 (ddd, J=13.6, 7.4, 5.9 Hz, 1H), 2.82 (td, J=6.3, 5.7, 2.9 Hz, 1H), 2.33 (d, J=0.7 Hz, 2H), 2.23 (d, J=13.1 Hz, 3H), 1.90 (d, J=15.7 Hz, 3H), 1.24 (dd, J=6.9, 2.7 Hz, 6H).
$^{13}$C NMR (151 MHz, Acetone-$d_6$) δ 180.83, 159.80, 159.78, 155.87, 149.35, 149.22, 145.94, 138.12, 136.72, 136.64, 131.10, 131.02, 129.88, 129.16, 129.11, 128.89, 128.40, 127.77, 126.24, 122.35, 114.01, 87.40, 85.40, 85.35, 84.67, 76.55, 76.51, 64.26, 55.63, 39.14, 36.74, 21.53, 19.43, 19.35, 19.21, 18.49, 12.61, 12.58.
$^{31}$P NMR (162 MHz, Acetone-$d_6$) δ 57.29.
HRMS (ESI-TOF): calc'd for $C_{37}H_{43}N_5O_8PS$ [M+H]$^+$: 748.2570, found: 748.2568.

7. Compound ($S_p$)-42

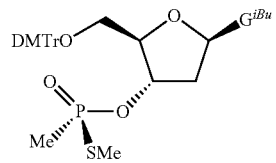

Following General Procedure H on 1 mmol scale with 12a and N$^2$-isobutyryl-5'-O-(4,4'-dimethoxytrityl)-2'-deoxyguanosine. Purification by silica gel column chromatography (2% to 5% MeOH in DCM) afforded 441 mg (59%, >20:1 d.r.) of the title compound ($S_p$)-42.

Physical State: white foam
$R_f$=0.25 (EtOAc/acetone=2:1)
$^1$H NMR (600 MHz, Acetone-$d_6$) δ 12.04 (s, 1H), 10.84 (s, 1H), 7.92 (s, 1H), 7.41-7.37 (m, 2H), 7.30-7.15 (m, 7H), 6.79 (dd, J=9.0, 2.5 Hz, 4H), 6.40 (dd, J=8.0, 5.8 Hz, 1H), 5.59 (ddt, J=10.8, 5.6, 2.7 Hz, 1H), 4.62-4.55 (m, 1H), 3.75 (d, J=2.1 Hz, 6H), 3.43 (dd, J=10.4, 5.0 Hz, 1H), 3.32 (dd, J=10.4, 3.8 Hz, 1H), 3.06 (ddd, J=13.9, 8.0, 5.9 Hz, 1H), 2.82-2.72 (m, 2H), 2.38 (d, J=13.4 Hz, 3H), 1.98 (d, J=15.6 Hz, 3H), 1.15 (dd, J=34.6, 6.8 Hz, 6H).
$^{13}$C NMR (151 MHz, Acetone-$d_6$) δ 180.81, 159.55, 155.79, 149.27, 149.24, 145.80, 137.82, 136.54, 130.88, 130.86, 128.95, 128.54, 127.56, 122.03, 113.83, 87.07, 85.87, 85.85, 84.46, 76.90, 76.85, 64.11, 55.47, 39.14, 39.11, 36.44, 19.35, 19.31, 19.19, 18.60, 12.46, 12.43.
$^{31}$P NMR (162 MHz, Acetone-$d_6$) δ 58.75.
HRMS (ESI-TOF): calc'd for $C_{37}H_{43}N_5O_8PS$ [M+H]$^+$: 748.2570, found: 748.2573.

8. Compound ($R_p$)-43

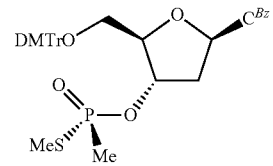

Following General Procedure H on 1 mmol scale with 12b and N⁴-benzoyl-5'-O-(4,4'-dimethoxytrityl)-2'-deoxycytidine. Purification by silica gel column chromatography (2% to 5% MeOH in DCM) afforded 652 mg (88%, >20:1 d.r.) of the title compound ($R_p$)-43.

Physical State: white foam $R_f$=0.21 (DCM/MeOH=98:2)

¹H NMR (600 MHz, Acetone-$d_6$) δ 9.79 (s, 1H), 8.25 (d, J=7.4 Hz, 1H), 8.17 (ddt, J=7.5, 6.2, 2.6 Hz, 2H), 7.68-7.65 (m, 1H), 7.61-7.55 (m, 2H), 7.51 (dt, J=8.8, 2.2 Hz, 2H), 7.42-7.34 (m, 5H), 7.31-7.17 (m, 3H), 6.96-6.92 (m, 4H), 6.29 (t, J=6.4 Hz, 1H), 5.27 (ddt, J=10.4, 7.2, 3.8 Hz, 1H), 4.38 (q, J=3.8 Hz, 1H), 3.82 (s, 6H), 3.54 (d, J=4.0 Hz, 2H), 2.88 (ddd, J=14.4, 6.3, 3.5 Hz, 1H), 2.50 (dt, J=12.3, 5.9 Hz, 1H), 2.22 (d, J=13.0 Hz, 3H), 1.84 (d, J=15.7 Hz, 3H).

¹³C NMR (151 MHz, Acetone-$d_6$) δ 159.94, 145.68, 145.16, 138.63, 136.51, 136.45, 133.75, 131.18, 131.16, 129.89, 129.61, 129.24, 129.21, 129.17, 128.90, 127.96, 126.25, 114.20, 87.89, 87.76, 85.94, 85.89, 75.80, 75.76, 63.74, 55.67, 41.31, 21.54, 19.21, 18.48, 12.53, 12.51.

³¹P NMR (162 MHz, Acetone-$d_6$) δ 56.15.

HRMS (ESI-TOF): calc'd for $C_{39}H_{41}N_3O_8PS$ [M+H]⁺: 742.2352, found: 742.2360.

9. Compound ($S_p$)-43

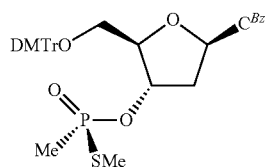

Following General Procedure H on 1 mmol scale with 12a and N⁴-benzoyl-5'-O-(4,4'-dimethoxytrityl)-2'-deoxycytidine. Purification by silica gel column chromatography (2% to 5% MeOH in DCM) afforded 534 mg (72%, >20:1 d.r.) of the title compound ($S_p$)-43.

Physical State: white foam $R_f$=0.33 (EtOAc/acetone=2:1)

¹H NMR (600 MHz, Acetone-$d_6$) δ 10.07 (s, 1H), 8.25 (d, J=7.5 Hz, 1H), 8.15 (dd, J=8.4, 1.3 Hz, 2H), 7.66-7.59 (m, 1H), 7.57-7.51 (m, 2H), 7.51-7.47 (m, 2H), 7.40-7.35 (m, 4H), 7.33 (dd, J=8.4, 7.1 Hz, 2H), 7.29-7.21 (m, 2H), 6.93-6.88 (m, 4H), 6.25 (t, J=6.4 Hz, 1H), 5.33 (ddt, J=9.7, 6.5, 3.3 Hz, 1H), 4.47 (q, J=3.6 Hz, 1H), 3.78 (d, J=1.3 Hz, 6H), 3.51 (ddd, J=37.0, 10.8, 3.8 Hz, 2H), 2.80 (ddd, J=14.3, 6.2, 3.4 Hz, 1H), 2.50 (dt, J=14.2, 6.5 Hz, 1H), 2.31 (d, J=13.1 Hz, 3H), 1.83 (d, J=15.7 Hz, 3H).

¹³C NMR (151 MHz, Acetone-$d_6$) δ 163.77, 159.70, 159.69, 145.60, 145.05, 136.47, 136.33, 134.59, 133.57, 131.05, 130.98, 129.41, 129.13, 129.04, 128.74, 127.72, 114.04, 97.09, 87.70, 86.33, 86.30, 75.76, 75.72, 63.44, 55.51, 40.72, 40.69, 19.10, 18.38, 12.37, 12.35.

³¹P NMR (162 MHz, Acetone-$d_6$) δ 56.56.

HRMS (ESI-TOF): calc'd for $C_{39}H_{41}N_3O_8PS$ [M+H]⁺: 742.2352, found: 742.2343.

b. Coupling

1. General Procedure I

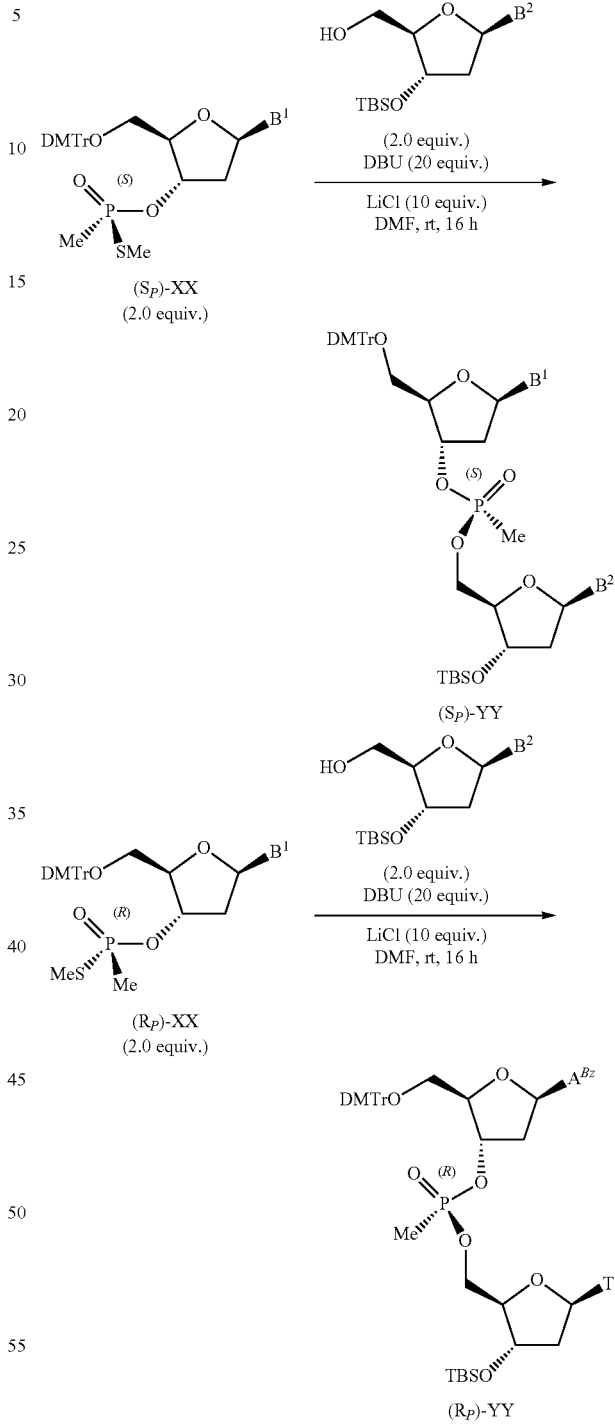

The coupling step follows a modified version of the reported procedures. A culture tube was charged with LiCl (12.7 mg, 0.3 mmol, 10 equiv.), flame-dried under vacuum, and allowed to cool back to room temperature. The loaded compound (0.06 mmol, 2.0 equiv.) and 3'-TBS-nucleoside (0.03 mmol, 1.0 equiv.) were added to the culture tube, which was then sealed and backfilled with Ar for three times. DMF (0.5 mL) was added, and the reaction was stirred for circa 15 min until all LiCl has dissolved. DBU (91.3 mg, 0.09 mL, 0.6 mmol, 20 equiv.) was then introduced via syringe, and the resulting mixture was stirred overnight for 16 h. The reaction was quenched with the addition of 1×PBS solution (10 mL) and extracted with DCM (3×10 mL). The combined organic layers were washed with water (2×10 mL) and brine (10 mL), dried over MgSO$_4$, filtered and concentrated. If needed, residual DMF can be azeotropically removed with toluene. The residue was purified by pTLC to afford the desired compound.

2. Compound ($S_p$)-44

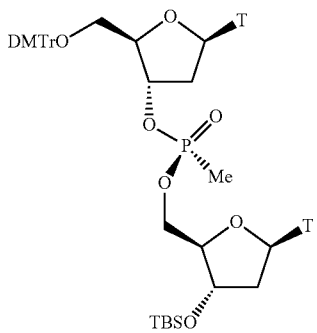

Following General Procedure I on 0.03 mmol scale with ($S_p$)-40 and SI-31. Purification by pTLC (EtOAc/DCM:acetone=5:5:2) afforded 23.9 mg (83%, >20:1 d.r.) of the title compound ($S_p$)-44.

Physical State: white amorphous solid $R_f$=0.32 (EtOAc/DCM/acetone=5:5:2)

$^1$H NMR (600 MHz, Acetone-$d_6$) δ 10.12 (s, 1H), 10.06 (s, 1H), 7.58 (q, J=1.2 Hz, 1H), 7.54 (q, J=1.3 Hz, 1H), 7.51-7.47 (m, 2H), 7.39-7.31 (m, 6H), 7.28-7.23 (m, 1H), 6.93-6.88 (m, 4H), 6.37 (t, J=7.1 Hz, 1H), 6.30 (dd, J=7.7, 6.1 Hz, 1H), 5.34 (dtd, J=8.3, 4.2, 2.6 Hz, 1H), 4.52 (dt, J=6.1, 3.2 Hz, 1H), 4.27 (q, J=3.0 Hz, 1H), 4.26-4.22 (m, 1H), 4.09 (ddd, J=11.4, 7.0, 3.5 Hz, 1H), 4.00 (dt, J=5.2, 3.3 Hz, 1H), 3.79 (s, 6H), 3.48-3.39 (m, 2H), 2.61-2.55 (m, 2H), 2.31-2.16 (m, 2H), 1.81 (d, J=1.3 Hz, 3H), 1.59 (d, J=17.7 Hz, 3H), 1.45 (d, J=1.2 Hz, 3H), 0.91 (s, 9H), 0.12 (d, J=2.0 Hz, 6H).

$^{13}$C NMR (151 MHz, Acetone-$d_6$) δ 164.26, 164.19, 159.80, 159.78, 151.29, 151.26, 145.73, 136.55, 136.45, 136.33, 136.17, 131.05, 131.04, 129.05, 128.79, 127.83, 114.07, 111.30, 111.11, 87.74, 86.32, 86.27, 85.74, 85.49, 85.46, 85.07, 76.99, 76.95, 73.06, 65.66, 65.62, 64.22, 55.57, 40.73, 39.57, 39.54, 26.13, 18.49, 12.57, 12.18, 12.13, 11.24, −4.56, −4.65.

$^{31}$P NMR (162 MHz, Acetone-$d_6$) δ 33.33.

HRMS (ESI-TOF): calc'd for $C_{48}H_{61}N_4O_{13}$PSi [M+Na]$^+$: 983.3640, found: 983.3629.

3. Compound ($S_p$)-45

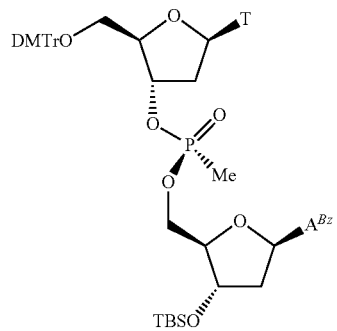

Following General Procedure I on 0.03 mmol scale with ($S_p$)-40 and SI-32. Purification by pTLC (EtOAc/DCM/acetone=5:5:2) afforded 29.3 mg (91%, 20:1 d.r.) of the title compound ($S_p$)-45.

Physical State: white amorphous solid $R_f$=0.32 (EtOAc/DC/acetone=5:5:2)

$^1$H NMR (600 MHz, Acetone-$d_6$) δ 10.25 (s, 1H), 10.06 (s, 1H), 8.64 (s, 1H), 8.46 (s, 1H), 8.10 (d, J=7.7 Hz, 2H), 7.64-7.60 (m, 1H), 7.57-7.51 (m, 3H), 7.47-7.44 (m, 2H), 7.36-7.28 (m, 6H), 7.24-7.19 (m, 1H), 6.88 (dd, J=9.0, 1.2 Hz, 4H), 6.56 (t, J=6.5 Hz, 1H), 6.33 (dd, J=8.0, 6.1 Hz, 1H), 5.26 (ddt, J=8.2, 5.5, 2.7 Hz, 1H), 4.88 (dt, J=6.0, 4.0 Hz, 1H), 4.26-4.10 (m, 4H), 3.76 (s, 6H), 3.41-3.31 (m, 2H), 3.06 (dt, J=13.0, 6.2 Hz, 1H), 2.56-2.49 (m, 3H), 1.50 (d, J=17.7 Hz, 3H), 1.42 (d, J=1.2 Hz, 3H), 0.95 (s, 9H), 0.18 (s, 6H).

$^{13}$C NMR (151 MHz, Acetone-$d_6$) δ 165.88, 164.25, 159.75, 159.73, 152.85, 152.63, 151.33, 151.23, 145.74, 143.57, 136.45, 136.31, 136.22, 135.01, 133.18, 131.03, 131.01, 129.37, 129.21, 129.01, 128.77, 127.77, 126.04, 114.05, 111.26, 87.69, 86.64, 86.60, 85.43, 85.40, 85.36, 85.09, 76.91, 76.87, 73.07, 65.14, 65.10, 64.14, 55.55, 40.44, 39.57, 39.55, 26.18, 18.55, 12.11, 11.16, −4.51, −4.61.

$^{31}$P NMR (162 MHz, Acetone-$d_6$) δ 32.99.

HRMS (ESI-TOF): calc'd for $C_{55}H_{64}N_7O_{12}$PSi [M+H]$^+$: 1074.4198, found: 1074.4181.

4. Compound ($S_p$)-46

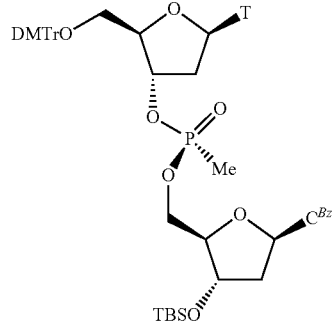

Following General Procedure I on 0.03 mmol scale with ($S_p$)-40 and SI-33. Purification by pTLC (EtOAc/acetone=15:1) afforded 25.5 mg (81%, >20:1 d.r.) of the title compound ($S_p$)-46.

Physical State: white amorphous solid $R_f$=0.50 (EtOAc/acetone=10:1)

$^1$H NMR (600 MHz, Acetone-$d_6$) δ 10.09 (s, 1H), 9.95 (s, 1H), 8.22 (d, J=7.6 Hz, 1H), 8.17-8.13 (m, 2H), 7.67-7.62

(m, 1H), 7.58 (d, J=1.3 Hz, 1H), 7.55 (t, J=7.8 Hz, 2H), 7.50-7.46 (m, 2H), 7.39-7.29 (m, 7H), 7.26-7.21 (m, 1H), 6.89 (d, J=9.0 Hz, 4H), 6.37 (t, J=7.0 Hz, 1H), 6.23 (t, J=6.3 Hz, 1H), 5.35 (dtd, J=8.1, 4.3, 2.5 Hz, 1H), 4.54 (dt, J=6.1, 4.0 Hz, 1H), 4.35-4.28 (m, 2H), 4.17 (ddd, J=11.4, 6.8, 3.5 Hz, 1H), 4.12 (q, J=4.1 Hz, 1H), 3.77 (s, 6H), 3.45 (ddd, J=31.5, 10.6, 3.3 Hz, 2H), 2.60 (dd, J=7.1, 4.4 Hz, 2H), 2.46 (ddd, J=13.6, 6.3, 4.1 Hz, 1H), 2.24 (dt, J=13.5, 6.3 Hz, 1H), 1.61 (d, J=17.7 Hz, 3H), 1.45 (d, J=1.3 Hz, 3H), 0.91 (s, 9H), 0.12 (d, J=1.6 Hz, 6H).

$^{13}$C NMR (151 MHz, Acetone-d$_6$) δ 164.19, 163.70, 159.77, 159.76, 151.27, 145.73, 145.27, 136.46, 136.32, 136.25, 134.62, 133.59, 131.04, 129.44, 129.16, 129.04, 128.78, 127.81, 114.06, 114.05, 111.24, 97.15, 87.85, 87.72, 86.91, 86.87, 85.48, 85.45, 85.20, 77.05, 77.01, 72.59, 65.27, 65.23, 64.24, 55.55, 42.10, 39.57, 39.55, 26.14, 18.49, 12.22, 12.15, 11.28, −4.53, −4.68.

$^{31}$P NMR (162 MHz, Acetone-d$_6$) δ 33.43.

HRMS (ESI-TOF): calc'd for $C_{54}H_{64}N_5O_{13}PSi$ [M+H]$^+$: 1050.4086, found: 1050.4083.

5. Compound (S$_p$)-47

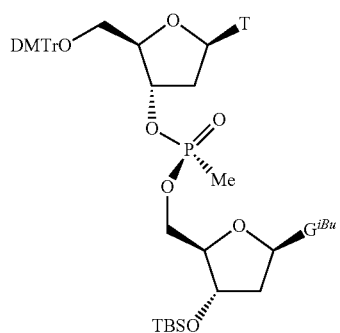

Following General Procedure I on 0.03 mmol scale with (S$_p$)-40 and SI-34. Purification by pTLC (EtOAc/acetone=10:1) afforded 25.0 mg (80%, >20:1 d.r.) of the title compound (S$_p$)-47.

Physical State: white amorphous solid

R$_f$=0.37 (EtOAc/acetone=10:1)

$^1$H NMR (600 MHz, Acetone-d$_6$) δ 12.06 (s, 1H), 11.00 (s, 1H), 10.06 (s, 1H), 7.97 (s, 1H), 7.58 (d, J=1.3 Hz, 1H), 7.48 (dd, J=8.4, 1.2 Hz, 2H), 7.38-7.29 (m, 6H), 7.26-7.20 (m, 1H), 6.91-6.86 (m, 4H), 6.38 (dd, J=7.7, 6.5 Hz, 1H), 6.33 (dd, J=8.9, 5.7 Hz, 1H), 5.36 (ddt, J=7.8, 5.8, 3.1 Hz, 1H), 4.63 (dt, J=5.2, 1.8 Hz, 1H), 4.45 (ddd, J=11.0, 7.0, 4.9 Hz, 1H), 4.37-4.29 (m, 2H), 4.18 (td, J=5.4, 5.0, 1.6 Hz, 1H), 3.77 (d, J=1.7 Hz, 6H), 3.45 (qd, J=10.6, 3.4 Hz, 2H), 2.99-2.89 (m, 1H), 2.84-2.80 (m, 1H), 2.63-2.58 (m, 2H), 2.27 (ddd, J=13.3, 5.8, 1.9 Hz, 1H), 1.62 (d, J=17.6 Hz, 3H), 1.45 (d, J=1.1 Hz, 3H), 1.16 (dd, J=16.4, 6.9 Hz, 6H), 0.92 (s, 9H), 0.13 (d, J=3.7 Hz, 6H).

$^{13}$C NMR (151 MHz, Acetone-d$_6$) δ 181.00, 164.13, 159.80, 159.78, 155.81, 151.25, 149.07, 148.92, 145.67, 139.55, 136.40, 136.30, 136.22, 131.02, 131.00, 129.04, 128.78, 127.85, 123.14, 114.05, 111.28, 87.74, 87.07, 87.02, 86.90, 85.48, 85.45, 85.25, 77.51, 77.48, 73.92, 66.07, 66.03, 64.26, 55.56, 39.92, 39.47, 39.44, 36.41, 26.17, 19.40, 19.23, 18.56, 12.14, 11.71, 10.78, −4.54, −4.61.

$^{31}$P NMR (162 MHz, Acetone-d$_6$) δ 34.75.

HRMS (ESI-TOF): calc'd for $C_{52}H_{66}N_7O_{13}PSi$ [M+Na]$^+$: 1078.4123, found: 1078.4097.

6. Compound (S$_p$)-48

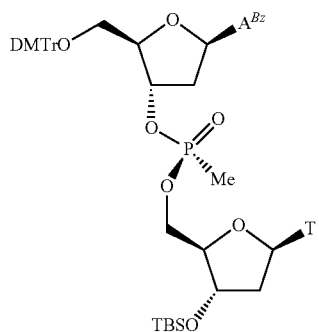

Following General Procedure I on 0.03 mmol scale with (S$_p$)-41 and SI-31. Purification by pTLC (EtOAc/acetone=7:1) afforded 24.2 mg (75%, >20:1 d.r.) of the title compound (S$_p$)-48.

Physical State: white amorphous solid

R$_f$=0.32 (EtOAc/acetone=7:1)

$^1$H NMR (600 MHz, Acetone-d$_6$) δ 10.28 (s, 1H), 10.08 (s, 1H), 8.55 (s, 1H), 8.41 (s, 1H), 8.12 (d, J=7.6 Hz, 2H), 7.63 (t, J=7.4 Hz, 1H), 7.59 (d, J=1.3 Hz, 1H), 7.54 (t, J=7.8 Hz, 2H), 7.45 (dd, J=8.5, 1.3 Hz, 2H), 7.35-7.30 (m, 4H), 7.26 (t, J=7.6 Hz, 2H), 7.22-7.16 (m, 1H), 6.86-6.81 (m, 4H), 6.58 (dd, J=7.7, 6.2 Hz, 1H), 6.34 (dd, J=7.7, 6.1 Hz, 1H), 5.47 (td, J=5.7, 2.9 Hz, 1H), 4.56 (dt, J=6.1, 3.2 Hz, 1H), 4.42 (td, J=5.1, 2.6 Hz, 1H), 4.32 (ddd, J=11.4, 7.7, 5.2 Hz, 1H), 4.19 (ddd, J=11.4, 7.1, 3.5 Hz, 1H), 4.05 (dt, J=5.5, 3.2 Hz, 1H), 3.76 (d, J=2.6 Hz, 6H), 3.51-3.41 (m, 2H), 3.37 (ddd, J=13.9, 7.8, 6.1 Hz, 1H), 2.81 (ddd, J=14.1, 6.2, 2.8 Hz, 1H), 2.34-2.21 (m, 2H), 1.83 (d, J=1.2 Hz, 3H), 1.63 (d, J=17.7 Hz, 3H), 0.91 (s, 9H), 0.13 (s, 6H).

$^{13}$C NMR (151 MHz, Acetone-d$_6$) δ 164.56, 163.02, 158.28, 158.26, 151.54, 151.22, 150.01, 144.58, 142.37, 135.30, 135.26, 133.68, 131.86, 129.65, 129.58, 128.03, 127.87, 127.66, 127.26, 126.27, 124.90, 112.56, 109.82, 85.93, 85.05, 85.01, 84.61, 84.58, 84.42, 84.27, 75.95, 75.91, 71.72, 64.36, 64.32, 62.93, 54.18, 39.46, 36.94, 36.91, 24.81, 17.16, 11.27, 10.92, 9.97, −5.88, −5.96.

$^{31}$P NMR (162 MHz, Acetone-d$_6$) δ 33.03.

HRMS (ESI-TOF): calc'd for $C_{55}H_{64}N_7O_{12}PSi$ [M+H]$^+$: 1074.4198, found: 1074.4185.

7. Compound (S$_p$)-49

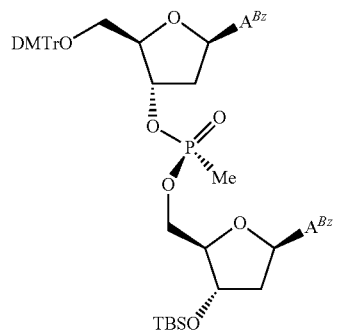

Following General Procedure I on 0.03 mmol scale with ($S_p$)-41 and SI-32. Purification by pTLC (10% MeOH in EtOAc) afforded 27.5 mg (77%, >20:1 d.r.) of the title compound ($S_p$)-49.

Physical State: white amorphous solid $R_f$=0.28 (10% MeOH in EtOAc)

$^1$H NMR (600 MHz, Acetone-$d_6$) δ 9.99 (d, J=12.5 Hz, 2H), 8.66 (s, 1H), 8.52 (d, J=7.4 Hz, 2H), 8.42 (s, 1H), 8.13 (t, J=6.2 Hz, 4H), 7.65 (dt, J=15.2, 7.4 Hz, 2H), 7.56 (dt, J=15.6, 7.6 Hz, 4H), 7.47-7.42 (m, 2H), 7.34-7.30 (m, 4H), 7.26 (dd, J=8.5, 7.0 Hz, 2H), 7.21-7.16 (m, 1H), 6.85-6.80 (m, 4H), 6.61 (t, J=6.5 Hz, 1H), 6.55 (dd, J=7.7, 6.2 Hz, 1H), 5.40 (ddt, J=8.4, 5.8, 2.7 Hz, 1H), 4.93 (dt, J=6.0, 4.0 Hz, 1H), 4.35 (td, J=5.1, 2.5 Hz, 1H), 4.31 (dd, J=7.2, 4.4 Hz, 2H), 4.20 (q, J=4.2 Hz, 1H), 3.76 (d, J=2.0 Hz, 6H), 3.46-3.36 (m, 2H), 3.31 (dt, J=14.2, 7.6 Hz, 1H), 3.09 (dt, J=12.9, 6.2 Hz, 1H), 2.76 (ddd, J=14.0, 6.2, 2.8 Hz, 1H), 2.58 (ddd, J=13.4, 6.5, 4.3 Hz, 1H), 1.55 (d, J=17.7 Hz, 3H), 0.97 (s, 9H), 0.21 (s, 6H).

$^{13}$C NMR (151 MHz, Acetone-$d_6$) δ 165.92, 165.85, 159.60, 159.58, 152.91, 152.82, 152.65, 152.51, 151.20, 145.95, 143.83, 143.55, 136.66, 136.65, 135.07, 134.99, 133.22, 133.19, 130.98, 130.92, 129.41, 129.39, 129.20, 129.17, 128.99, 128.58, 127.56, 126.48, 126.29, 126.19, 113.89, 87.21, 86.72, 86.68, 85.88, 85.85, 85.64, 85.42, 77.27, 77.24, 73.09, 65.14, 65.10, 64.24, 55.51, 40.64, 38.14, 26.20, 18.57, 12.11, 11.16, −4.50, −4.58.

$^{31}$P NMR (162 MHz, Acetone-$d_6$) δ 32.60.

HRMS (ESI-TOF): calc'd for $C_{62}H_{67}N_{10}O_{11}PSi$ [M+H]$^+$: 1187.4576, found: 1187.4561.

8. Compound ($S_p$)-50

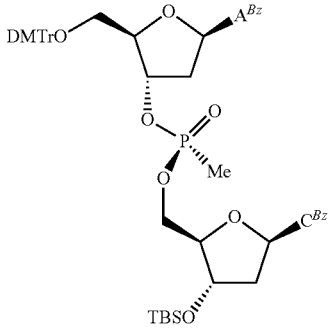

Following General Procedure I on 0.03 mmol scale with ($S_p$)-41 and SI-33. Purification by pTLC (EtOAc/acetone=7:1) afforded 26.8 mg (77%, >20:1 d.r.) of the title compound ($S_p$)-50.

Physical State: white amorphous solid $R_f$=0.50 (EtOAc/acetone=5:1)

$^1$H NMR (600 MHz, Acetone-$d_6$) δ 10.06 (s, 2H), 8.55 (s, 1H), 8.46 (s, 1H), 8.31 (d, J=7.5 Hz, 1H), 8.16-8.10 (m, 4H), 7.67-7.60 (m, 2H), 7.55 (q, J=8.6, 7.7 Hz, 4H), 7.47 (d, J=7.3 Hz, 2H), 7.41 (s, 1H), 7.35-7.31 (m, 4H), 7.26 (t, J=7.7 Hz, 2H), 7.22-7.17 (m, 1H), 6.86-6.80 (m, 4H), 6.62 (dd, J=7.6, 6.2 Hz, 1H), 6.28 (t, J=6.3 Hz, 1H), 5.50 (ddt, J=8.5, 5.8, 2.6 Hz, 1H), 4.60 (dt, J=6.2, 4.0 Hz, 1H), 4.46 (dt, J=8.0, 3.9 Hz, 1H), 4.40 (ddd, J=11.8, 7.3, 4.8 Hz, 1H), 4.31 (ddt, J=10.3, 6.9, 3.3 Hz, 1H), 4.18 (q, J=4.0 Hz, 1H), 3.76 (dd, J=2.4, 1.5 Hz, 6H), 3.53-3.44 (m, 2H), 3.41 (dt, J=13.7, 6.7 Hz, 1H), 2.85 (ddd, J=14.0, 6.2, 2.8 Hz, 1H), 2.50 (ddt, J=11.8, 5.7, 2.8 Hz, 1H), 2.29 (dt, J=13.2, 6.3 Hz, 1H), 1.67 (d, J=17.7 Hz, 3H), 0.93 (s, 9H), 0.15 (s, 6H).

$^{13}$C NMR (151 MHz, Acetone-$d_6$) δ 166.11, 163.70, 159.60, 159.58, 152.81, 152.56, 151.17, 145.92, 145.34, 143.93, 136.64, 136.61, 134.96, 134.56, 133.60, 133.27, 130.98, 130.91, 129.44, 129.39, 129.18, 129.14, 128.99, 128.58, 127.59, 126.14, 113.89, 97.10, 87.94, 87.24, 86.98, 86.94, 85.97, 85.94, 85.70, 77.37, 77.33, 72.57, 65.30, 65.26, 64.29, 55.51, 42.21, 38.24, 38.22, 26.15, 18.49, 12.31, 11.36, −4.52, −4.65.

$^{31}$P NMR (162 MHz, Acetone-$d_6$) δ 33.17.

HRMS (ESI-TOF): calc'd for $C_{61}H_{67}N_8O_{12}PSi$ [M+H]$^+$: 1163.4464, found: 1163.4448.

9. Compound ($S_p$)-51

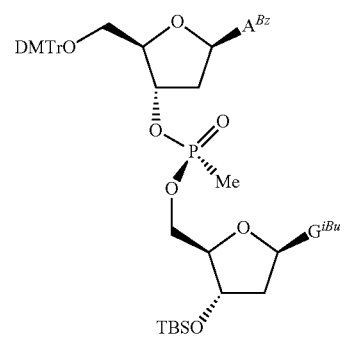

Following General Procedure I on 0.03 mmol scale with ($S_p$)-41 and SI-34. Purification by pTLC (10% MeOH in EtOAc) afforded 20.0 mg (60%, >20:1 d.r.) of the title compound ($S_p$)-51.

Physical State: white amorphous solid $R_f$=0.25 (EtOAc:acetone=5:1)

$^1$H NMR (600 MHz, Acetone-$d_6$) δ 12.08 (s, 1H), 11.07 (s, 1H), 10.00 (s, 1H), 8.54 (s, 1H), 8.43 (s, 1H), 8.13 (d, J=7.6 Hz, 2H), 8.01 (s, 1H), 7.67-7.61 (m, 1H), 7.55 (t, J=7.7 Hz, 2H), 7.47-7.40 (m, 2H), 7.34-7.27 (m, 4H), 7.23 (dd, J=8.3, 6.8 Hz, 2H), 7.20-7.15 (m, 1H), 6.80 (t, J=8.7 Hz, 4H), 6.62 (dd, J=7.6, 6.2 Hz, 1H), 6.36 (dd, J=8.8, 5.7 Hz, 1H), 5.50 (ddt, J=8.4, 5.8, 2.7 Hz, 1H), 4.71-4.64 (m, 1H), 4.53 (ddd, J=11.6, 7.1, 4.7 Hz, 1H), 4.47 (td, J=5.1, 2.5 Hz, 1H), 4.40 (dt, J=11.1, 6.1 Hz, 1H), 4.22 (t, J=4.5 Hz, 1H), 3.74 (d, J=2.7 Hz, 6H), 3.50-3.38 (m, 3H), 2.99 (ddd, J=13.7, 8.8, 5.2 Hz, 1H), 2.85-2.82 (m, 2H), 2.31 (ddd, J=13.2, 5.8, 1.9 Hz, 1H), 1.65 (d, J=17.6 Hz, 3H), 1.15 (dd, J=24.8, 6.8 Hz, 6H), 0.93 (s, 9H), 0.15 (d, J=1.4 Hz, 6H).

$^{13}$C NMR (151 MHz, Acetone-$d_6$) δ 181.01, 165.88, 159.61, 159.58, 155.87, 152.84, 152.51, 151.32, 149.11, 148.97, 145.85, 143.87, 139.57, 136.61, 136.57, 135.03, 133.23, 130.95, 130.88, 129.41, 129.17, 128.99, 128.56, 127.61, 126.31, 123.15, 113.86, 87.20, 87.14, 87.10, 86.92, 86.00, 85.97, 85.71, 77.72, 77.68, 73.91, 66.12, 66.08, 64.35, 55.51, 40.06, 38.10, 38.07, 36.41, 26.18, 19.39, 19.23, 18.56, 11.84, 10.91, −4.50, −4.57.

$^{31}$P NMR (162 MHz, Acetone-$d_6$) δ 34.58.

HRMS (ESI-TOF): calc'd for $C_{59}H_{69}N_{10}O_{12}PSi$ [M+H]$^+$: 1169.4682, found: 1169.4675.

10. Compound (S$_p$)-52

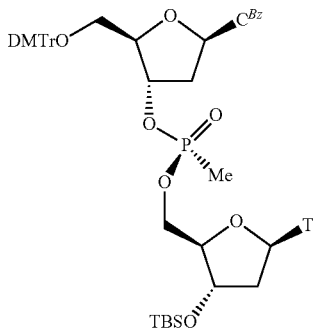

Following General Procedure I on 0.03 mmol scale with (S$_p$)-43 and SI-31. Purification by pTLC (EtOAc/DCM:acetone=5:5:3) afforded 14.2 mg (46%, >20:1 d.r.) of the title compound (S$_p$)-52.

Physical State: white amorphous solid
R$_f$=0.33 (EtOAc/DCM:acetone=5:5:3)
$^1$H NMR (600 MHz, Acetone-d$_6$) δ 9.98 (s, 1H), 9.90 (s, 1H), 8.24 (d, J=7.5 Hz, 1H), 8.18-8.12 (m, 2H), 7.68-7.63 (m, 1H), 7.58-7.53 (m, 3H), 7.50-7.47 (m, 2H), 7.39-7.32 (m, 6H), 7.28-7.19 (m, 2H), 6.95-6.88 (m, 4H), 6.31 (dd, J=7.7, 6.1 Hz, 1H), 6.23 (t, J=6.2 Hz, 1H), 5.27 (ddt, J=7.7, 6.2, 3.9 Hz, 1H), 4.54 (dt, J=6.1, 3.1 Hz, 1H), 4.37 (q, J=3.8 Hz, 1H), 4.26 (ddd, J=11.4, 7.7, 5.2 Hz, 1H), 4.10 (ddd, J=11.4, 7.0, 3.6 Hz, 1H), 4.02 (dt, J=5.2, 3.3 Hz, 1H), 3.80 (d, J=1.5 Hz, 6H), 3.55-3.46 (m, 2H), 2.82-2.77 (m, 1H), 2.52 (dt, J=14.2, 6.3 Hz, 1H), 2.31-2.19 (m, 2H), 1.82 (d, J=1.2 Hz, 3H), 1.61 (d, J=17.7 Hz, 3H), 0.91 (s, 9H), 0.12 (d, J=1.8 Hz, 6H).
$^{13}$C NMR (151 MHz, Acetone-d$_6$) δ 164.20, 163.77, 159.77, 151.25, 145.56, 145.05, 136.53, 136.40, 136.34, 134.60, 133.62, 131.05, 131.02, 129.47, 129.13, 129.09, 128.80, 127.81, 114.09, 111.10, 97.08, 87.79, 87.60, 86.33, 86.29, 86.00, 85.97, 85.76, 75.89, 75.85, 73.08, 65.57, 65.53, 63.41, 55.55, 40.85, 40.83, 40.75, 26.14, 18.50, 12.60, 12.20, 11.25, −4.55, −4.64.
$^{31}$P NMR (162 MHz, Acetone-d$_6$) δ 33.25.
HRMS (ESI-TOF): calc'd for C$_{54}$H$_{64}$N$_5$O$_{13}$PSi [M+Na]$^+$: 1072.3905, found: 1072.3926.

11. Compound (S$_p$)-53

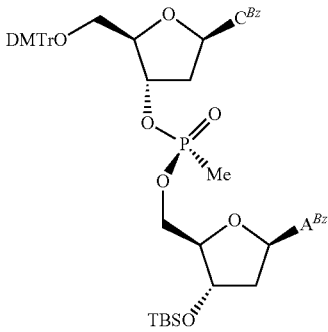

Following General Procedure I on 0.03 mmol scale with (S$_p$)-43 and SI-32. Purification by pTLC (EtOAc/DCM/acetone=10:10:7) afforded 27.6 mg (79%, >20:1 d.r.) of the title compound (S$_p$)-53.

Physical State: white amorphous solid
R$_f$=0.34 (EtOAc/DCM/acetone=5:5:3)
$^1$H NMR (600 MHz, Acetone-d$_6$) δ 10.03 (s, 2H), 8.64 (s, 1H), 8.47 (s, 1H), 8.22 (d, J=7.5 Hz, 1H), 8.13 (ddd, J=8.7, 4.0, 2.6 Hz, 4H), 7.65-7.59 (m, 2H), 7.56-7.50 (m, 4H), 7.46-7.41 (m, 2H), 7.34-7.28 (m, 6H), 7.27-7.15 (m, 2H), 6.90-6.85 (m, 4H), 6.56 (t, J=6.5 Hz, 1H), 6.18 (t, J=6.1 Hz, 1H), 5.21 (ddt, J=8.0, 6.3, 4.2 Hz, 1H), 4.90 (dt, J=5.9, 4.0 Hz, 1H), 4.28-4.17 (m, 3H), 4.14 (q, J=4.3 Hz, 1H), 3.77 (d, J=1.7 Hz, 6H), 3.42 (dd, J=3.6, 1.2 Hz, 2H), 3.06 (dt, J=13.5, 6.2 Hz, 1H), 2.73 (ddd, J=14.1, 6.3, 4.4 Hz, 1H), 2.57-2.46 (m, 2H), 1.55 (d, J=17.8 Hz, 3H), 0.95 (s, 9H), 0.17 (s, 6H).
$^{13}$C NMR (151 MHz, Acetone-d$_6$) δ 165.90, 163.82, 159.69, 152.86, 152.61, 151.24, 145.50, 145.05, 143.58, 136.40, 136.29, 135.06, 134.59, 133.55, 133.16, 130.99, 130.95, 129.39, 129.22, 129.19, 129.08, 129.04, 128.76, 127.72, 126.18, 114.06, 97.01, 87.71, 87.53, 86.63, 86.59, 85.77, 85.74, 85.34, 75.55, 75.51, 73.10, 65.04, 65.00, 63.17, 55.53, 40.73, 40.71, 40.45, 26.19, 18.56, 12.15, 11.21, −4.51, −4.60.
$^{31}$P NMR (162 MHz, Acetone-d$_6$) δ 33.13.
HRMS (ESI-TOF): calc'd for C$_{61}$H$_{67}$N$_8$O$_{12}$PSi [M+H]$^+$: 1163.4464, found: 1163.4436.

12. Compound (S$_p$)-54

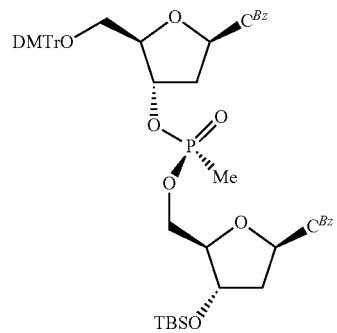

Following General Procedure I on 0.03 mmol scale with (S$_p$)-43 and SI-33. Purification by pTLC (DCM/acetone=2:1) afforded 22.4 mg (66%, >20:1 d.r.) of the title compound (S$_p$)-54.

Physical State: white amorphous solid
R$_f$=0.31 (DCM/acetone=2:1)
$^1$H NMR (600 MHz, Acetone-d$_6$) δ 10.02 (s, 2H), 8.24 (dd, J=24.8, 7.5 Hz, 2H), 8.15 (ddd, J=8.6, 2.4, 1.3 Hz, 4H), 7.65-7.61 (m, 2H), 7.53 (dd, J=8.2, 7.4 Hz, 4H), 7.47 (dd, J=8.5, 1.3 Hz, 2H), 7.38-7.31 (m, 7H), 7.25-7.20 (m, 2H), 6.89 (dd, J=9.0, 1.9 Hz, 4H), 6.24 (td, J=6.3, 1.8 Hz, 2H), 5.29 (ddt, J=8.0, 6.3, 4.2 Hz, 1H), 4.57 (dt, J=6.1, 4.0 Hz, 1H), 4.39 (q, J=3.8 Hz, 1H), 4.34 (ddd, J=11.8, 7.3, 4.8 Hz, 1H), 4.20 (ddd, J=11.5, 6.8, 3.6 Hz, 1H), 4.14 (q, J=4.0 Hz, 1H), 3.78 (d, J=1.0 Hz, 6H), 3.51 (t, J=3.4 Hz, 2H), 2.81 (ddd, J=14.1, 6.3, 4.3 Hz, 1H), 2.57 (dt, J=14.2, 6.1 Hz, 1H), 2.47 (ddd, J=13.5, 6.3, 4.1 Hz, 1H), 2.27 (dt, J=13.6, 6.3 Hz, 1H), 1.66 (d, J=17.7 Hz, 3H), 0.91 (s, 9H), 0.12 (s, 6H).
$^{13}$C NMR (151 MHz, Acetone-d$_6$) δ 163.84, 163.72, 159.72, 159.70, 145.50, 145.33, 145.14, 136.40, 136.30, 134.56, 133.58, 131.01, 130.98, 129.44, 129.41, 129.16, 129.06, 128.78, 127.78, 114.07, 114.06, 97.10, 87.91, 87.74, 87.68, 86.89, 86.84, 85.91, 85.87, 75.86, 75.82, 72.58, 65.20, 65.16, 63.36, 55.54, 42.09, 40.78, 40.75, 26.14, 18.48, 12.23, 11.29, −4.54, −4.67.
$^{31}$P NMR (162 MHz, Acetone-d$_6$) δ 33.53.
HRMS (ESI-TOF): calc'd for C$_{60}$H$_{67}$N$_6$O$_{13}$PSi [M+H]$^+$: 1139.4351, found: 1139.4324.

13. Compound (S$_p$)-55

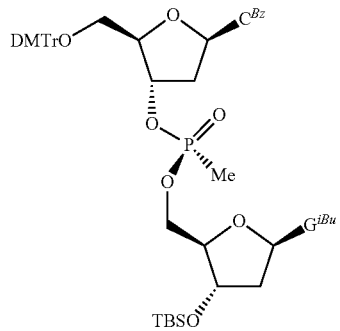

Following General Procedure I on 0.03 mmol scale with (S$_p$)-43 and SI-34. Purification by pTLC (10% MeOH in EtOAc) afforded 20.3 mg (59%, >20:1 d.r.) of the title compound (S$_p$)-55.

Physical State: white amorphous solid

R$_f$=0.33 (10% MeOH in EtOAc)

$^1$H NMR (600 MHz, Acetone-d$_6$) δ 12.08 (s, 1H), 11.07 (s, 1H), 8.26 (d, J=7.5 Hz, 1H), 8.20-8.14 (m, 2H), 7.98 (s, 1H), 7.70-7.66 (m, 1H), 7.59 (t, J=7.8 Hz, 2H), 7.52-7.47 (m, 2H), 7.40-7.32 (m, 6H), 7.28-7.23 (m, 1H), 6.92 (dd, J=9.0, 2.8 Hz, 4H), 6.36 (dd, J=9.0, 5.7 Hz, 1H), 6.27 (t, J=6.3 Hz, 1H), 5.30 (tt, J=7.0, 3.6 Hz, 1H), 4.67 (d, J=5.2 Hz, 1H), 4.51-4.43 (m, 2H), 4.40 (dt, J=11.2, 6.2 Hz, 1H), 4.21 (t, J=5.0 Hz, 1H), 3.79 (d, J=0.8 Hz, 6H), 3.53 (qd, J=10.7, 3.8 Hz, 2H), 3.00 (ddd, J=13.7, 9.0, 5.2 Hz, 1H), 2.91-2.84 (m, 2H), 2.54 (dt, J=21.2, 6.9 Hz, 2H), 2.35-2.28 (m, 2H), 1.64 (d, J=17.6 Hz, 3H), 1.20 (d, J=6.8 Hz, 3H), 1.16 (d, J=6.9 Hz, 3H), 0.94 (s, 9H), 0.15 (d, J=5.4 Hz, 6H).

$^{13}$C NMR (151 MHz, Acetone-d$_6$) δ 180.96, 159.78, 155.87, 149.12, 148.93, 145.52, 139.61, 136.39, 136.29, 133.67, 131.04, 130.99, 129.51, 129.40, 129.09, 128.79, 127.84, 126.50, 123.23, 114.08, 108.73, 87.79, 87.15, 87.10, 87.02, 86.09, 76.39, 73.95, 66.21, 63.49, 62.77, 55.54, 40.81, 39.99, 36.44, 26.17, 19.41, 19.25, 18.57, 11.68, 10.75, −4.53, −4.60.

$^{31}$P NMR (162 MHz, Acetone-d$_6$) δ 34.67.

HRMS (ESI-TOF): calc'd for C$_{58}$H$_{69}$N$_8$O$_{13}$PSi [M+H]$^+$: 1145.4569, found: 1145.4559.

14. Compound (S$_p$)-56

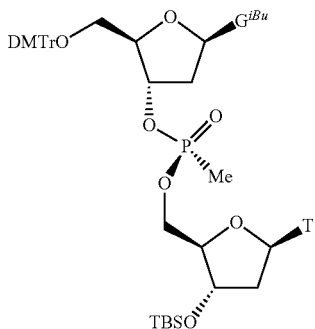

Following General Procedure I on 0.03 mmol scale with (S$_p$)-42 and SI-31. Purification by pTLC (EtOAc/DCM/acetone=5:5:3) afforded 13.3 mg (42%, >20:1 d.r.) of the title compound (S$_p$)-56.

Physical State: white amorphous solid

R$_f$=0.19 (EtOAc/DCM/acetone=5:5:3)

$^1$H NMR (600 MHz, Acetone-d$_6$) δ 12.03 (s, 1H), 10.51 (s, 1H), 10.17 (s, 1H), 7.92 (s, 1H), 7.59 (d, J=1.3 Hz, 1H), 7.44-7.41 (m, 2H), 7.32-7.29 (m, 4H), 7.28-7.25 (m, 2H), 7.23-7.18 (m, 1H), 6.86-6.80 (m, 4H), 6.34 (t, J=6.8 Hz, 1H), 6.25 (dd, J=7.9, 5.8 Hz, 1H), 5.50 (ddt, J=8.4, 5.6, 2.8 Hz, 1H), 4.58 (dt, J=6.3, 3.8 Hz, 1H), 4.33 (td, J=4.7, 2.7 Hz, 1H), 4.24-4.15 (m, 2H), 3.98 (qd, J=3.6, 1.1 Hz, 1H), 3.77 (s, 6H), 3.38 (ddd, J=47.0, 10.3, 4.7 Hz, 2H), 3.03 (ddd, J=13.9, 8.0, 5.9 Hz, 1H), 2.89 (p, J=6.9 Hz, 1H), 2.70 (ddd, J=13.9, 5.9, 2.9 Hz, 1H), 2.37-2.22 (m, 2H), 1.92 (d, J=1.2 Hz, 3H), 1.66 (d, J=17.7 Hz, 3H), 1.23 (dd, J=6.9, 0.8 Hz, 6H), 0.91 (s, 9H), 0.12 (s, 6H).

$^{13}$C NMR (151 MHz, Acetone-d$_6$) δ 179.49, 163.52, 158.30, 158.29, 154.41, 149.87, 147.98, 147.86, 144.50, 136.52, 135.63, 135.25, 135.18, 129.66, 129.60, 127.68, 127.25, 126.29, 120.77, 112.54, 109.65, 85.97, 84.70, 84.66, 84.35, 84.32, 84.16, 82.89, 75.87, 75.83, 71.18, 63.65, 63.60, 63.00, 54.15, 39.60, 37.65, 35.19, 24.76, 18.02, 17.90, 17.13, 11.46, 11.14, 10.18, −5.91, −6.04.

$^{31}$P NMR (162 MHz, Acetone-d$_6$) δ 33.50.

HRMS (ESI-TOF): calc'd for C$_{52}$H$_{66}$N$_7$O$_{13}$PSi [M+H]$^+$: 1056.4304, found: 1056.4304.

15. Compound (S$_p$)-57

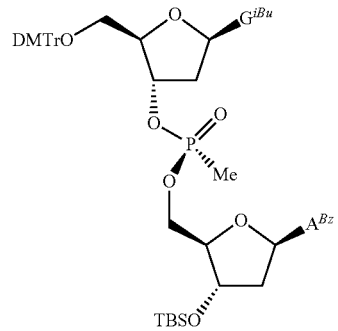

Following General Procedure I on 0.03 mmol scale with (S$_p$)-42 and SI-32. Purification by pTLC (EtOAc/DCM/acetone=1:1:1) afforded 25.0 mg (71%, >20:1 d.r.) of the title compound (S$_p$)-57.

Physical State: white amorphous solid

R$_f$=0.26 (EtOAc/DCM/acetone=1:1:1)

$^1$H NMR (600 MHz, Acetone-d$_6$) δ 11.97 (s, 1H), 10.73 (s, 1H), 10.03 (s, 1H), 8.69 (s, 1H), 8.51 (s, 1H), 8.07 (d, J=7.6 Hz, 2H), 7.90 (s, 1H), 7.63 (t, J=7.4 Hz, 1H), 7.55-7.49 (m, 2H), 7.41-7.36 (m, 2H), 7.28-7.20 (m, 6H), 7.19-7.14 (m, 1H), 6.79 (dd, J=9.0, 2.9 Hz, 4H), 6.57 (t, J=6.4 Hz, 1H), 6.16 (dd, J=7.5, 6.0 Hz, 1H), 5.35 (ddt, J=8.8, 6.1, 3.2 Hz, 1H), 4.95 (q, J=4.9 Hz, 1H), 4.28-4.09 (m, 4H), 3.74 (d, J=1.7 Hz, 6H), 3.36-3.25 (m, 2H), 3.12 (dt, J=12.8, 6.1 Hz, 1H), 2.96 (ddd, J=13.6, 7.6, 6.0 Hz, 1H), 2.84-2.81 (m, 1H), 2.64-2.53 (m, 2H), 1.53 (d, J=17.7 Hz, 3H), 1.19 (dd, J=19.1, 6.9 Hz, 6H), 0.95 (s, 9H), 0.18 (d, J=3.5 Hz, 6H).

$^{13}$C NMR (151 MHz, Acetone-d$_6$) δ 180.76, 166.01, 159.59, 155.79, 152.91, 152.68, 151.19, 149.27, 149.09, 145.87, 143.90, 138.06, 136.61, 136.56, 134.78, 133.31, 130.95, 130.91, 129.41, 129.16, 129.00, 128.57, 127.57, 126.20, 122.22, 113.86, 87.20, 86.55, 86.51, 85.51, 85.47, 84.38, 76.87, 76.83, 72.83, 64.96, 64.92, 64.20, 55.49, 40.42, 38.68, 38.65, 36.53, 26.18, 19.38, 19.23, 18.55, 12.21, 11.26, −4.49, −4.61.

$^{31}$P NMR (162 MHz, Acetone-$d_6$) δ 33.01.

HRMS (ESI-TOF): calc'd for $C_{59}H_{69}N_{10}O_{12}PSi$ [M+H]$^+$: 1169.4682, found: 1169.4667.

16. Compound ($S_p$)-58

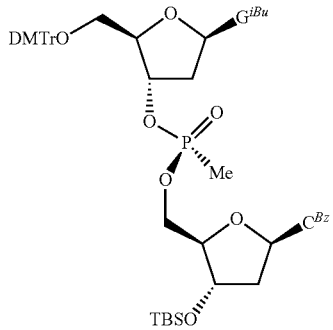

Following General Procedure I on 0.03 mmol scale with ($S_p$)-42 and SI-33. Purification by pTLC (EtOAc/acetone=5:1) afforded 17.4 mg (51%, >20:1 d.r.) of the title compound ($S_p$)-58.

Physical State: white amorphous solid $R_f$=0.51 (EtOAc/acetone=5:1)

$^1$H NMR (600 MHz, Acetone-$d_6$) δ 12.04 (s, 1H), 10.68 (s, 1H), 10.00 (s, 1H), 8.28 (d, J=7.5 Hz, 1H), 8.10-8.03 (m, 2H), 7.94 (s, 1H), 7.66-7.60 (m, 1H), 7.53 (dd, J=8.3, 7.3 Hz, 2H), 7.46-7.38 (m, 3H), 7.30-7.26 (m, 4H), 7.26-7.21 (m, 2H), 7.20-7.15 (m, 1H), 6.84-6.76 (m, 4H), 6.30-6.24 (m, 2H), 5.46 (dp, J=8.6, 3.0 Hz, 1H), 4.58 (dt, J=6.2, 4.3 Hz, 1H), 4.39-4.34 (m, 1H), 4.34-4.24 (m, 2H), 4.14 (dt, J=4.7, 3.6 Hz, 1H), 3.75 (d, J=0.8 Hz, 6H), 3.46-3.33 (m, 2H), 3.08 (dt, J=13.7, 6.7 Hz, 1H), 2.73 (ddd, J=13.8, 6.1, 3.2 Hz, 1H), 2.52 (ddd, J=13.5, 6.5, 4.6 Hz, 1H), 2.30 (dt, J=13.6, 6.1 Hz, 1H), 1.67 (d, J=17.6 Hz, 3H), 1.38 (s, 1H), 1.22 (dd, J=6.9, 0.8 Hz, 6H), 0.91 (s, 9H), 0.12 (d, J=0.9 Hz, 6H).

$^{13}$C NMR (151 MHz, Acetone-$d_6$) δ 180.72, 163.78, 159.61, 159.60, 155.87, 149.33, 149.10, 145.85, 145.44, 138.09, 136.60, 136.53, 134.50, 133.64, 130.98, 130.92, 129.46, 129.09, 129.01, 128.58, 127.60, 122.17, 113.87, 97.20, 87.91, 87.24, 86.77, 86.72, 85.76, 85.73, 84.39, 77.25, 77.22, 72.27, 65.00, 64.96, 64.37, 55.49, 42.23, 38.89, 38.86, 36.54, 26.13, 19.35, 19.31, 18.49, 12.29, 11.35, −4.54, −4.69.

$^{31}$P NMR (162 MHz, Acetone-$d_6$) δ 33.52.

HRMS (ESI-TOF): calc'd for $C_{58}H_{69}N_8O_{13}PSi$ [M+H]$^+$: 1145.4569, found: 1145.4556.

17. Compound ($S_p$)-59

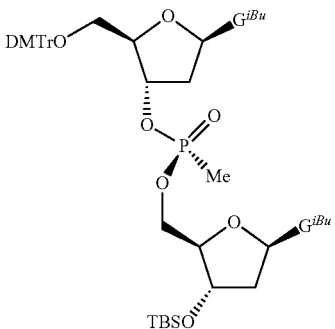

Following General Procedure I on 0.03 mmol scale with ($S_p$)-42 and SI-34. Purification by pTLC (EtOAc/acetone/MeOH=5:5:1) afforded 13.4 mg (39%, >20:1 d.r.) of the title compound ($S_p$)-59.

Physical State: white amorphous solid $R_f$=0.21 (EtOAc/acetone/MeOH=5:5:1)

$^1$H NMR (600 MHz, Acetone-$d_6$) δ 12.10 (s, 2H), 10.82 (s, 1H), 10.72 (s, 1H), 8.06 (s, 1H), 7.92 (s, 1H), 7.47-7.42 (m, 2H), 7.34-7.25 (m, 6H), 7.24-7.19 (m, 1H), 6.87-6.81 (m, 4H), 6.34 (t, J=6.6 Hz, 1H), 6.22 (dd, J=8.3, 5.7 Hz, 1H), 5.37 (ddt, J=8.1, 5.3, 2.5 Hz, 1H), 4.75 (dt, J=6.1, 3.3 Hz, 1H), 4.37-4.23 (m, 3H), 4.15 (q, J=3.9 Hz, 1H), 3.78 (s, 6H), 3.44-3.33 (m, 2H), 3.05-2.87 (m, 3H), 2.84-2.82 (m, 1H), 2.68 (ddd, J=14.0, 5.7, 2.5 Hz, 1H), 2.44 (ddd, J=13.4, 6.2, 3.7 Hz, 1H), 1.59 (d, J=17.8 Hz, 3H), 1.25 (dd, J=6.8, 1.7 Hz, 6H), 1.17 (d, J=6.8 Hz, 3H), 1.10 (d, J=6.9 Hz, 3H), 0.95 (s, 9H), 0.18 (d, J=2.9 Hz, 6H).

$^{13}$C NMR (151 MHz, Acetone-$d_6$) δ 180.92, 180.78, 159.67, 156.16, 155.78, 149.55, 149.46, 149.23, 149.09, 145.84, 138.86, 137.65, 136.60, 136.50, 131.00, 130.95, 129.01, 128.62, 127.67, 122.57, 122.10, 113.91, 87.31, 86.89, 86.85, 85.72, 85.66, 85.63, 84.16, 77.35, 77.31, 73.15, 65.31, 65.27, 64.46, 55.51, 40.40, 38.94, 38.92, 36.64, 36.43, 26.16, 19.37, 19.26, 19.15, 18.54, 12.08, 11.13, −4.51, −4.65.

$^{31}$P NMR (162 MHz, Acetone-$d_6$) δ 34.00.

HRMS (ESI-TOF): calc'd for $C_{56}H_{71}N_{10}O_{13}PSi$ [M+H]$^+$: 1151.4787, found: 1151.4779.

18. Compound ($R_p$)-48

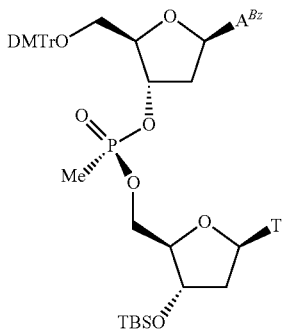

Following General Procedure I on 0.03 mmol scale with ($R_p$)-41 and SI-31. Purification by pTLC (EtOAc/acetone=7:1) afforded 22.1 mg (69%, >20:1 d.r.) of the title compound ($R_p$)-48.

Physical State: white amorphous solid $R_f$=0.31 (EtOAc/DCM/acetone=5:5:2)

$^1$H NMR (600 MHz, Acetone-$d_6$) δ 10.01 (s, 1H), 9.95 (s, 1H), 8.57 (s, 1H), 8.38 (s, 1H), 8.14 (d, J=7.7 Hz, 2H), 7.69-7.64 (m, 1H), 7.63 (q, J=1.2 Hz, 1H), 7.58 (t, J=7.6 Hz, 2H), 7.49-7.44 (m, 2H), 7.36-7.32 (m, 3H), 7.32-7.12 (m, 4H), 6.89-6.80 (m, 4H), 6.60 (dd, J=7.6, 6.2 Hz, 1H), 6.29 (dd, J=7.7, 6.1 Hz, 1H), 5.44 (ddt, J=8.5, 5.8, 2.9 Hz, 1H), 4.60 (dt, J=6.2, 3.2 Hz, 1H), 4.41 (td, J=4.9, 2.6 Hz, 1H), 4.37-4.28 (m, 1H), 4.26-4.19 (m, 1H), 4.09 (q, J=4.0 Hz, 1H), 3.79 (s, 6H), 3.49-3.44 (m, 2H), 3.38-3.32 (m, 1H), 2.82-2.78 (m, 1H), 2.37-2.30 (m, 1H), 2.25 (ddd, J=13.4, 6.2, 3.3 Hz, 1H), 1.81 (d, J=1.2 Hz, 3H), 1.61 (d, J=17.6 Hz, 3H), 0.92 (s, 9H), 0.14 (d, J=2.7 Hz, 6H).

$^{13}$C NMR (151 MHz, Acetone-$d_6$) δ 165.94, 164.32, 159.78, 159.76, 153.02, 152.76, 151.41, 151.35, 146.06, 143.61, 136.76, 136.69, 135.21, 133.35, 132.16, 131.12, 131.05, 129.90, 129.78, 129.56, 129.30, 129.18, 129.13, 128.74, 127.74, 126.38, 126.26, 114.05, 113.97, 111.27, 87.39, 86.40, 86.35, 86.14, 86.10, 85.94, 85.61, 77.24, 77.20, 73.24, 68.46, 65.79, 65.75, 64.49, 55.65, 40.81, 39.81, 38.61, 31.32, 26.26, 24.64, 23.78, 18.64, 14.46, 12.63, 12.30, 11.45, 11.35, −4.41, −4.52.

$^{31}$P NMR (162 MHz, Acetone-$d_6$) δ 32.39.

HRMS (ESI-TOF): calc'd for $C_{55}H_{64}N_7O_{12}PSi$ [M+H]$^+$: 1074.4198, found: 1074.4189.

19. Compound ($R_p$)-46

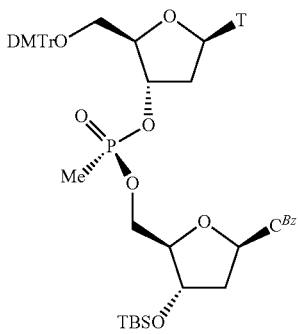

Following General Procedure I on 0.03 mmol scale with ($R_p$)-40 and SI-33. Purification by pTLC (EtOAc/acetone=15:1) afforded 22.0 mg (70%, >20:1 d.r.) of the title compound ($R_p$)-46.

Physical State: white amorphous solid $R_f$=0.63 (EtOAc/acetone=7:1)

$^1$H NMR (600 MHz, Acetone-$d_6$) δ 10.08 (s, 1H), 8.30 (d, J=7.5 Hz, 1H), 8.16-8.12 (m, 2H), 7.66-7.62 (m, 1H), 7.58 (d, J=1.3 Hz, 1H), 7.57-7.52 (m, 2H), 7.49-7.45 (m, 2H), 7.41-7.30 (m, 7H), 7.26-7.21 (m, 1H), 6.89 (dd, J=8.9, 1.7 Hz, 3H), 6.37 (dd, J=8.1, 6.1 Hz, 1H), 6.22 (t, J=6.3 Hz, 1H), 5.35 (ddt, J=8.4, 5.6, 2.7 Hz, 1H), 4.57 (dt, J=6.2, 4.1 Hz, 1H), 4.38-4.25 (m, 3H), 4.18 (q, J=4.2 Hz, 1H), 3.77 (s, 6H), 3.43 (qd, J=10.6, 3.4 Hz, 2H), 2.65-2.54 (m, 2H), 2.48 (ddd, J=13.5, 6.3, 4.2 Hz, 1H), 2.29 (dt, J=13.6, 6.3 Hz, 1H), 1.55 (d, J=17.7 Hz, 3H), 1.43 (d, J=1.2 Hz, 3H), 0.92 (s, 9H), 0.13 (d, J=1.5 Hz, 6H).

$^{13}$C NMR (151 MHz, Acetone-$d_6$) δ 164.17, 163.70, 159.78, 159.76, 151.28, 145.70, 145.42, 136.44, 136.32, 136.21, 133.57, 131.03, 131.00, 129.42, 129.17, 129.03, 128.77, 127.81, 114.05, 111.29, 88.05, 87.71, 86.86, 86.82, 85.39, 85.35, 85.06, 77.07, 77.04, 72.72, 65.43, 65.39, 64.24, 55.55, 42.01, 39.61, 39.58, 26.14, 18.51, 12.18, 12.14, 11.23, −4.51, −4.66.

$^{31}$P NMR (162 MHz, Acetone-$d_6$) δ 32.91.

HRMS (ESI-TOF): calc'd for $C_{54}H_{64}N_5O_{13}PSi$ [M+H]$^+$: 1050.4086, found: 1050.4081.

20. Compound ($R_p$)-57

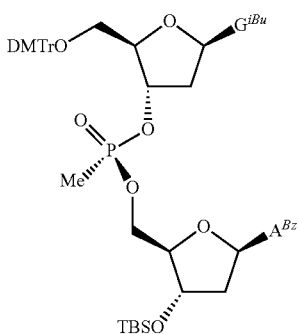

Following General Procedure I on 0.03 mmol scale with ($R_p$)-42 and SI-32. Purification by pTLC (EtOAc/acetone=9:2) afforded 22.1 mg (63%, >20:1 d.r.) of the title compound ($R_p$)-57.

Physical State: white amorphous solid $R_f$=0.29 (EtOAc/acetone=5:1)

$^1$H NMR (600 MHz, Acetone-$d_6$) δ 11.96 (s, 1H), 10.82 (s, 1H), 10.01 (s, 1H), 8.67 (s, 1H), 8.55 (s, 1H), 8.12 (d, J=7.6 Hz, 2H), 7.90 (s, 1H), 7.63 (t, J=7.4 Hz, 1H), 7.53 (t, J=7.8 Hz, 2H), 7.38-7.33 (m, 2H), 7.26-7.19 (m, 6H), 7.18-7.13 (m, 1H), 6.81-6.76 (m, 4H), 6.57 (t, J=6.5 Hz, 1H), 6.17 (t, J=6.3 Hz, 1H), 5.56 (dq, J=9.1, 5.1 Hz, 1H), 4.95 (dt, J=6.2, 4.5 Hz, 1H), 4.38 (ddd, J=11.0, 7.0, 3.9 Hz, 1H), 4.31 (dt, J=11.2, 6.2 Hz, 1H), 4.15 (dq, J=16.6, 4.1 Hz, 2H), 3.74 (d, J=0.9 Hz, 6H), 3.29 (d, J=4.3 Hz, 2H), 3.16 (dt, J=12.9, 6.2 Hz, 1H), 2.93-2.89 (m, 1H), 2.83-2.79 (m, 1H), 2.59-2.50 (m, 2H), 1.43 (d, J=17.7 Hz, 3H), 1.14 (dd, J=8.5, 6.8 Hz, 6H), 0.93 (s, 9H), 0.16 (d, J=2.5 Hz, 6H).

$^{13}$C NMR (151 MHz, Acetone-$d_6$) δ 180.76, 166.10, 159.57, 159.56, 156.00, 152.71, 151.02, 148.97, 145.81, 144.13, 138.61, 136.65, 136.55, 134.69, 133.36, 130.97, 130.92, 130.85, 129.43, 129.21, 128.97, 128.54, 128.52, 127.56, 125.99, 122.25, 113.84, 87.06, 86.62, 86.58, 85.48, 84.93, 84.89, 84.33, 75.86, 75.82, 73.04, 65.84, 65.79, 63.63, 55.48, 40.15, 38.51, 36.57, 26.15, 19.39, 19.17, 18.53, 12.07, 11.11, −4.49, −4.64.

$^{31}$P NMR (162 MHz, Acetone-$d_6$) δ 33.13.

HRMS (ESI-TOF): calc'd for $C_{59}H_{69}N_{10}O_{12}PSi$ [M+H]$^+$: 1169.4682, found: 1169.4670.

21. Compound ($R_p$)-55

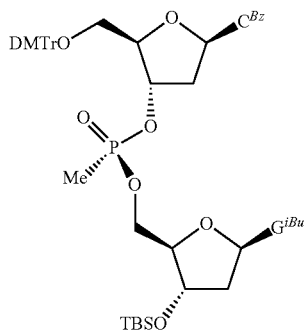

Following General Procedure I on 0.03 mmol scale with ($R_p$)-43 and SI-34. Purification by pTLC (10% MeOH in EtOAc) afforded 16.1 mg (48%, >20:1 d.r.) of the title compound ($R_p$)-55.

Physical State: white amorphous solid $R_f$=0.30 (10% MeOH in EtOAc)

$^1$H NMR (600 MHz, Acetone-$d_6$) δ 12.02 (s, 1H), 10.86 (s, 1H), 8.20-8.16 (m, 2H), 8.14 (d, J=7.6 Hz, 1H), 7.93 (s, 1H), 7.69-7.63 (m, 1H), 7.56 (t, J=7.8 Hz, 2H), 7.46-7.41 (m, 2H), 7.35-7.28 (m, 5H), 7.22 (ddt, J=7.8, 6.8, 1.3 Hz, 1H), 6.94-6.87 (m, 4H), 6.33 (dd, J=8.5, 6.0 Hz, 1H), 6.15 (t, J=6.3 Hz, 1H), 5.25-5.18 (m, 1H), 4.79-4.72 (m, 2H), 4.36-4.29 (m, 1H), 4.29-4.18 (m, 3H), 3.79 (d, J=3.0 Hz, 6H), 3.41 (m, 2H), 3.00 (ddd, J=13.6, 8.6, 5.4 Hz, 1H), 2.80-2.74 (m, 3H), 2.44 (dt, J=13.8, 6.3 Hz, 1H), 2.34 (ddd, J=13.4, 6.1, 2.0 Hz, 1H), 1.62 (d, J=17.7 Hz, 3H), 1.49-1.36 (m, 1H), 1.18 (d, J=6.9 Hz, 3H), 1.08 (d, J=6.8 Hz, 3H), 0.97-0.86 (m, 9H), 0.18 (d, J=6.5 Hz, 6H).

$^{13}$C NMR (151 MHz, Acetone-$d_6$) δ 181.04, 168.14, 159.91, 159.88, 156.08, 149.03, 148.95, 145.62, 139.61, 136.55, 136.33, 133.74, 133.61, 132.17, 131.17, 131.04, 129.90, 129.78, 129.62, 129.18, 129.14, 128.90, 127.90, 126.26, 123.35, 114.21, 88.08, 87.91, 87.20, 87.15, 87.08, 86.05, 86.01, 76.62, 74.18, 68.46, 65.91, 65.87, 63.73, 55.68, 40.98, 40.07, 39.81, 36.46, 32.76, 31.32, 27.91, 26.32, 24.64, 23.78, 19.60, 19.35, 18.73, 14.46, 11.96, 11.45, 11.01, −4.40, −4.51.

$^{31}$P NMR (162 MHz, Acetone-d$_6$) δ 33.24.

HRMS (ESI-TOF): calc'd for C$_{58}$H$_{69}$N$_8$O$_{13}$PSi [M+H]$^+$: 1145.4569, found: 1145.4553.

22. Compound (R$_p$)-44

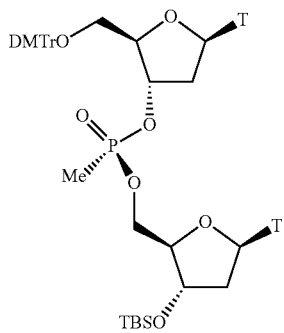

Following General Procedure I on 1.5 mmol scale with (R$_p$)-40 and SI-31. Purification by silica gel column chromatography (DCM/MeOH=95:5) afforded 1.1 g (75%, >20:1 d.r.) of the title compound (R$_p$)-44.

Physical State: white amorphous solid

R$_f$=0.38 (EtOAc/DCM:acetone=5:5:2)

$^1$H NMR (600 MHz, Acetone-d$_6$) δ 10.02 (s, 1H), 9.96 (s, 1H), 7.63 (q, J=1.2 Hz, 1H), 7.58 (q, J=1.2 Hz, 1H), 7.52-7.47 (m, 2H), 7.40-7.32 (m, 6H), 7.30-7.24 (m, 1H), 6.95-6.90 (m, 4H), 6.39 (dd, J=8.3, 5.9 Hz, 1H), 6.30 (dd, J=7.6, 6.1 Hz, 1H), 5.33 (ddt, J=8.2, 5.4, 2.6 Hz, 1H), 4.60 (dt, J=6.2, 3.2 Hz, 1H), 4.33-4.27 (m, 3H), 4.24 (ddd, J=11.4, 6.7, 4.7 Hz, 1H), 4.11-4.05 (m, 1H), 3.81 (s, 6H), 3.47-3.43 (m, 2H), 2.65-2.53 (m, 2H), 2.33 (ddd, J=13.6, 7.6, 6.1 Hz, 1H), 2.25 (ddd, J=13.4, 6.2, 3.3 Hz, 1H), 1.83 (d, J=1.2 Hz, 3H), 1.55 (d, J=17.6 Hz, 3H), 1.45 (d, J=1.2 Hz, 3H), 0.93 (s, 9H), 0.15 (d, J=1.5 Hz, 6H).

$^{13}$C NMR (151 MHz, Acetone-d$_6$) δ 164.32, 164.20, 159.95, 159.93, 151.39, 151.35, 145.80, 136.70, 136.59, 136.43, 136.25, 131.16, 129.18, 128.92, 127.97, 114.20, 111.44, 111.23, 87.88, 86.37, 86.33, 85.95, 85.55, 85.51, 85.15, 77.24, 77.20, 73.26, 65.71, 65.67, 64.40, 55.68, 40.83, 39.65, 39.63, 26.26, 18.64, 12.61, 12.24, 11.29, −4.41, −4.52.

$^{31}$P NMR (162 MHz, Acetone-d$_6$) δ 32.53.

HRMS (ESI-TOF): calc'd for C$_{48}$H$_{61}$N$_4$O$_{13}$PSi [M+Na]$^+$: 983.3640, found: 983.3632.

Example 7

Ψ Activation of MPO Dimers

1. TBS Deprotection to Afford SI-35

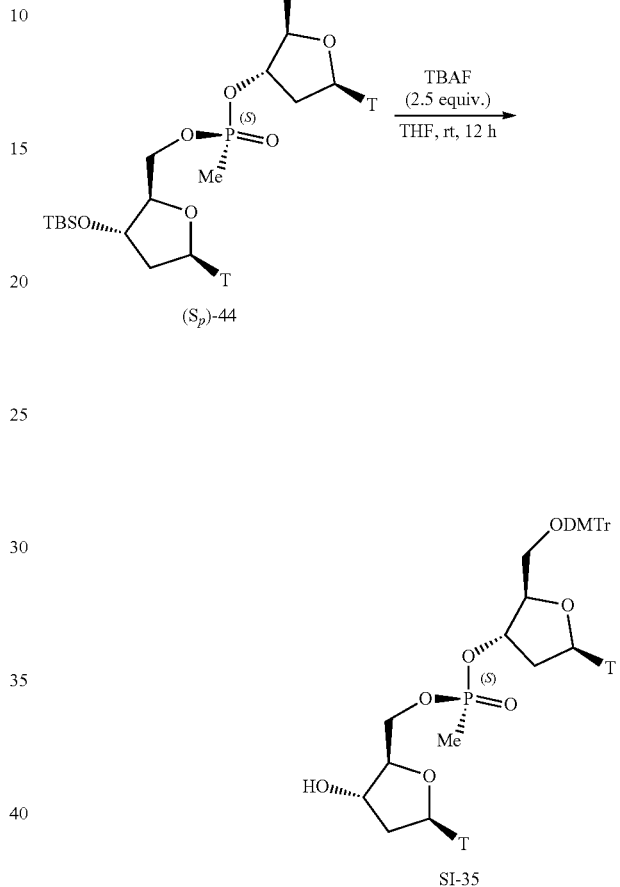

A mixture of dinucleotide (S$_p$)-44 (290 mg, 0.3 mmol, 1.0 equiv.) and TBAF (1.0 M in THF, 0.75 mL, 0.75 mmol, 2.5 equiv.) in THF (5 mL) was stirred at rt for 12 h, upon which the mixture was concentrated to dryness under reduced pressure and co-evaporated with toluene (2×3 mL). Purification by silica gel column chromatography (DCM/MeOH=9:1) afforded 223 mg (75%, >20:1 d.r.) of the title compound SI-35.

Physical State: white amorphous solid

R$_f$=0.43 (DCM/MeOH=85:15)

$^1$H NMR (600 MHz, Acetone-d$_6$) δ 10.05 (d, J=15.0 Hz, 1H), 9.98 (d, J=14.4 Hz, 1H), 7.57 (dq, J=13.1, 1.2 Hz, 2H), 7.51-7.46 (m, 2H), 7.39-7.33 (m, 4H), 7.33-7.31 (m, 2H), 7.28-7.23 (m, 1H), 6.94-6.88 (m, 4H), 6.36 (t, J=7.1 Hz, 1H), 6.31 (dd, J=7.7, 6.2 Hz, 1H), 5.32 (dtt, J=10.4, 4.2, 2.0 Hz, 1H), 4.59 (s, 1H), 4.44-4.40 (m, 1H), 4.27 (q, J=3.2 Hz, 1H), 4.26-4.18 (m, 1H), 4.08 (ddd, J=11.1, 7.3, 3.3 Hz, 1H), 4.01 (dt, J=6.2, 3.3 Hz, 1H), 3.79 (s, 6H), 3.46 (dd, J=10.6, 3.5 Hz, 1H), 3.42 (dd, J=10.6, 3.3 Hz, 1H), 2, 2.60-2.55 (m, 2H), 2.25 (ddd, J=13.6, 6.2, 3.4 Hz, 1H), 2.19 (dddd, J=13.9, 7.6, 6.2, 1.2 Hz, 1H), 1.82 (d, J=1.2 Hz, 3H), 1.58 (d, J=17.7 Hz, 3H), 1.46 (d, J=1.2 Hz, 3H).

$^{13}$C NMR (151 MHz, Acetone-$d_6$) δ 164.34, 164.26, 164.19, 159.92, 159.90, 151.39, 151.32, 145.87, 136.61, 136.55, 136.49, 136.32, 131.18, 131.15, 129.17, 128.91, 127.95, 114.19, 111.40, 111.22, 87.84, 86.18, 86.14, 85.68, 85.57, 85.53, 85.23, 76.91, 76.87, 71.89, 71.78, 66.26, 66.22, 64.33, 55.68, 40.52, 40.47, 39.67, 39.64, 12.66, 12.25, 12.19, 11.24.

$^{31}$P NMR (162 MHz, Acetone-$d_6$) δ 33.29.

HRMS (ESI-TOF): calc'd for $C_{42}H_{47}N_4O_{13}P$ [M+Na]$^+$: 869.2775, found: 869.2766.

2. Loading of (+)-CLO-Ψ to Afford 60

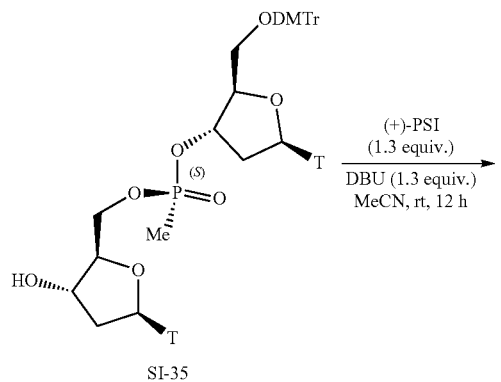

SI-35

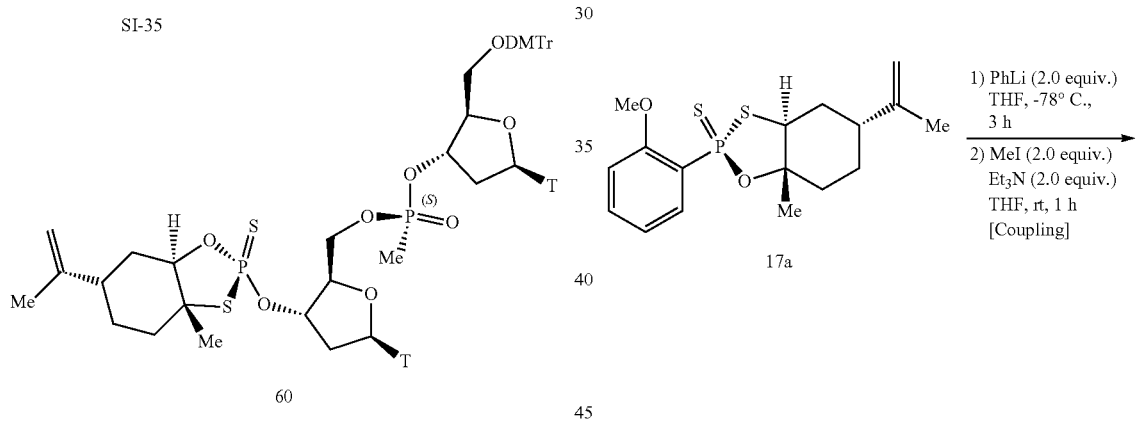

60

SI-35 (170 mg, 0.2 mmol, 1.0 equiv.) and (+)-CLO-Ψ (120 mg, 0.26 mmol, 1.3 equiv.) were dissolved in anhydrous acetonitrile (2 mL, 0.1 M) in a flame-dried round-bottom flask. DBU (39 µL, 0.26 mmol, 1.3 equiv.) was added dropwise to the reaction mixture while stirring. After 30 minutes, the crude reaction mixture was quenched with the addition of 1×PBS solution (10 mL) and extracted with DCM (10 mL×3). The combined organic layers were washed with water (10 mL×2) and brine (10 mL), dried over MgSO$_4$, filtered and concentrated. The residue crude product was purified by silica gel column chromatography (DCM:MeOH=98:2) afforded 168 mg (77%, >20:1 d.r.) of the title compound 60.

Physical State: pale yellow amorphous solid
R$_f$=0.48 (DCM:MeOH=95:5)

$^1$H NMR (600 MHz, Acetone-$d_6$) δ 7.60 (t, J=1.2 Hz, 1H), 7.55 (q, J=1.3 Hz, 1H), 7.54-7.48 (m, 2H), 7.41-7.33 (m, 4H), 7.31-7.22 (m, 2H), 7.21-7.12 (m, 1H), 6.96-6.90 (m, 4H), 6.39 (t, J=7.1 Hz, 1H), 6.29 (dd, J=7.9, 6.4 Hz, 1H), 5.34 (dddt, J=19.3, 11.2, 5.6, 2.7 Hz, 2H), 5.02 (t, J=1.5 Hz), 4.98-4.94 (m, 1H), 4.54 (dt, J=12.8, 3.3 Hz, 1H), 4.36-4.27 (m, 3H), 4.18 (ddd, J=9.7, 7.1, 2.6 Hz, 1H), 4.02-3.97 (m, 1H), 3.81 (s, 6H), 3.52-3.42 (m, 2H), 3.29-3.23 (m, 1H), 2.67 (s, 1H), 2.60 (dd, J=7.2, 4.3 Hz, 2H), 2.51-2.44 (m, 1H), 2.39-2.34 (m, 1H), 2.16-2.09 (m, 1H), 2.03-1.86 (m, 3H), 1.84 (d, J=1.2 Hz, 3H), 1.82-1.79 (m, 3H), 1.71 (s, 3H), 1.63 (d, J=17.7 Hz, 3H), 1.47 (d, J=1.2 Hz, 3H).

$^{13}$C NMR (151 MHz, Acetone-$d_6$) δ 164.16, 159.91, 159.89, 151.31, 151.26, 146.54, 145.83, 138.60, 136.58, 136.56, 136.45, 136.26, 131.16, 131.14, 129.86, 129.18, 129.14, 128.92, 127.96, 126.22, 114.20, 112.24, 111.52, 111.40, 87.87, 87.18, 86.01, 85.57, 85.54, 85.16, 84.33, 84.30, 84.26, 79.38, 79.33, 77.13, 77.09, 67.11, 65.53, 65.49, 64.41, 64.38, 59.48, 55.70, 54.92, 49.38, 46.32, 44.03, 39.89, 39.72, 39.69, 38.45, 38.41, 34.62, 34.56, 32.77, 28.36, 28.26, 27.36, 27.32, 24.71, 24.52, 24.06, 22.92, 22.15, 21.51, 20.48, 20.23, 13.94, 12.64, 12.28, 12.22, 11.33.

$^{31}$P NMR (162 MHz, Acetone-$d_6$) δ 101.46, 33.22.

HRMS (ESI-TOF): calc'd for $C_{52}H_{62}N_4O_{14}P_2S_2Na$ [M+Na]$^+$: 1115.3077, found: 1115.3088.

Example 8

P-Chiral Phosphine: Inversed-Order Loading and Coupling Experiment

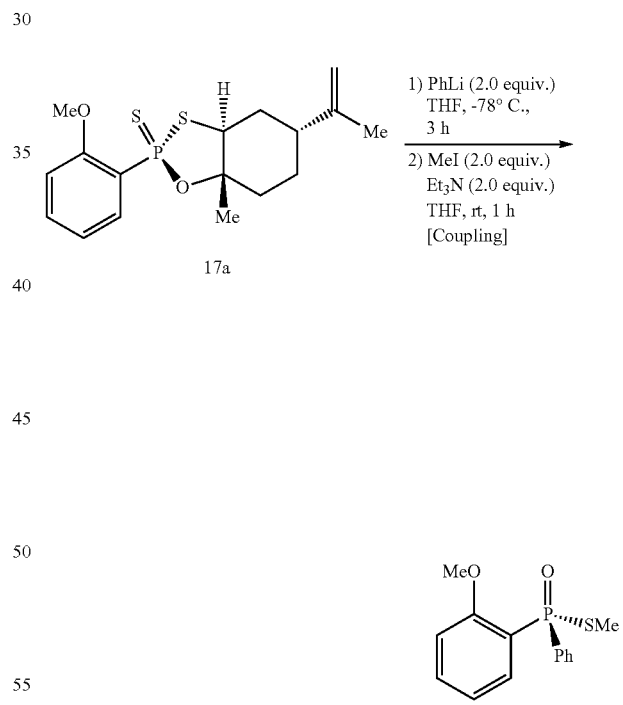

Following General Procedure C, compound 11b was prepared on 0.05 mmol scale from 17a in 35% yield and >98:2 e.r. All physical and spectroscopic data matches with 11b synthesized from 8b. Determination of stereochemical outcome was carried out with chiral HPLC analysis (Chiralpak AD-H, isopropanol/hexane=15:85, 0.8 mL/min, 280 nm) of the reaction product and a standard sample of 11b derived from 8b.

Example 9

MPO: Inversed-Order Loading and Coupling Experiment

1. Loading

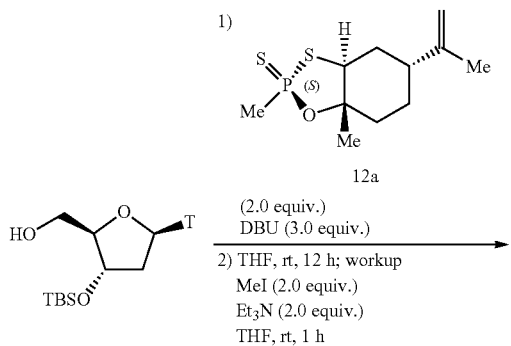

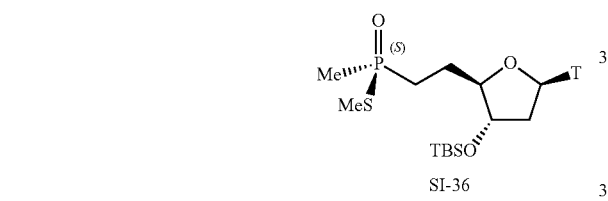

To a flame-dried 50 mL round bottom flask under argon was charged nucleoside (1.0 mmol, 1.0 equiv.), 12a (524.6 mg, 2.0 mmol, 2.0 equiv.), and THF (10 mL). DBU (3.0 mmol, 3.0 equiv.) was added dropwise, and the resulting solution was stirred for 12 h at rt. The reaction was then quenched with 20 mL of 1×PBS solution and extracted with DCM (3×30 mL). The combined organic layers were washed with saturated aqueous NaHCO$_3$ solution (10 mL), brine (10 mL), dried over Na$_2$SO$_4$, filtered and concentrated. The residue was re-dissolved in THF (5 mL). Et$_3$N (2 equiv.) and MeI (2 equiv.) were added, and the heterogeneous mixture was stirred vigorously for 1 h. The reaction was quenched with 10 mL of water and extracted with EtOAc (3×20 mL). The combined organic layers were dried over Na$_2$SO$_4$, filtered and concentrated. The residue was purified by silica gel chromatography to afford the desired product SI-36.

Physical State: white amorphous solid

R$_f$=0.3 (EtOAc)

$^1$H NMR (600 MHz, Acetone-d$_6$) δ 10.00 (s, 1H), 7.54 (q, J=1.3 Hz, 1H), 6.39-6.31 (m, 1H), 4.66 (dt, J=6.4, 3.3 Hz, 1H), 4.36-4.17 (m, 2H), 4.15-4.07 (m, 1H), 2.40-2.22 (m, 5H), 1.90-1.79 (m, 6H), 0.94 (s, 9H), 0.17 (d, J=3.3 Hz, 6H).

$^{13}$C NMR (151 MHz, Acetone-d$_6$) δ 164.29, 164.21, 151.37, 136.64, 136.55, 132.16, 129.77, 111.18, 86.37, 86.32, 85.89, 85.72, 73.66, 73.35, 68.45, 65.08, 64.85, 64.81, 40.86, 40.73, 39.80, 31.31, 27.29, 26.26, 24.64, 23.77, 18.83, 18.63, 18.11, 14.46, 12.68, 12.58, 12.29, 12.27, 11.45, −4.43, −4.45, −4.55.

2. Coupling of Nucleoside 3'-OH:

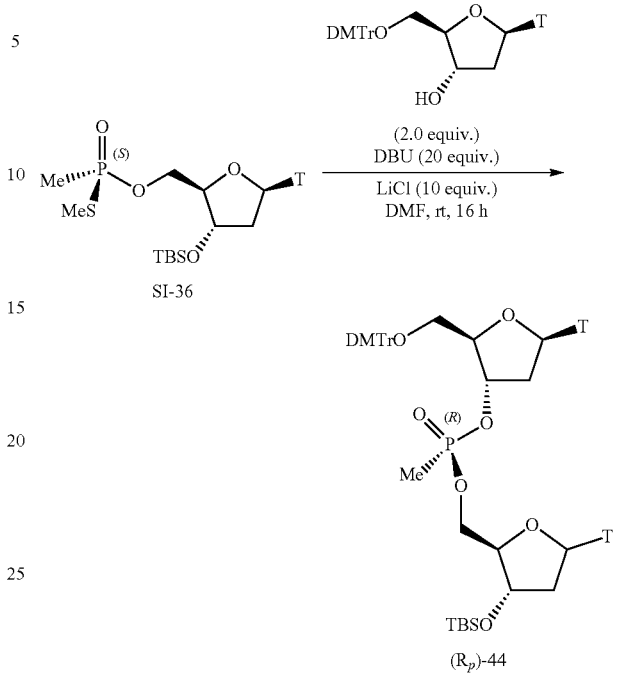

Following General Procedure I, the coupling reaction of 5'-DMTr-dT-3'-OH to SI-36 afforded the desired dT-dT dimer product. Its $^{31}$P NMR δ 32.57 corresponds to the reported $^{31}$P shift of (R$_p$) dT-dT dimers (see above). The stereochemistry at phosphorus of the reaction product was thus assigned to be R$_p$.

What is claimed is:

1. A compound of Formula (I):

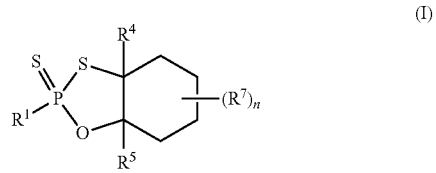

(I)

or a salt thereof, wherein:

R$^1$ is C$_{1-6}$ alkyl, C$_{2-6}$ alkenyl, C$_{2-6}$ alkynyl, C$_{3-10}$ cycloalkyl, C$_{6-10}$ aryl, or C-attached heteroaryl, wherein R$^1$ is optionally substituted with one or more, the same or different, R$^a$ groups;

R$^a$ is deuterium, CD$_3$, C$_{1-6}$ alkyl, C$_{2-6}$ alkenyl, C$_{2-6}$ alkynyl, halogen, CF$_3$, C$_{1-6}$ alkoxy, C$_{3-10}$ cycloalkyl, C$_{6-10}$ aryl or C-attached heteroaryl;

R$^4$ is hydrogen, C$_{1-6}$ alkyl, C$_{2-6}$ alkenyl, or C$_{2-6}$ alkynyl;

R$^5$ is C$_{1-6}$ alkyl, C$_{2-6}$ alkenyl, or C$_{2-6}$ alkynyl;

R$^7$ is a substituent that substitutes for a hydrogen and is one of C$_{1-6}$ alkyl, C$_{2-6}$ alkenyl, C$_{2-6}$ alkynyl, C$_{3-10}$ cycloalkyl, or C$_{6-10}$ aryl; and n is 0, 1, 2, 3, 4, 5, 6, 7, or 8.

2. The compound of claim 1, having Formula (Ia):

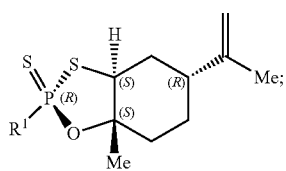

a salt thereof, an enantiomer thereof, or a combination thereof.

3. The compound of claim 1, wherein $R^1$ is selected from the group consisting of:

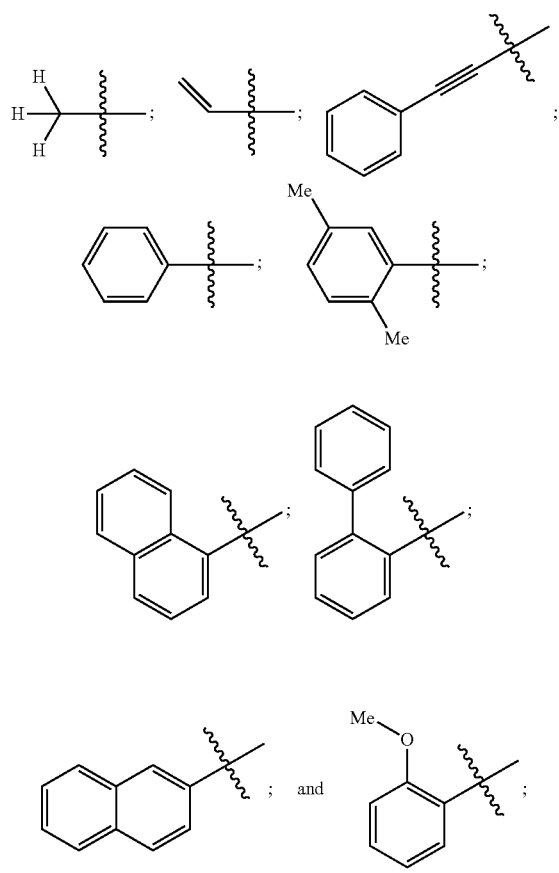

wherein

is the bond between $R^1$ and phosphorus of the formula (I).

4. The compound according to claim 3, wherein $R^1$ is —$CH_3$.

5. The compound according to claim 3, wherein $R^1$ is phenyl.

6. A method of making a thiophosphinic acid, the method comprising:
reacting a carbanion reagent with a compound of Formula (Ia):

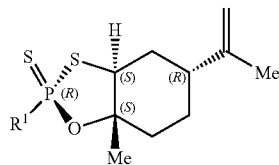

a salt thereof, an enantiomer thereof, or a combination thereof;
wherein
$R^1$ is $C_{1-6}$ alkyl, $C_{2-6}$ alkenyl, $C_{2-6}$ alkynyl, $C_{3-10}$ cycloalkyl, $C_{6-10}$ aryl, or C-attached heteroaryl, wherein $R^1$ is optionally substituted with one or more, the same or different, $R^a$ groups;
$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl;
to form a thiophosphinic acid.

7. The method of claim 6, wherein the thiophosphinic acid has Formula (II):

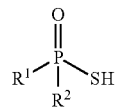

wherein each of $R^1$ and $R^2$ is independently
$C_{1-6}$ alkyl, $C_{2-6}$ alkenyl, $C_{2-6}$ alkynyl, $C_{3-10}$ cycloalkyl, $C_{6-10}$ aryl, or C-attached heteroaryl, wherein each of $R^1$ and $R^2$ is optionally substituted with one or more, the same or different, $R^a$ groups;
$R^a$ is deuterium, $CD_3$, $C_{1-6}$ alkyl, $C_{2-6}$ alkenyl, $C_{2-6}$ alkynyl, halogen, $CF_3$, $C_{1-6}$ alkoxy, $C_{3-10}$ cycloalkyl, $C_{6-10}$ aryl or C-attached heteroaryl.

8. A method for making a nucleoside-loaded organophosphorus compound, comprising reacting a compound of claim 2 or an enantiomer thereof with a nucleoside.

9. The method of claim 8, wherein the nucleoside-loaded organophosphorus compound is a compound having Formula (VII) or (VIIa)

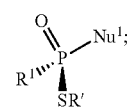

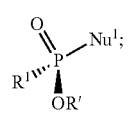

or a diastereomer thereof,
wherein $R^1$ is $C_{1-6}$ alkyl, $C_{2-6}$ alkenyl, or $C_{2-6}$ alkynyl;
$R'$ is $C_{1-6}$ alkyl, $C_{2-6}$ alkenyl, or $C_{2-6}$ alkynyl;
$Nu^1$ is a nucleoside, and wherein Nu¹ optionally comprises, independently of each other, one or more, the same or different, modification or one or more, the same or different, protecting group.

10. The method of claim 9, wherein each of R¹ and R' is —CH₃.

11. The method of claim 8, wherein Nu¹ is a nucleoside selected from the group consisting of

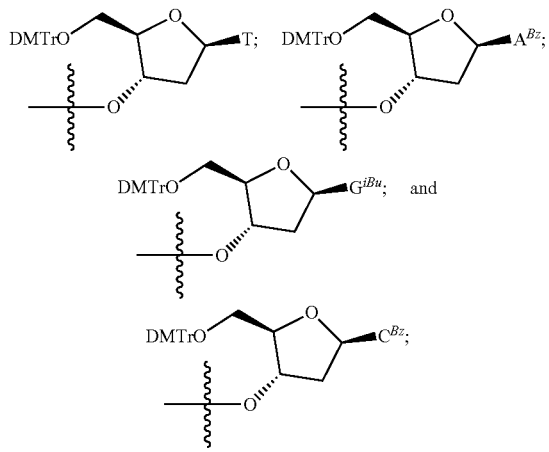

wherein T is

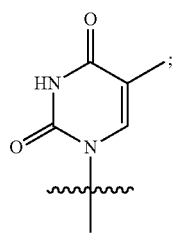 [SMILES: *n1cc(C)c(=O)[nH]c1=O]

A$^{Bz}$ is

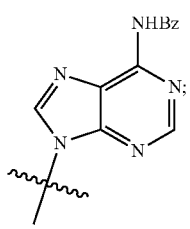

G$^{iBu}$ is

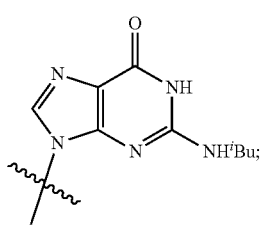

and C$^{Bz}$ is

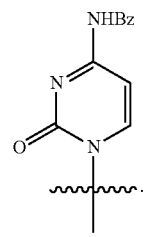

12. The method of claim 8, further comprising reacting the nucleoside-loaded organophosphorus compound with a second nucleoside to form a dinucleotide.

13. The method of claim 12, wherein the dinucleotide is a compound having Formula (VIII) or (VIIIa)

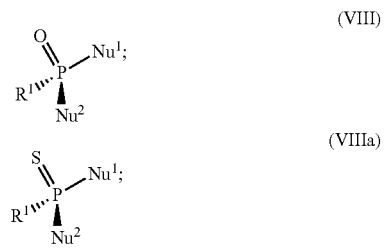

wherein R¹ is C$_{1-6}$ alkyl, C$_{2-6}$ alkenyl, or C$_{2-6}$ alkynyl;

each of Nu¹ and Nu² is a nucleoside; and wherein either one or both Nu¹ and Nu² optionally comprise, independently of each other, one or more, the same of different, modification or one or more, the same or different, protecting group.

14. The method of claim 13, wherein R¹ is —CH₃; and each of Nu¹ and Nu² is independently a nucleoside selected from the group consisting of

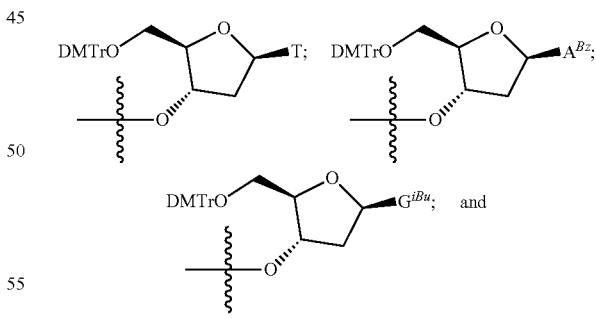

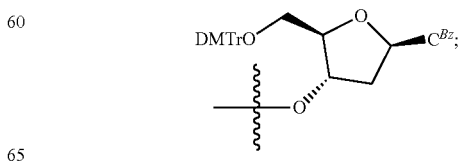

wherein T is

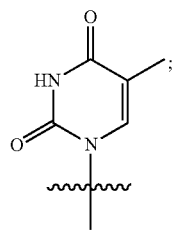 [SMILES: *n1cc(C)c(=O)[nH]c1=O]

$A^{Bz}$ is

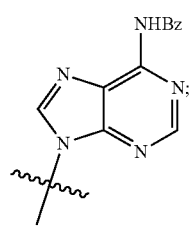

$G^{iBu}$ is

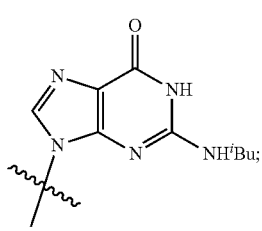

and $C^{Bz}$ is

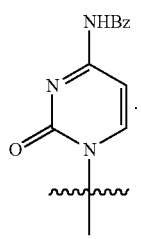

15. The method of claim 12, further comprising
a) reacting the dinucleotide with a compound of Formula (Ia) to form a loaded dinucleotide;
b) reacting the loaded dinucleotide formed in step (a) with a third nucleoside, to form a trinucleotide;
c) repeating steps (a) and (b) one or more times to form a oligonucleotide having a desired number of nucleotides.

16. The method of claim 15, wherein the dinucleotide is a compound having Formulae (VIII) or (VIIIa):

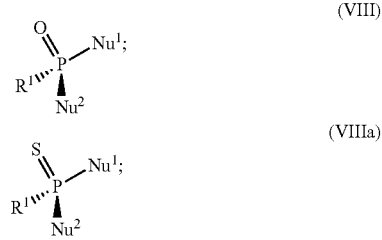

or an enantiomer thereof;
wherein $R^1$ is $C_{1-6}$ alkyl, $C_{2-6}$ alkenyl, or $C_{2-6}$ alkynyl;
each of $Nu^1$ and $Nu^2$ is a nucleoside;
wherein either one or both $Nu^1$ and $Nu^2$ optionally comprise, independently of each other, one or more, the same of different, modification or one or more, the same or different, protecting group.

17. The method of claim 12, further comprising
a) reacting the dinucleotide with a compound of Formula C:

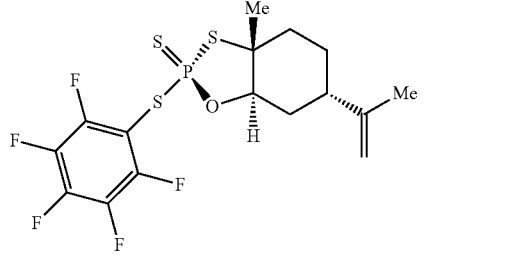

or an enantiomer thereof to form a loaded chimeric dinucleotide; and
b) reacting the loaded chimeric dinucleoside formed in step (a) with a third nucleoside, to form a chimeric trinucleotide bearing a phosphonate linkage and a phosphorothioate linkage.

18. A method of making a compound of claim 2, comprising reacting a carbanion reagent with a compound of Formula A:

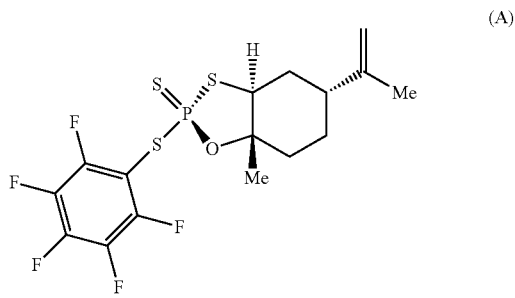

or an enantiomer thereof,
to form a compound of Formula (Ia).

19. The method of claim 18, wherein the carbanion reagent is a Grignard reagent.

* * * * *